United States Patent
Numauchi et al.

(10) Patent No.: US 8,296,097 B2
(45) Date of Patent: Oct. 23, 2012

(54) UNMOLDABILITY DETERMINATION APPARATUS, COMPUTER READABLE MEDIUM, AND UNMOLDABILITY DETERMINATION METHOD

(75) Inventors: Toshihiro Numauchi, Kanagawa (JP);
Masaaki Hagiwara, Kanagawa (JP);
Hiroaki Nakazato, Kanagawa (JP);
Katsumi Takezaki, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 294 days.

(21) Appl. No.: 12/764,589

(22) Filed: Apr. 21, 2010

(65) Prior Publication Data

US 2011/0071790 A1    Mar. 24, 2011

(30) Foreign Application Priority Data

Sep. 24, 2009    (JP) ................... 2009-219424

(51) Int. Cl.
*G06F 15/00* (2006.01)
(52) U.S. Cl. ...................................... 702/167
(58) Field of Classification Search .................. 702/167, 702/153, 150
See application file for complete search history.

(56) References Cited

U.S. PATENT DOCUMENTS
2009/0125284 A1*    5/2009    Nakazato et al. ................. 703/1

FOREIGN PATENT DOCUMENTS
JP    A-2008-3963    1/2008
* cited by examiner

Primary Examiner — Bryan Bui
(74) Attorney, Agent, or Firm — Oliff & Berridge, PLC

(57) ABSTRACT

An unmoldability determination apparatus includes: a normal line calculation unit that calculates a normal line extending from a point on the surfaces of a three-dimensional shape of a molded product; an opposite direction component determination unit that determines whether the normal line calculated on each surface has a directional component opposite to a mold release direction of a mold of the molded product; a reach determination unit that determines whether there is another surface on the molded product which either a line extending from a projection surface in the mold release direction or a line opposite to the mold release direction reaches; and an unmoldability determination unit that, when there is another surface which both lines extending from the projection surface reach, determines the projection surface to be unreleasable from the mold by moving the mold in the mold release direction, thus determining the projection surface to be unmoldable.

8 Claims, 34 Drawing Sheets

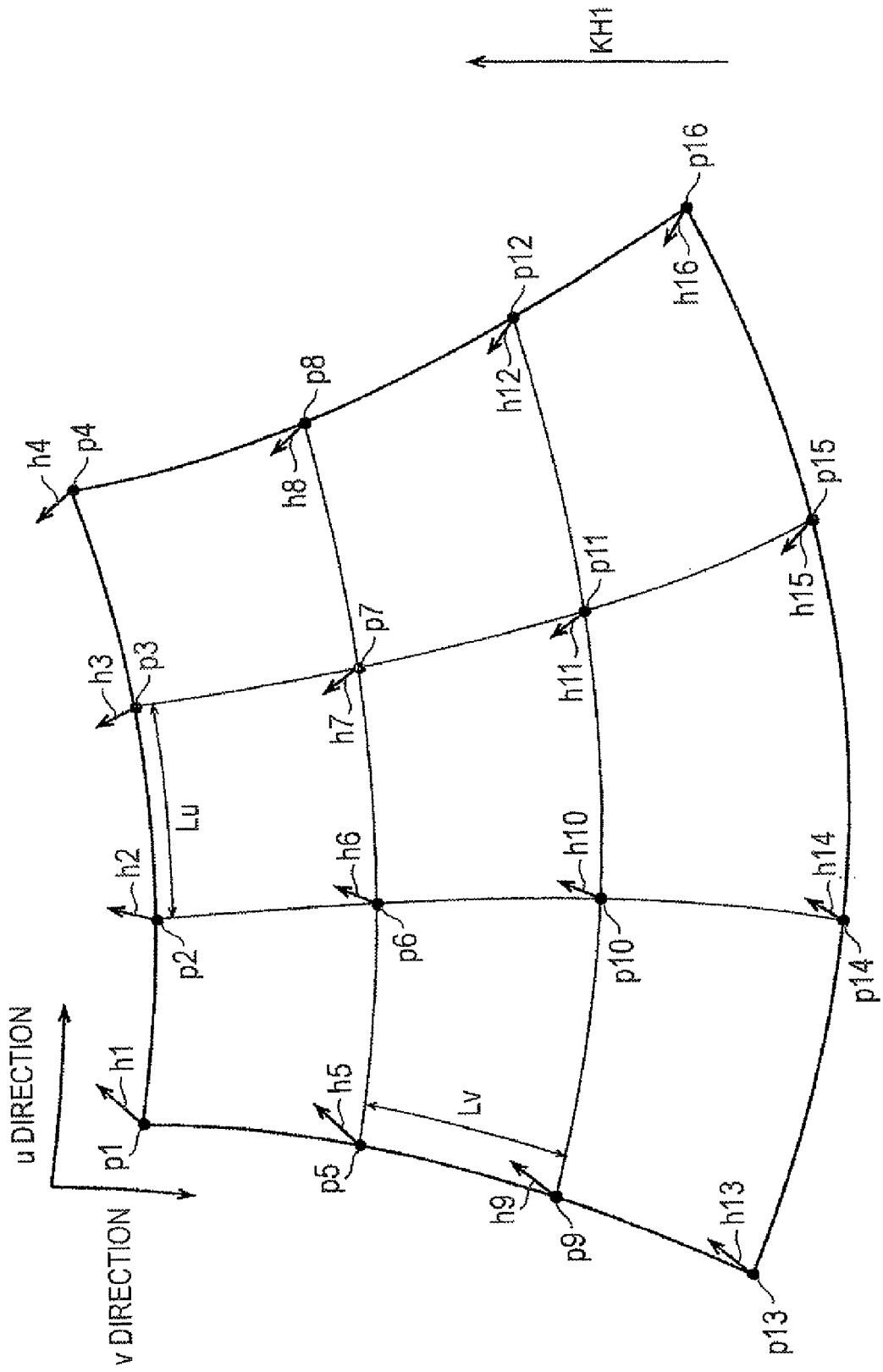

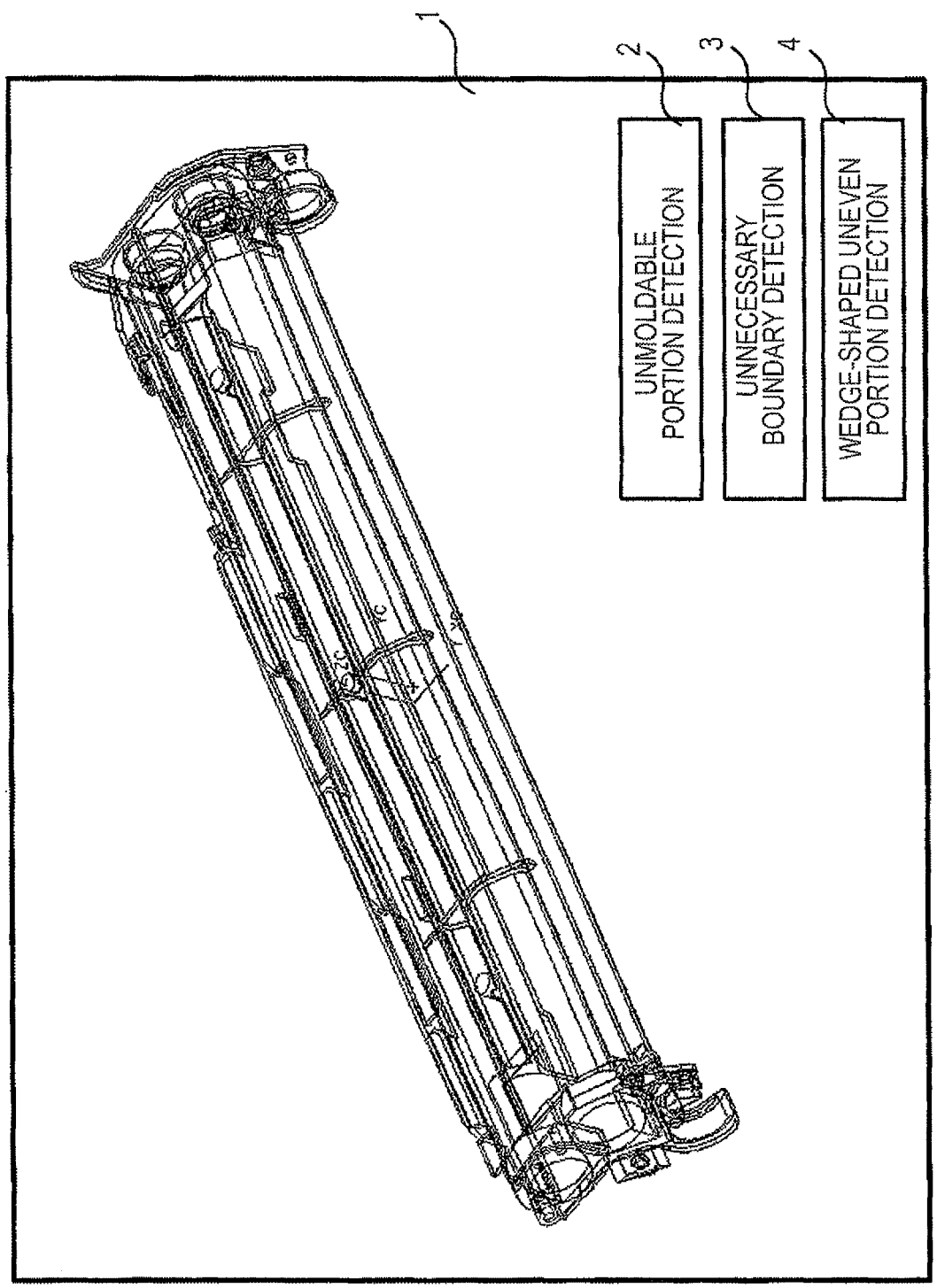

KH1: +Z DIRECTION
KH2: -Z DIRECTION
KH3: ±X DIRECTION, ±Y DIRECTION

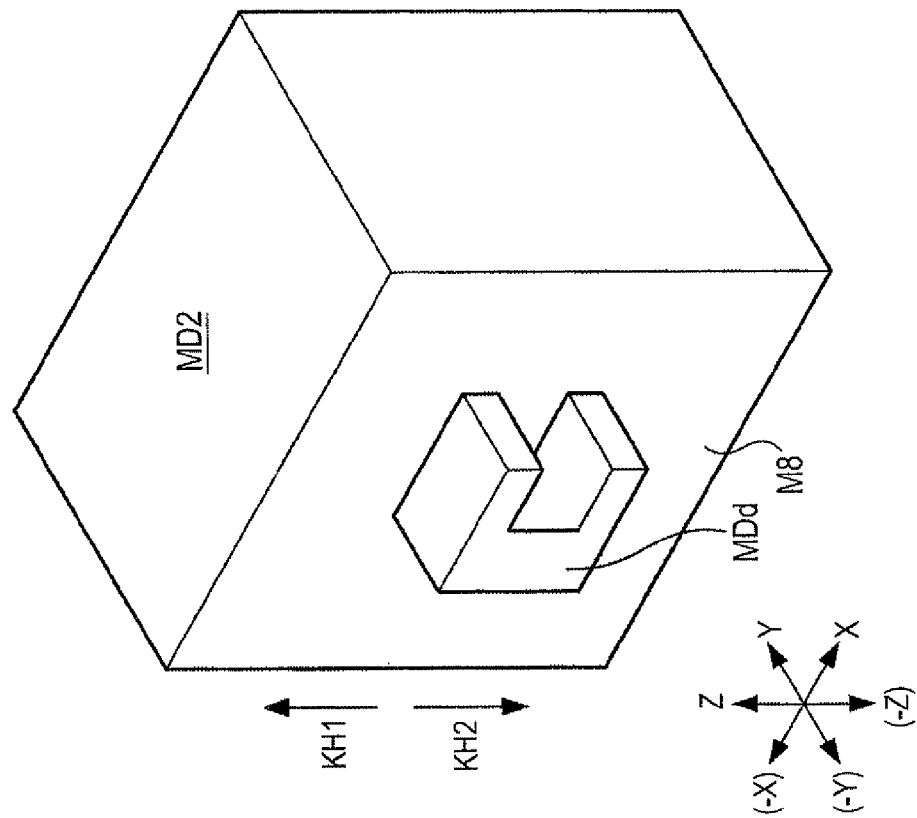
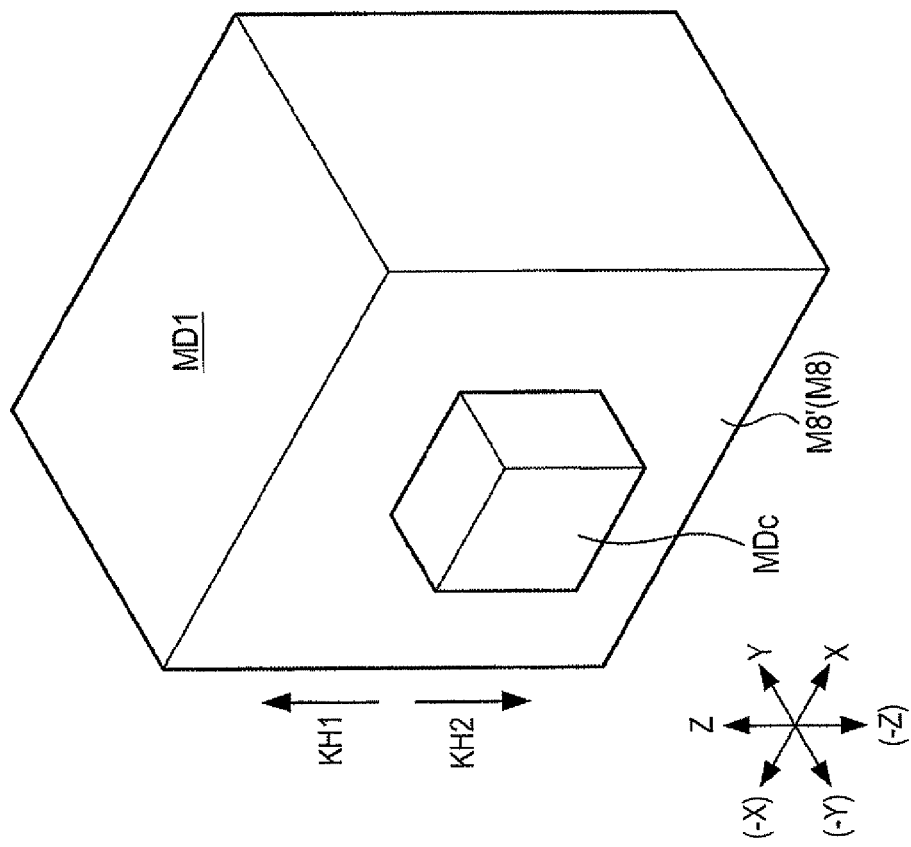

THIRD MOLDABLE PORTION DETECTION PROCESSING OF CLIENT PERSONAL COMPUTER PC (SUBROUTINE OF ST104)

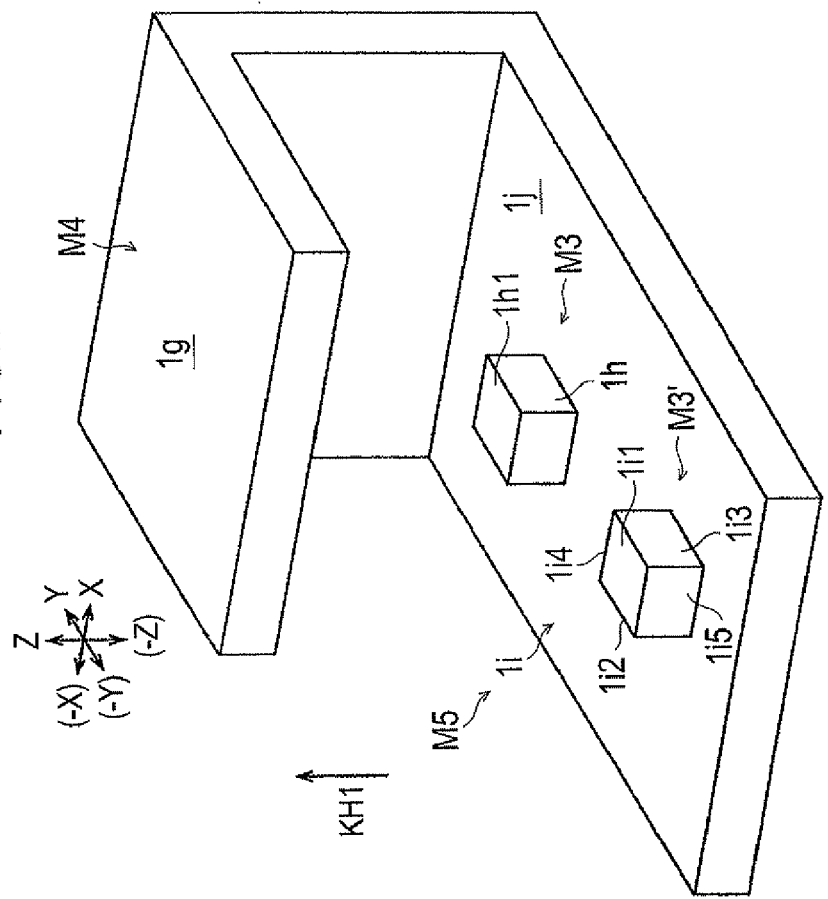
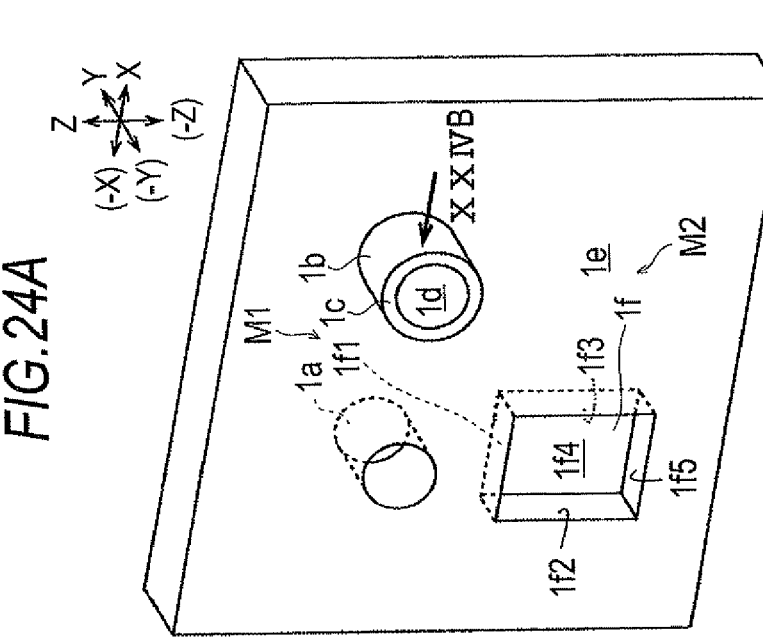
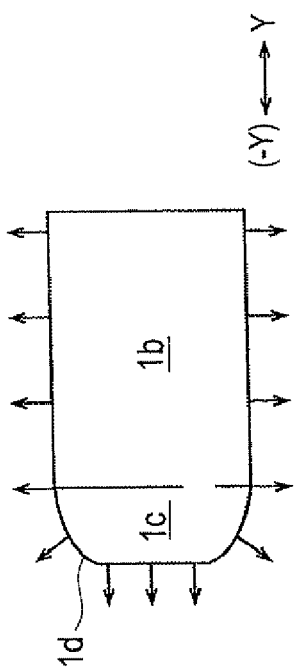

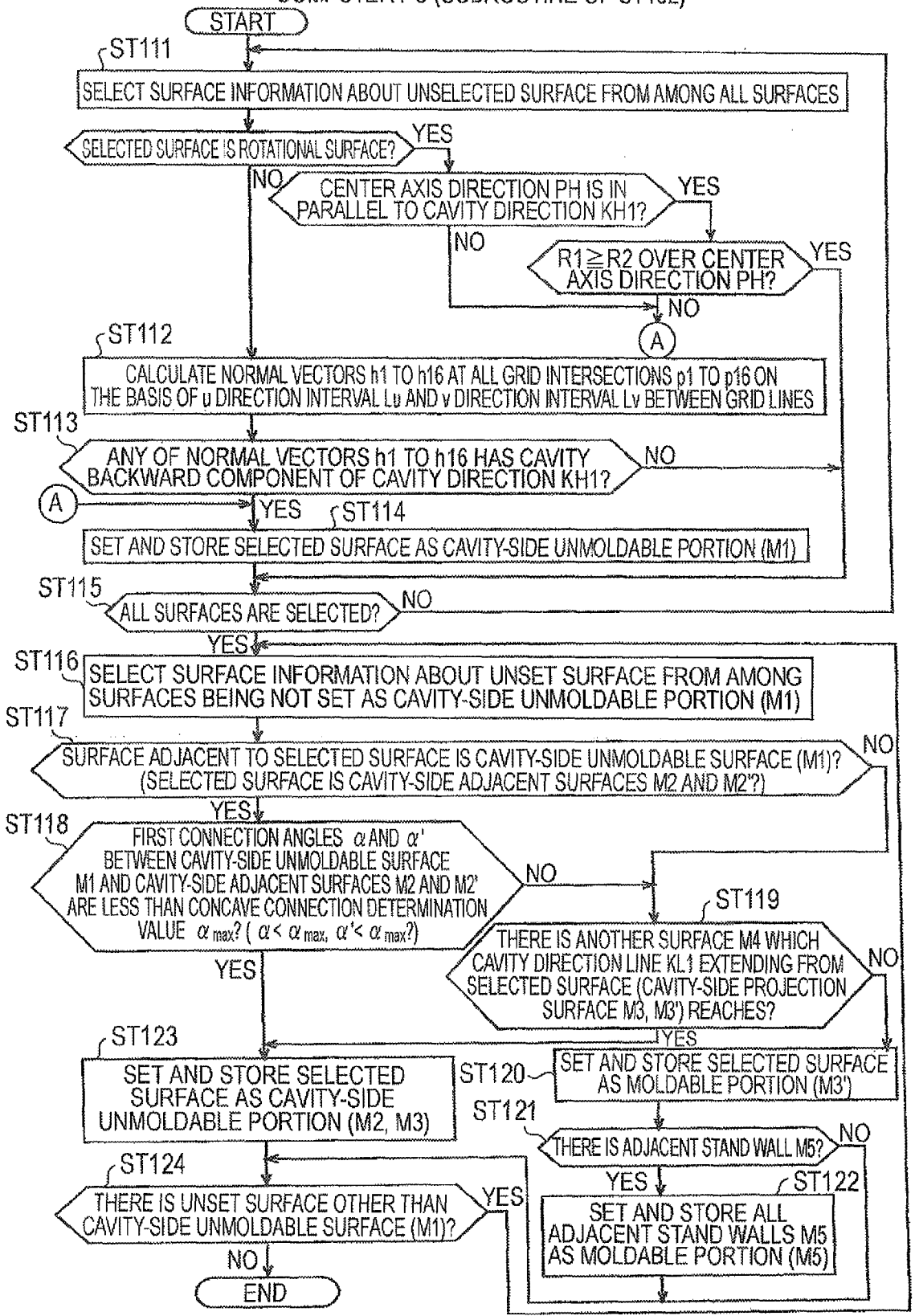

UNMOLDABILITY DETERMINATION APPARATUS, COMPUTER READABLE MEDIUM, AND UNMOLDABILITY DETERMINATION METHOD

CROSS-REFERENCE TO RELATED APPLICATIONS

This application is based on and claims priority under 35 USC 119 from Japanese Patent Application No. 2009-219424 filed Sep. 24, 2009.

BACKGROUND

Technical Field

The present invention relates to an unmoldability determination apparatus, a computer readable medium, and an unmoldability determination method.

SUMMARY

According to an aspect of the invention, there is provided an unmoldability determination apparatus including: a normal line calculation unit that calculates a normal line extending from a point on each of surfaces constituting a three-dimensional shape of a molded product; an opposite direction component determination unit that determines whether or not the normal line calculated on each surface has an opposite direction component which is a directional component opposite to a mold release direction of a mold of the molded product prescribed for the each surface; a reach determination unit that, when a surface having a point at which the normal line having the opposite direction component is calculated is a projection surface, determines whether or not there is another surface on the molded product which one of a line extending from the projection surface in the mold release direction and a line extending in a direction opposite to the mold release direction reaches; and an unmoldability determination unit that, when there is another surface which both of the line extending from the projection surface in the mold release direction and the line extending in the direction opposite to the mold release direction reaches, determines the projection surface to be unreleasable from the mold only by movement of the mold in the mold release direction, thus determining the projection surface to be unmoldable.

BRIEF DESCRIPTION OF THE DRAWINGS

Exemplary embodiments of the present invention will be described in detail based on the following figures, wherein:

FIG. 7 is a partially enlarged explanatory view showing the relationship between a normal vector and a cavity direction at a grid intersection of grid lines in u and v directions on a surface of a molded product;

FIG. 8 is an explanatory view of a molded product image of the first exemplary embodiment;

FIGS. 13A and 13B are explanatory views of an unmoldable portion and a moldable portion of the first exemplary embodiment;

FIGS. 24A to 24C are explanatory views of the operations of the first exemplary embodiment;

FIG. 33 is a flowchart of unmoldable portion detection processing of the second exemplary embodiment.

DETAILED DESCRIPTION

Figure 1:
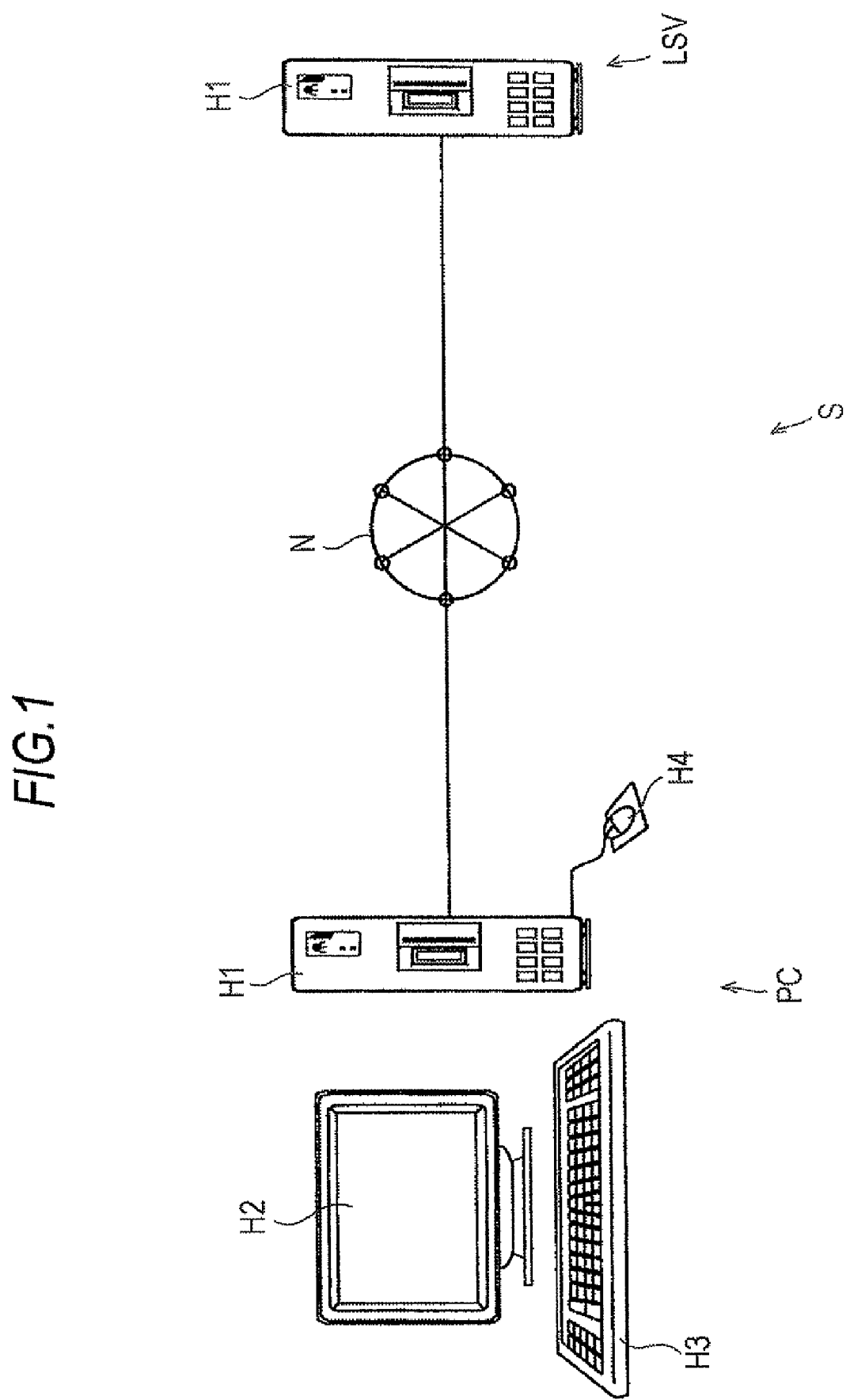
FIG. 1 is an overall explanatory view of a moldability determination system according to a first exemplary embodiment of the invention.

Specific examples (exemplary embodiments) of the invention will now be described with reference to the drawings. However, it should be noted that the invention is not limited to the following exemplary embodiments.

For ease of understanding, in the drawings, the front-back direction is referred to as the X-axis direction, the left-right direction is referred to as the Y-axis direction, and the up-down direction is referred to as the Z-axis direction. The positive and negative directions of the axes are indicated by arrows X, –X, Y, –Y, Z, and –Z. The directions and sides indicated by the arrows X, –X, Y, –Y, Z, and –Z are respectively referred to as forward, backward, rightward, leftward, upward, and downward, or the front side, the back side, the right side, the left side, the upper side, and the lower side.

In the drawings, a reference sign represented by included in "O" is defined as an arrow that represents a direction from the rear to the front, and a reference sign represented by "x" included in "O" is defined as an arrow that represents a direction from the front to the rear.

In the description with reference to the drawings, for ease of understanding, parts other than necessary configuration or members are appropriately omitted.

First Exemplary Embodiment

FIG. 1 is an overall explanatory view of a moldability determination system according to a first exemplary embodiment of the invention.

Referring to FIG. 1, a moldability determination system S including the functions of the moldability determination system according to the first exemplary embodiment has a client personal computer PC, which is an example of an unmoldability determination apparatus including the functions of an unmoldability determination apparatus for drawing each of molded products constituting a product, such as a mechanical product. The client personal computer PC is connected to a license server LSV, which is an example of a moldability determination licensing apparatus for giving a license of the moldability determination system S to the authorized client personal computer PC, through a network N, which is an example of an information communication line. The network N of the first exemplary embodiment is formed by a so-called Internet communication line.

The client personal computer PC and the license server LSV of the first exemplary embodiment are formed by a computer apparatus, which is an example of an electronic calculator.

The client personal computer PC of the first exemplary embodiment includes a computer main body H1 which is an example of a calculator main body, a display H2 which is an example of an output display device, a keyboard H3 and a mouse H4 which are examples of input devices, an HD drive (Hard Disc Drive) (not shown) which is an example of a storage device, and a CD drive (Compact Disc Drive) which is an example of a storage medium reading device. Similarly to the client personal computer PC, the license server LSV of the first exemplary embodiment includes a computer main body H1, a hard disc drive (not shown), a CD drive, and the like.

Description of Controller of First Exemplary Embodiment

Figure 2:
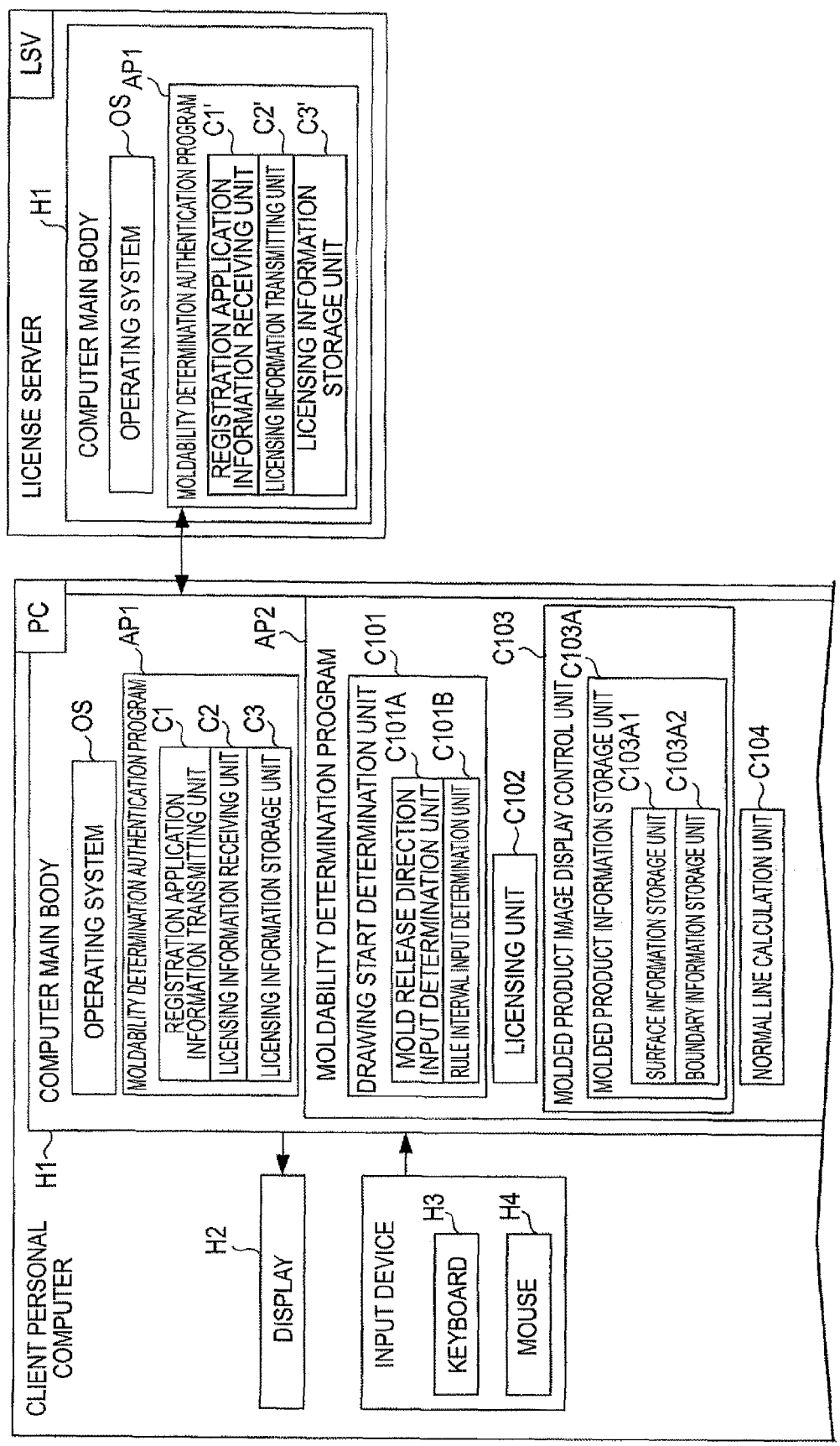
FIG. 2 is a functional block diagram showing the functions of controllers in a client personal computer and a license server of the first exemplary embodiment.

FIG. 2 is a functional block diagram showing the functions of controllers in a client personal computer and a license server of the first exemplary embodiment.

Figure 3:
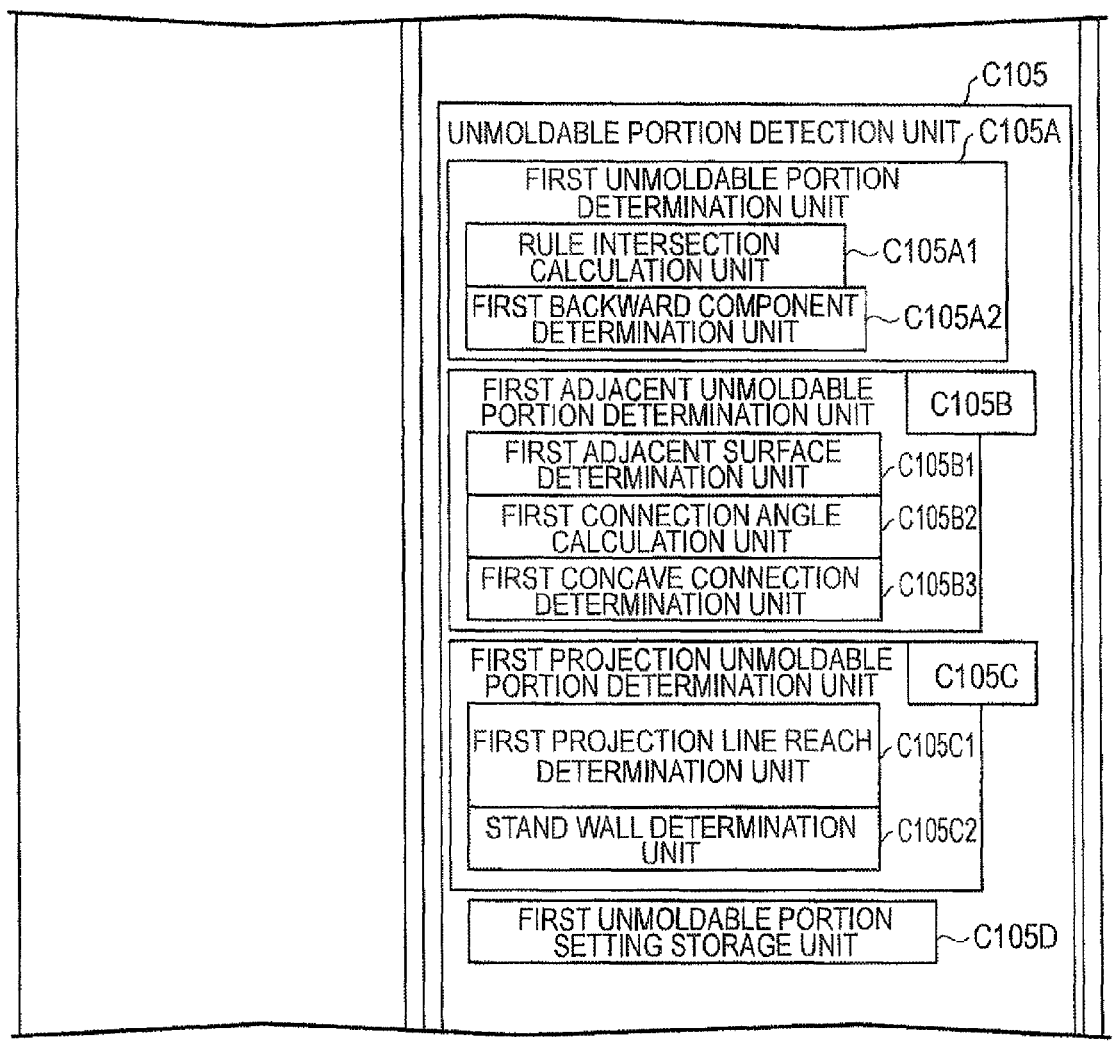
FIG. 3 is a functional block diagram following FIG. 2.
Figure 4:
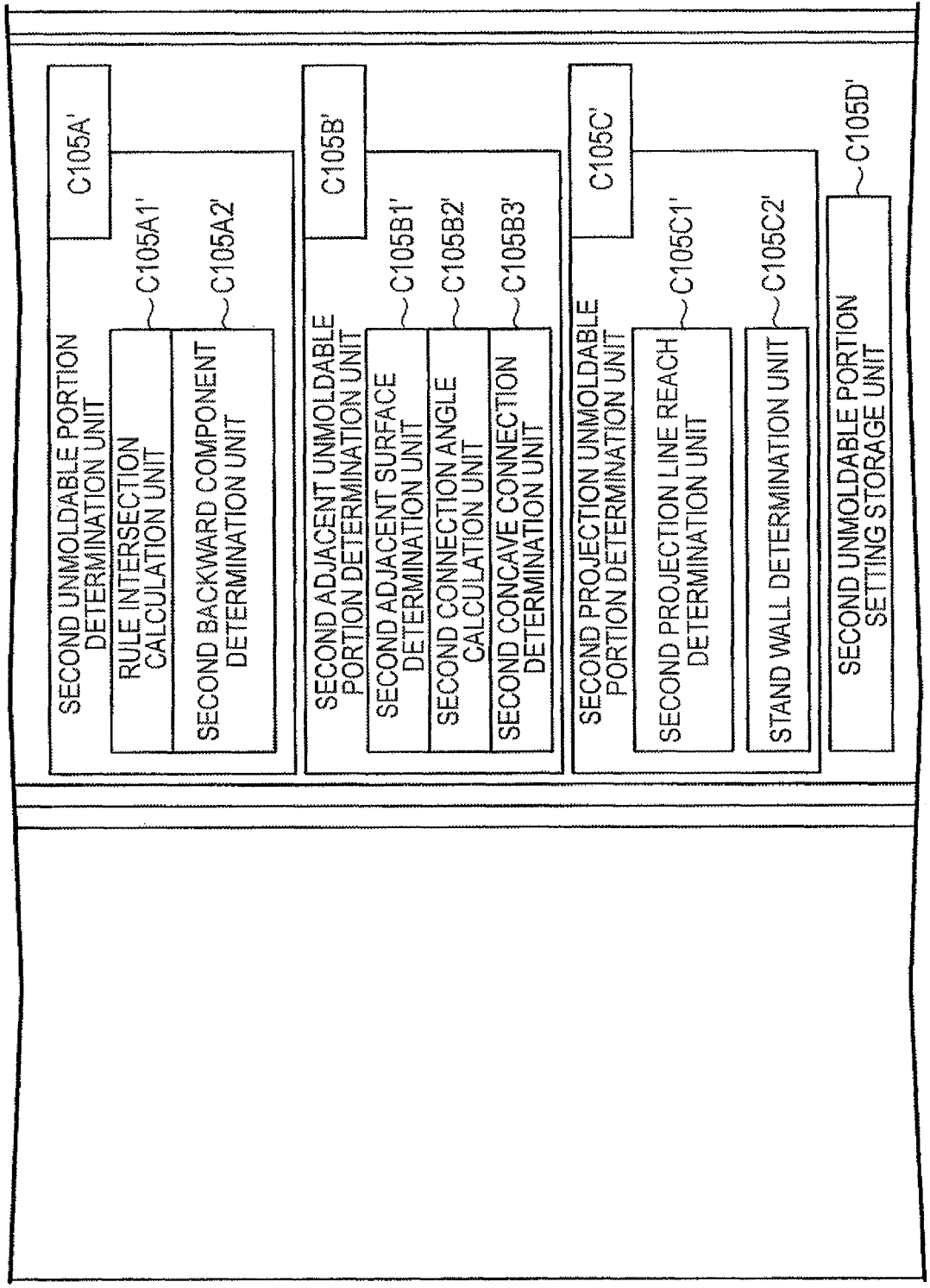
FIG. 4 is a functional block diagram following FIG. 3.
Figure 5:
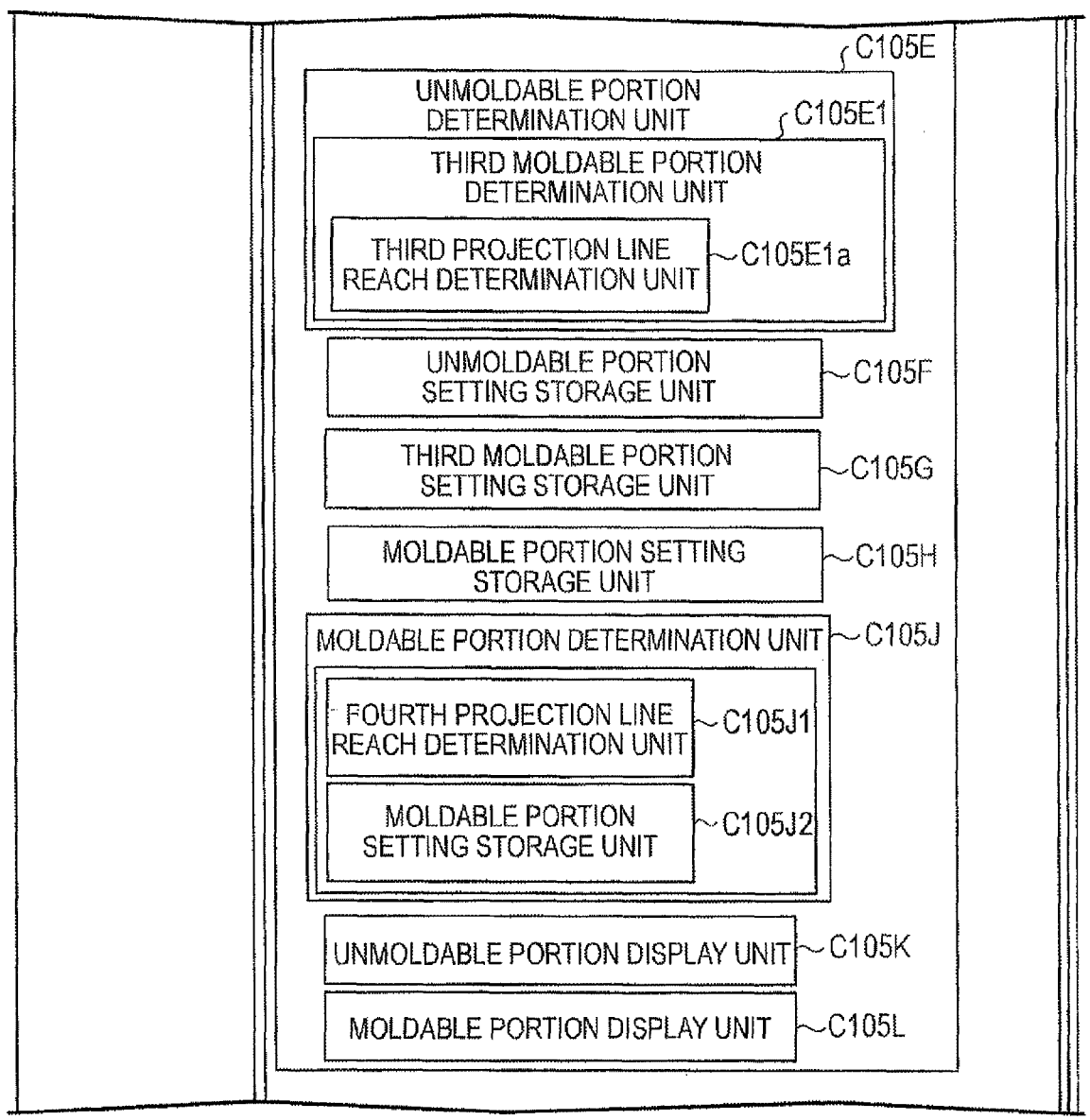
FIG. 5 is a functional block diagram following FIG. 4.
Figure 6:
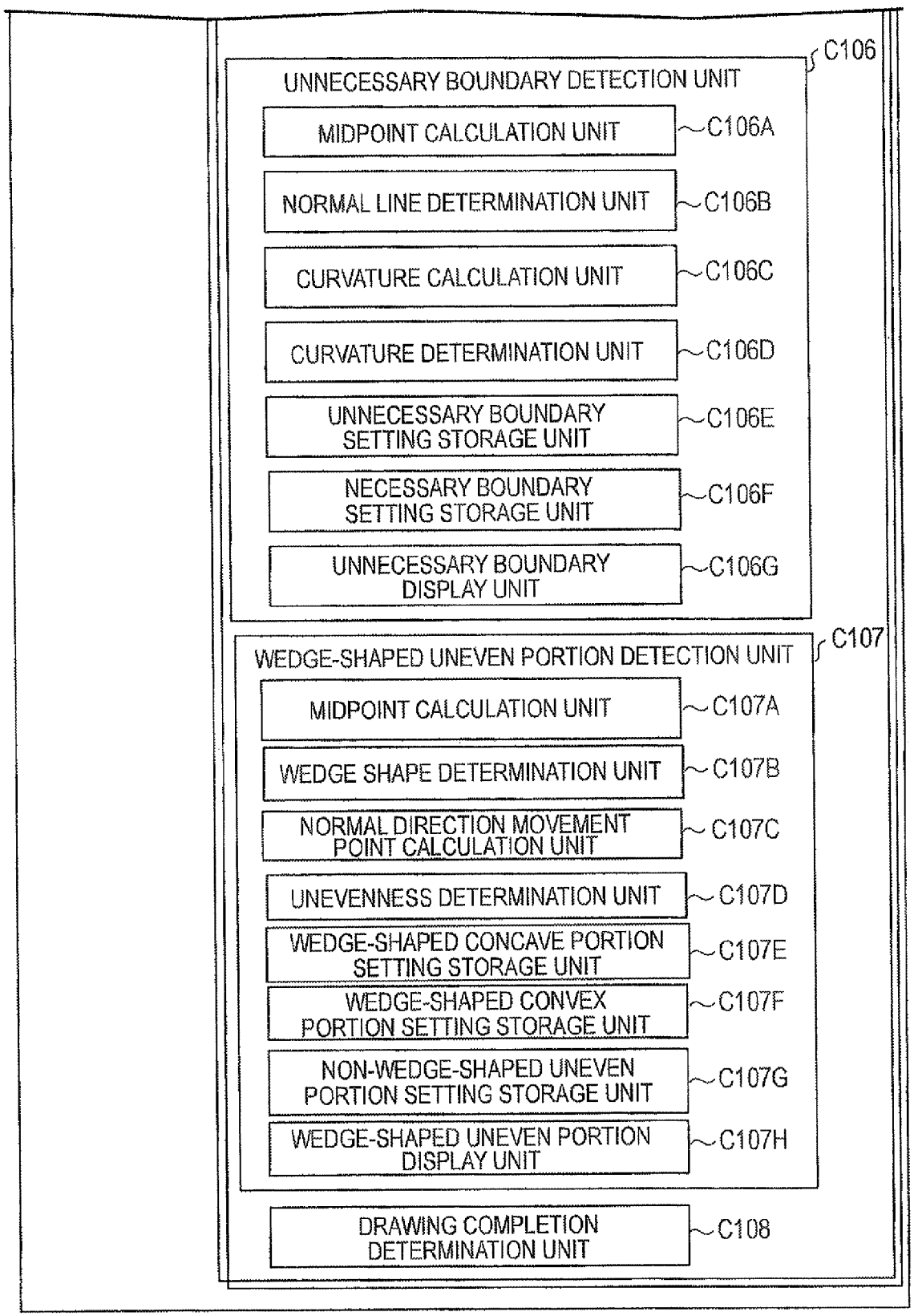
FIG. 6 is a functional block diagram following FIG. 5.

FIG. 3 is a functional block diagram following FIG. 2.

(Description of Controller of Client Personal Computer PC)

Referring to FIGS. 2 to 6, the computer main body H1 of the client personal computer PC has an I/O (Input/Output Interface) that performs input/output of signals to/from the outside and adjusts the levels of the input/output signals, a ROM (Read Only Memory) that stores programs and data for necessary processing, a RAM (Random Access Memory) that temporarily stores necessary data, a CPU (Central Processing Unit) that performs processing in accordance with programs stored in a hard disc, and a clock oscillator.

Such a client personal computer PC may implement various functions by executing the programs stored in the hard disc or the ROM.

The hard disc of the client personal computer PC stores application programs, such as an operating system OS, which is basic software for controlling the basic operations of the computer apparatus, a moldability determination authentication program AP1 that acquires licensing information of the moldability determination system S from the license server LSV, a moldability determination program AP2 that includes the functions of a program for drawing each molded product, word processor software (not shown) for document creation, and software for electronic mail transmission and reception. Hereinafter, the functions (control unit) of the programs AP1 and AP2, excluding the known operating system OS and application programs (not shown), will be described.

(Moldability Determination Authentication Program AP1)

The moldability determination authentication program AP1 has a registration application information transmitting unit C1 that transmits registration application information, which is information about application for registration to the moldability determination system S, a licensing information receiving unit C2 that receives licensing information, which is information about a license of the moldability determination system S, and a licensing information storage unit C3 that stores the licensing information. The client personal computer PC of the first exemplary embodiment transmits/receives information to/from the license server LSV, and acquires the licensing information on the basis of the registration application information, thereby obtaining the license of the moldability determination system S.

(Moldability Determination Program AP2)

FIG. 7 is a partially enlarged explanatory view showing the relationship between a normal vector and a cavity direction at a grid intersection of grid lines in u and v directions on a surface of a molded product.

C101: Drawing Start Determination Unit

The drawing start determination unit C101 has a mold release direction input determination unit C101A and a rule interval input determination unit C101B, and determines whether or not the moldability determination system S starts to draw a molded product.

C101A: Mold Release Direction Input Determination Unit

The mold release direction input determination unit C101A determines whether or not a mold release direction of a mold of the molded product shown in FIG. 7 is input. The mold release direction input determination unit C101A of the first exemplary embodiment determines whether or not a cavity direction KH1 and a core direction KH2 are input. The cavity direction KH1 is an example of a first mold release direction which is a mold release direction of a cavity plate, called a female mold, which is an example of a first mold of a molded product. The core direction KH2 is an example of a second mold release direction which is a mold release direction of a core plate, called a male mold, which is an example of a second mold corresponding to the female mold, and is opposite to the cavity direction. In the mold release direction input determination unit C101A of the first exemplary embodiment, for example, the up direction, that is, the +Z direction is input as the cavity direction KH1, and the down direction, that is, the −Z direction is input as the core direction KH2.

C101B: Rule Interval Input Determination Unit

The rule interval input determination unit C101B determines whether or not a u direction interval Lu and a v direction interval Lv between grid lines on each surface of the molded product shown in FIG. 7 is input.

C102: Licensing Unit

The licensing unit C102 executes licensing processing to determine whether the client personal computer PC obtains an authorized license of the moldability determination system S or not on the basis of the licensing information stored in the licensing information storage unit C3.

FIG. 8 is an explanatory view of a molded product image of the first exemplary embodiment.

C103: Molded Product Image Display Control Unit

A molded product image display control unit C103, which is an example of a molded product display unit, has a molded product information storage unit C103A, and controls display of a molded product image 1 obtained from information about a three-dimensional shape of the molded product shown in FIG. 8. Referring to FIG. 8, in the molded product image 1 of the first exemplary embodiment, a developer container of a developing device in an image forming apparatus is displayed as an example of the molded product. The molded product image 1 has an unmoldable portion detection button 2 that is used to execute unmoldable portion detection processing for detecting an unmoldable portion (M8), called an undercut, to be unmoldable only by movement in one direction of a mold of the molded product shown in FIGS. 11A and 11B, an unnecessary boundary detection button 3 that is used to execute unnecessary boundary detection processing for detecting an unnecessary boundary (L1), that is, an unnecessary boundary dividing two surfaces (FM1, FM2), which should be the same surface, from among boundaries L dividing surfaces of the molded product shown in FIG. 14A described below, and a wedge-shaped uneven portion detection button 4 that is used to execute wedge-shaped uneven portion detection processing for detecting a wedge-shaped concave portion (E1), called a mold edge, and a wedge-shaped convex portion (E2), called a product edge, which are individually formed by connecting a first surface FM1 and a second surface FM2 at predetermined angles (β and β'), from among concave portions and convex portions formed by the boundary L and the first surface (FM1) and the second surface (FM2) connected to each other by the boundary L shown in FIGS. 16A and 16B described below.

C103A; Molded Product Information Storage Unit

The molded product information storage unit C103A has a surface information storage unit C103A1 that stores surface information about each surface of the molded product, and a boundary information storage unit C103A2 that stores boundary information, such as the coordinates of both ends of each boundary of the molded product. The molded product information storage unit C103A stores molded product information about the molded product including the surface information and the boundary information.

C104: Normal Line Calculation Unit

A normal line calculation unit C104 calculates a normal vector (h1 to h16, HV1, and HV2), which is an example of a normal line, at a normal line calculation point (p1 to p17, and P) set on the surface, at which the normal line is calculated. In the first exemplary embodiment, as the normal line calculation point (p1 to p17, and P), grid intersections (p1 to p16) on each surface shown in FIG. 7 and a midpoint (P) of each boundary shown in FIGS. 14A to 16B described below are used.

C105: Unmoldable Portion Detection Unit

An unmoldable portion detection unit C105 has a first unmoldable portion determination unit C105A, a first adjacent unmoldable portion determination unit C105B, a first projection unmoldable portion determination unit C105C, a first unmoldable portion setting storage unit C105D, a second unmoldable portion determination unit C105A', a second adjacent unmoldable portion determination unit C105B', a second projection unmoldable portion determination unit C105C', a second unmoldable portion setting storage unit C105D', an unmoldable portion determination unit C105E, an unmoldable portion setting storage unit C105F, a third moldable portion setting storage unit C105G, a moldable portion setting storage unit C105H, a moldable portion determination unit C105J, an unmoldable portion display unit C105K, and a moldable portion display unit C105L. When the unmoldable portion detection button 2 is selected, the unmoldable portion detection unit C105 executes the unmoldable portion detection processing for detecting the unmoldable portion (M8).

C105A: First Unmoldable Portion Determination Unit

The first unmoldable portion determination unit C105A has a rule intersection calculation unit C105A1 and a first backward component determination unit C105A2. The first unmoldable portion determination unit C105A determines whether or not each surface is a cavity-side unmoldable portion (M1) or not on the basis of the normal vector (h1 to h16). The cavity-side unmoldable portion (M1) is an example of a first unmoldable portion which is unmoldable only by movement of the female mold in the cavity direction KH1.

C105A1: Rule Intersection Calculation Unit

As shown in FIG. 7, the rule intersection calculation unit C105A1 calculates the grid intersections p1 to p16 on each surface of the grid lines in the u and v directions on each surface and the boundary surrounding each surface on the basis of the u direction interval Lu and the v direction interval Lv input in advance.

C105A2: First Backward Component Determination Unit

As shown in FIG. 7, the first backward component determination unit C105A2 determines whether or not each of the normal vectors h1 to h16 calculated at the grid intersections p1 to p16 has a cavity backward component, which is an example of a first backward component, which is a directional component opposite to the cavity direction KH1 input in advance. Therefore, if any one of the normal vectors h1 to h16 has the cavity backward component, the first unmoldable portion determination unit C105A of the first exemplary embodiment determines that a corresponding surface is the cavity-side unmoldable portion (M1).

Figure 9A:
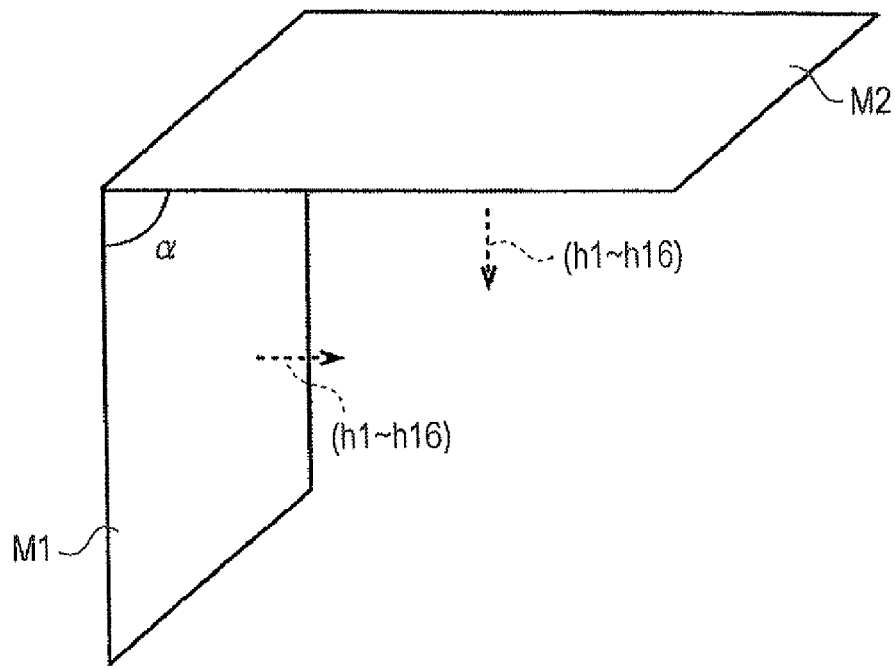
FIGS. 9A and 9B are partially enlarged explanatory views showing the relationship between a cavity-side unmoldable surface and a cavity-side concave connection surface of a molded product.
Figure 9B:
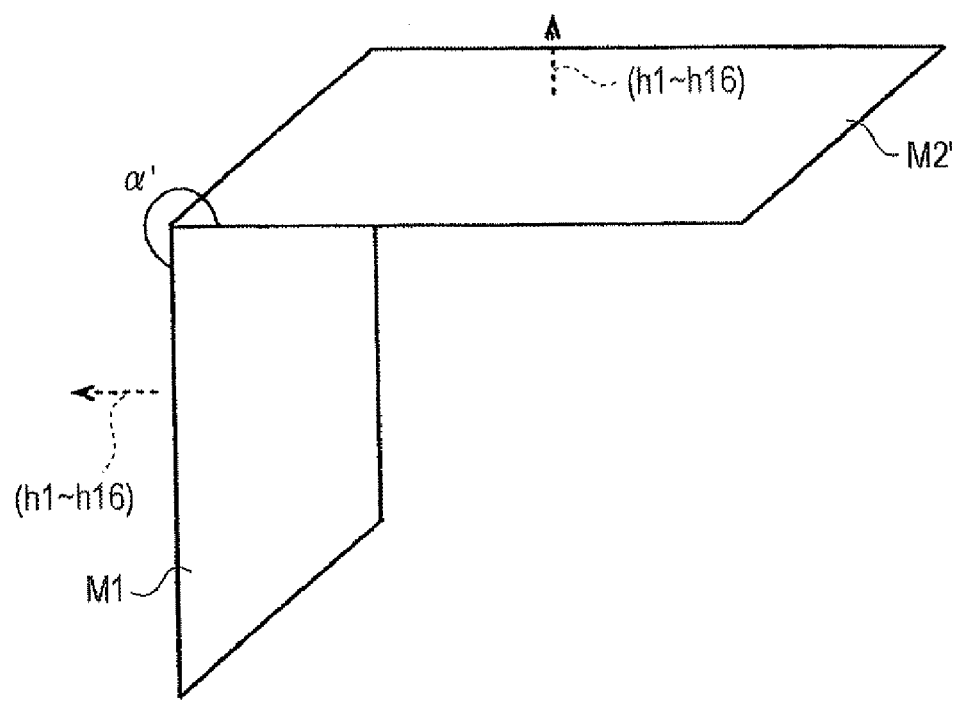

FIGS. 9A and 9B are partially enlarged explanatory views showing the relationship between a cavity-side unmoldable surface and a cavity-side concave connection surface of a molded product. FIG. 9A is an explanatory view showing a state where a cavity-side unmoldable surface and a cavity-side adjacent surface are concavely connected to each other. FIG. 9B is an explanatory view showing a state where a cavity-side unmoldable surface and a cavity-side adjacent surface are convexly connected to each other.

C105B: First Adjacent Unmoldable Portion Determination Unit

The first adjacent unmoldable portion determination unit C105B has a first adjacent surface determination unit C105B1, a first connection angle calculation unit C105B2, and a first concave connection determination unit C105B3. As shown in FIGS. 9A and 9B, it is assumed that the surface which is determined by the first unmoldable portion determination unit C105A as the cavity-side unmoldable portion (M1 to M3) is an cavity-side unmoldable surface M1, and the surface which is determined as not the cavity-side unmoldable surface M1 and is adjacent to the cavity-side unmoldable surface M1 is a cavity-side adjacent surface M2 or M2'. In this case, the first adjacent unmoldable portion determination unit C105B determines that a cavity-side concave connection surface M2, which is the cavity-side adjacent surface M2 concavely connected to the cavity-side unmoldable surface M1, is the cavity-side unmoldable portion (M2).

C105B1: First Adjacent Surface Determination Unit

The first adjacent surface determination unit C105B1 determines whether or not each surface which is determined as not the cavity-side unmoldable surface M1 is the cavity-side adjacent surface M2 or M2' shown in FIG. 9A or 9B. That is, the first adjacent surface determination unit C105B1 determines whether or not a surface adjacent to each surface, which is determined as not the cavity-side unmoldable surface M1, is the cavity-side unmoldable portion (M1 to M3).

C105B2: First Connection Angle Calculation Unit

The first connection angle calculation unit C105B2 calculates a connection angle α or α' which is an example of a first connection angle between the cavity-side adjacent surface M2 or M2' and the cavity-side unmoldable surface M1 adjacent to the cavity-side adjacent surface M2 or M2' shown in FIG. 9A or 9B. The first connection angle calculation unit C105B2 of the first exemplary embodiment calculates the connection angle α or α' on the basis of the normal vector (h1 to h16) which is an example of a first normal line on the cavity-side unmoldable surface M1 and the normal vector (h1 to h16) which is an example of a second normal line on the cavity-side adjacent surface M2 or M2'.

C105B3: First Concave Connection Determination Unit

The first concave connection determination unit C105B3 determines whether or not the cavity-side unmoldable surface M1 and the cavity-side adjacent surface M2 or M2' are concavely connected to each other, that is, the cavity-side adjacent surface M2 or M2' is the cavity-side concave connection surface M2. The first concave connection determination unit C105B3 of the first exemplary embodiment determines whether or not the connection angle α or α' calculated by the first connection angle calculation unit C105B2 is less than a prescribed concave connection determination value $\alpha_{max}$, thereby determining whether or not the cavity-side unmoldable surface M1 and the cavity-side adjacent surface M2 or M2' are concavely connected to each other. In the first exemplary embodiment, for example, the concave connection determination value $\alpha_{max}$ may be set to 180° in advance. Therefore, the first adjacent unmoldable portion determination unit C105B of the first exemplary embodiment determines that the cavity-side concave connection surface M2 concavely connected to the cavity-side unmoldable portion (M1 to M3) is the cavity-side unmoldable portion (M1 and M2).

Figure 10A:
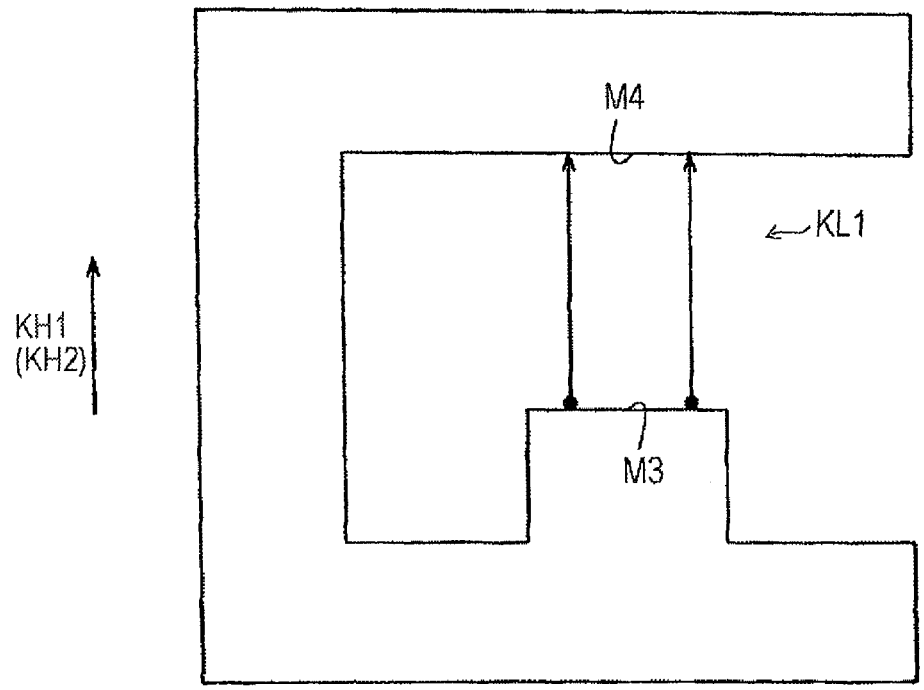
FIGS. 10A and 10B are partially enlarged explanatory views of a cavity direction line which extends from a cavity-side projection surface of a molded product.
Figure 10B:
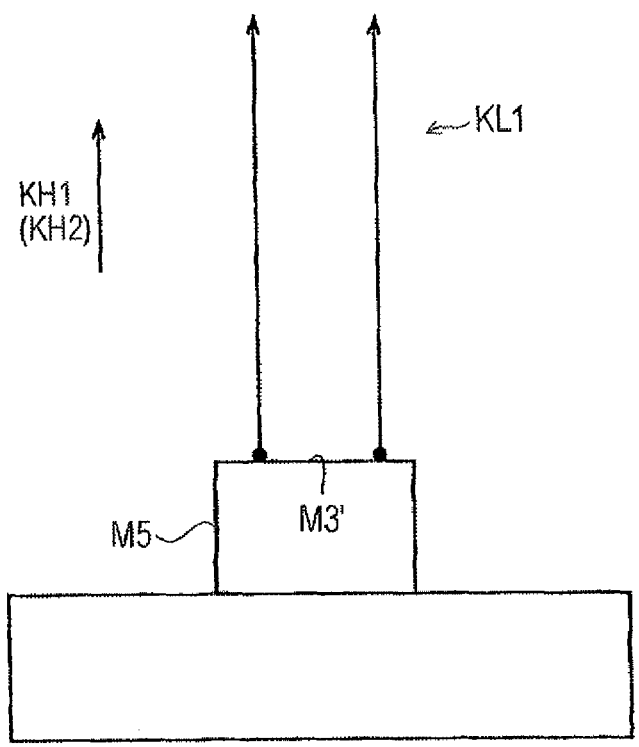

FIGS. 10A and 10B are partially enlarged explanatory views of a cavity direction line which extends from a cavity-side projection surface of a molded product. FIG. 10A is a sectional view showing a state where there is another surface which a cavity direction line reaches. FIG. 10B is a sectional view showing a state where there is no surface which a cavity direction line reaches.

C105C: First Projection Unmoldable Portion Determination Unit

The first projection unmoldable portion determination unit C105C has a first projection line reach determination unit C105C1 and a stand wall determination unit C105C2. As shown in FIGS. 10A and 10B, when it is assumed that each surface (M2') is a cavity-side projection surface M3 or M3', the first projection unmoldable portion determination unit C105C determines whether the cavity-side projection surface M3 or M3' is the cavity-side unmoldable portion (M1 to M3) on the basis of the cavity direction line KL1 which is an example of a first mold release direction line extending from the cavity-side projection surface M3 or M3' in the cavity direction KH1. With regard to each surface (M2') which is not determined as the cavity-side unmoldable portion (M1, M2) by the first unmoldable portion determination unit C105A and the first adjacent unmoldable portion determination unit C105B, the first projection unmoldable portion determination unit C105C of the first exemplary embodiment determines whether or not the cavity-side projection surface M3 or M3' is the cavity-side unmoldable portion (M1 to M3).

C105C1: First Projection Line Reach Determination Unit

As shown in FIGS. 10A and 10B, the first projection line reach determination unit C105C1 determines whether or not there is another surface M4 which the cavity direction line KL1 extending from the cavity-side projection surface M3 or M3' reaches. Therefore, the first projection unmoldable portion determination unit C105C of the first exemplary embodiment determines that the cavity-side projection surface M3 having the surface M4 is the cavity-side unmoldable portions M1 to M3.

C105C2: Stand Wall Determination Unit

The stand wall determination unit C105C2 determines whether or not there is a stand wall M5 shown in FIG. 10B, which is a surface adjacent to the cavity-side projection surface M3' not having the surface M4 and in parallel to the cavity direction line KL1. Therefore, the first projection unmoldable portion determination unit C105C of the first exemplary embodiment determines that the cavity-side projection surface M3' not having the surface M4 and the stand wall M5 are not the cavity-side unmoldable portions M1 to M3.

C105D: First Unmoldable Portion Setting Storage Unit

The first unmoldable portion setting storage unit C105D sets and stores the surfaces M1 to M3, which are determined by the first unmoldable portion determination unit C105A as the cavity-side unmoldable portions M1 to M3, the first adjacent unmoldable portion determination unit C105B, the first projection unmoldable portion determination unit C105C, as the cavity-side unmoldable portions M1 to M3, respectively.

If a mark "'" is suffixed to each of reference numerals C105A, C105A1, C105A2, C105B, C105B1 to C105B3, C105C, C105C1, C105C2, and C105D and the terms "first", "female mold", "cavity", "KH1", and "KL1" are respectively substituted with the terms "second", "male mold", "core", "KH2", and "KL2", the descriptions of the first unmoldable portion determination unit C105A, the first adjacent unmoldable portion determination unit C105B, the first projection unmoldable portion determination unit C105C, and the first unmoldable portion setting storage unit C105D can also be applied to the second unmoldable portion determination unit C105A', the second adjacent unmoldable portion determination unit C105B', the second projection unmoldable portion determination unit C105C', and the second unmoldable portion setting storage unit C105D', and thus the detailed descriptions thereof will be omitted.

C105E: Unmoldable Portion Determination Unit

The unmoldable portion determination unit C105E has a third moldable portion determination unit C105E1, and determines whether or not the cavity-side unmoldable portions M1 to M3 stored in the first unmoldable portion setting storage unit C105D are the unmoldable portion (M8) to be unmoldable by movement of the male mold in the core direction KH2 and movement of a slide core, which is an example of a third mold different from the female mold and the male mold, in a standard slide direction KH3, which is an example of a third mold release direction different from the cavity direction KH1 and the core direction KH2. The unmoldable portion determination unit C105E determines whether or not the core-side unmoldable portions M1 to M3 stored in the second unmoldable portion setting storage unit C105D' are the unmoldable portion (M8) to be unmoldable by movement of the female mold in the cavity direction KH1 and movement of the slide core in the standard slide direction KH3.

When the mold release direction input determination unit C101A determines that the +Z direction is input as the cavity direction KH1 and the –Z direction is input as the core direction KH2, the standard slide direction KH3 of the first exemplary embodiment is set in advance so as to be line, which connects the cavity direction line KL1 and the core direction line KL2, that is, a line on the XY plane orthogonal to a line in the Z-axis direction. Specifically, when the cavity direction line KL1 is a line in the +Z direction and the core direction line KL2 is a line in the –Z direction, a standard slide direction line KL3 is set in advance so as to be lines in four directions, that is, a ±X direction in the front-back direction and a ±Y direction as the left-right direction.

C105E1: Third Moldable Portion Determination Unit

The third moldable portion determination unit C105E1 has a third projection line reach determination unit C105E1a, and determines the cavity-side unmoldable portions M1 to M3, at which it is determined by the second projection line reach determination unit C105C1' that there is a surface M4 which the core direction line KL2 reaches and there is no surface which the standard slide direction line KL3, serving as an example of a third mold release direction line, extending in the standard slide direction KH3 reaches, as a third moldable portion (M6 and M7) to be moldable by movement of the slide core in the standard slide direction KH3. The third moldable portion determination unit C105E1 determines the core-side unmoldable portions M1 to M3, at which it is determined by the first projection line reach determination unit C105C1 that there is a surface M4 which the cavity direction line KL1 reaches and there is no surface which the standard slide direction line KL3 reaches, as the third moldable portion (M6 and M7).

C105E1a: Third Projection Line Reach Determination Unit

When the second projection line reach determination unit C105C1' determines that there is a surface M4 which the core direction line KL2 reaches, the third projection line reach determination unit C105E1a determines whether or not there is a surface which the standard slide direction line KL3 reaches from the cavity-side unmoldable portions M1 to M3 stored in the first unmoldable portion setting storage unit C105D. When the first projection line reach determination unit C105C1 determines that there is a surface M4 which the cavity direction line KL1 reaches, the third projection line reach determination unit C105E1a determines whether or not there is a surface which the standard slide direction line KL3 reaches from the core-side unmoldable portions M1 to M3 stored in the second unmoldable portion setting storage unit C105D'.

Figure 11A:
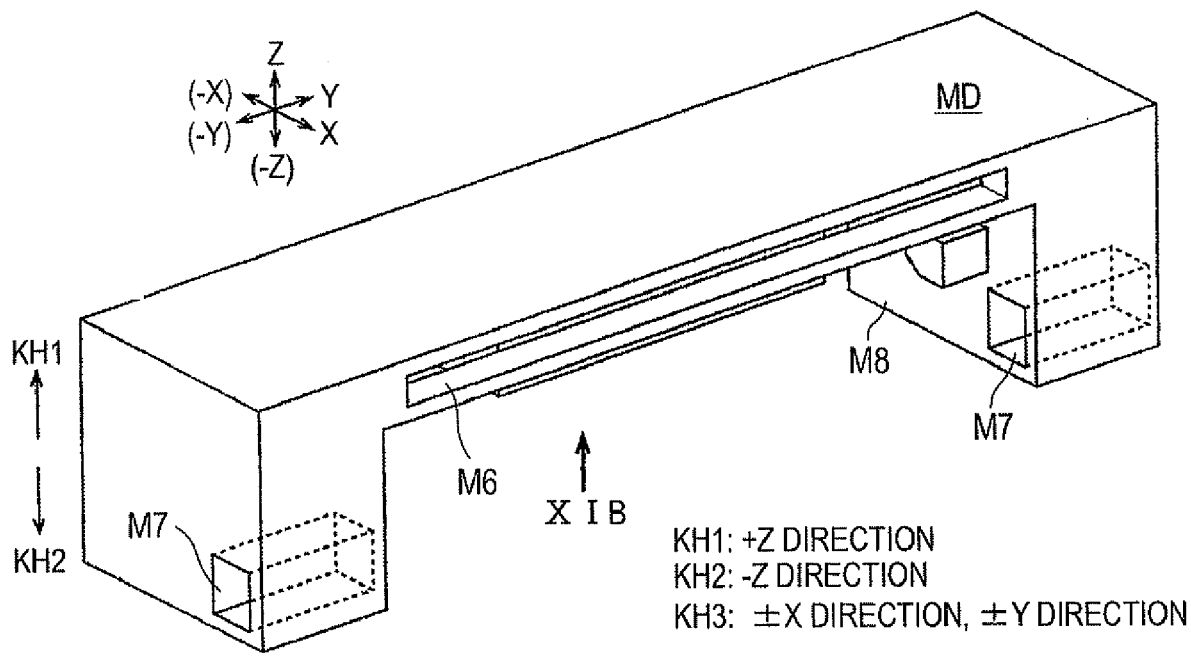
FIGS. 11A and 11B are explanatory views of an unmoldable portion and a third moldable portion of the first exemplary embodiment.
Figure 11B:
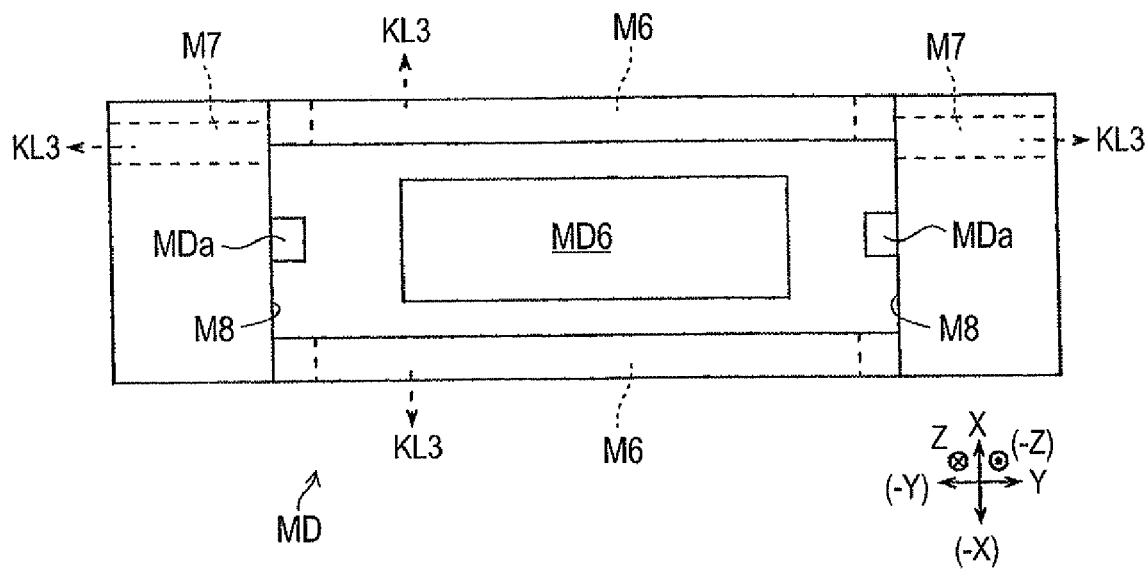

FIGS. 11A and 11B are explanatory views of an unmoldable portion and a third moldable portion of the first exemplary embodiment. FIG. 11A is a perspective explanatory view of a model MD of a molded product in which a cavity direction and a core direction are set in the up-down direction. FIG. 11B is an explanatory view when FIG. 11A is viewed from an XIB direction, which is a cavity direction.

As shown in FIGS. 11A and 11B, with regard to a molded product, the third projection line reach determination unit C105E1a of the first exemplary embodiment determines that the cavity direction line KL1 and the core direction line KL2 are set as lines in the ±Z direction. When the standard slide direction line KL3 is set as lines in the ±X direction as the lateral direction of the model MD of the molded product and lines in the ±Y direction as a longitudinal direction, the third projection line reach determination unit C105E1a determines whether there is a surface which the standard slide direction line KL3 reaches or not with respect to each of the surfaces (M6 to M8) which are the cavity-side unmoldable portions M1 to M3 or the core-side unmoldable portions M1 to M3 of the molded product.

Focusing on the surfaces M6, M7, and M8 shown in FIG. 11A or 11B which become the cavity-side unmoldable portions M1 to M3 and the core-side unmoldable portions M1 to M3, in case of the surface M6, there is no surface in the +X direction, and in case of the surface M7, there is no surface in the ±Y direction. In case of the surface M8, there are surfaces in all of the ±X direction and the ±Y direction, that is, there are the surfaces of the projections MDa and MDa. For this reason, with regard to the surface M6 and M7, the third projection line reach determination unit C105E1a determines that there is no surface which the standard slide direction line KL3 reaches. With regard to the surface M8, it is determined that there is a surface which the standard slide direction line KL3 reaches.

Therefore, the third moldable portion determination unit C105E1 of the first exemplary embodiment determines that the surfaces M6 and M7 are the third moldable portion, and also determines that the surface M8 is not the third moldable portion. That is, the unmoldable portion determination unit C105E of the first exemplary embodiment determines that the surface M8 is the unmoldable portion, and also determines that the surfaces M6 and M7 are not the unmoldable portion.

C105F: Unmoldable Portion Setting Storage Unit

The unmoldable portion setting storage unit C105F sets and stores the surface M8, which is determined as the unmoldable portion M8 by the unmoldable portion determination unit C105E, as the unmoldable portion M8.

C105G: Third Moldable Portion Setting Storage Unit

The third moldable portion setting storage unit C105G sets and stores the surfaces M6 and M7, which are determined as the third moldable portions M6 and M7 by the third moldable portion determination unit C105E1, as the unmoldable portions M6 and M7.

C105H: Moldable Portion Setting Storage Unit

The moldable portion setting storage unit C105H sets and stores the surfaces (M3' and M5), which are not determined as the cavity-side unmoldable portions M1 to M3 and the core-side unmoldable portions M1 to M3 by the first projection unmoldable portion determination unit C105C and second projection unmoldable portion determination unit C105C', as moldable portions M3' and M5, which are surfaces with no undercut. The moldable portion setting storage unit C105H sets and stores the cavity-side unmoldable portions M1 to M3 and the core-side unmoldable portions M1 to M3, which are not determined as the unmoldable portion M8 and the third unmoldable portions M6 and M7 by the unmoldable portion determination unit C105E and the third moldable portion determination unit C105E1, as the moldable portions M1 to M3.

C105J: Moldable Portion Determination Unit

The moldable portion determination unit C105J has a fourth projection line reach determination unit C105J1, and determines whether or not the unmoldable portion M8 stored in the third unmoldable portion setting storage unit C105G becomes a moldable portion by changing a parting line of a mold combined from the cavity direction and the core direction.

C105J1: Fourth Projection Line Reach Determination Unit

Figure 12A:
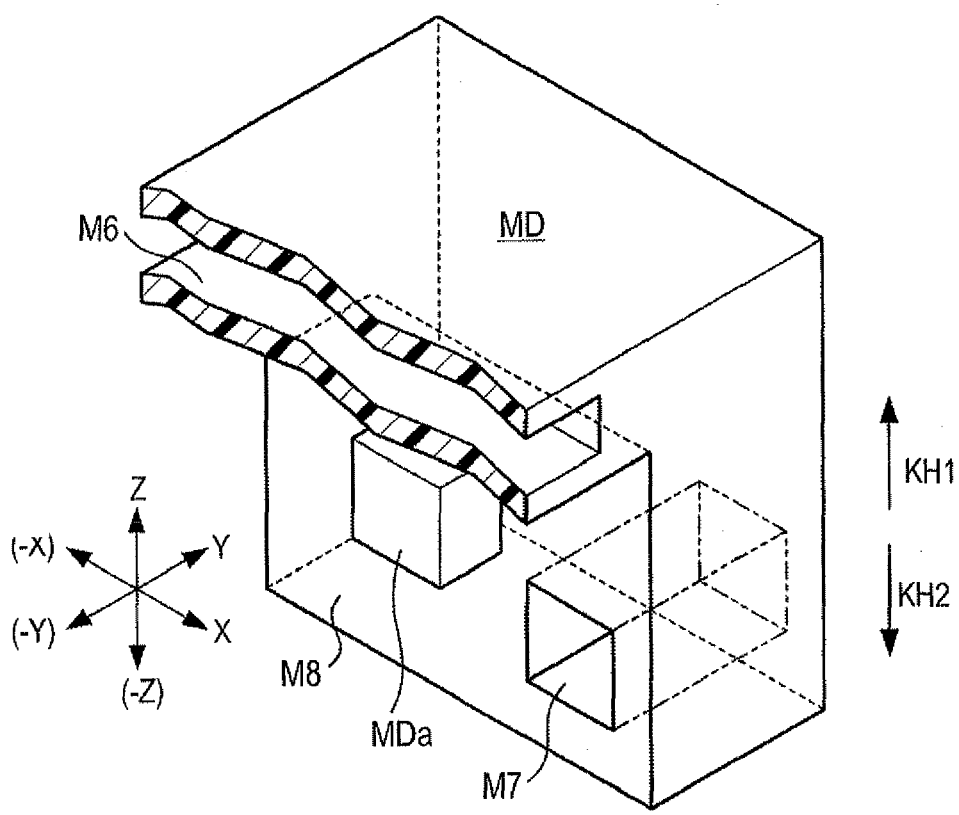
FIGS. 12A and 12B are explanatory views of an unmoldable portion and a moldable portion of the first exemplary embodiment.
Figure 12B:
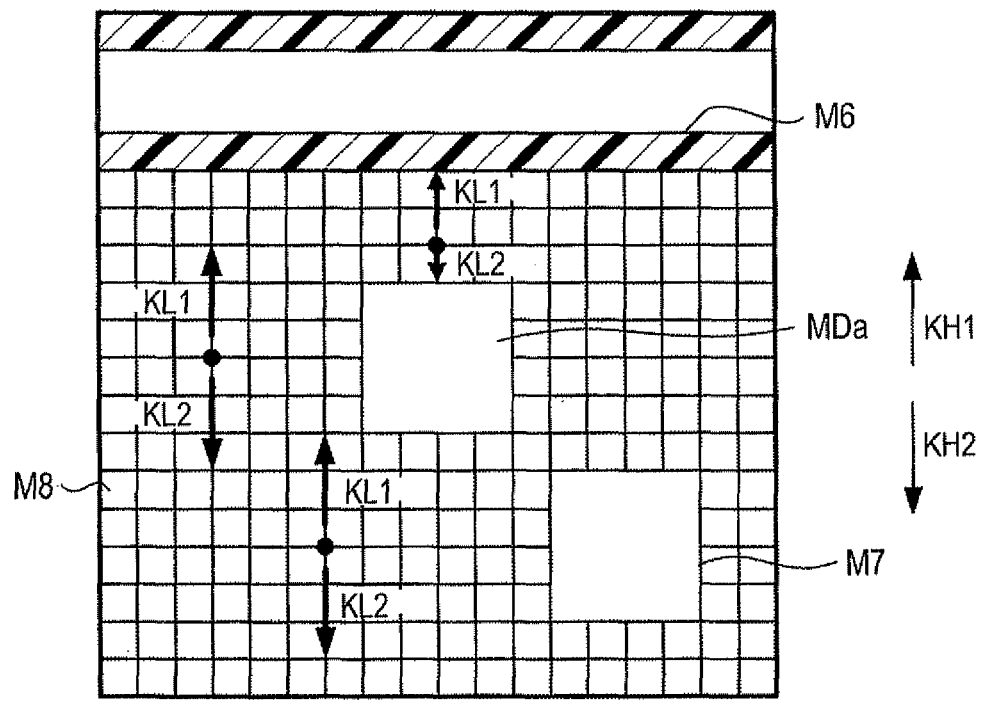

As shown in FIGS. 12A and 12B, the fourth projection line reach determination unit C105J1 determines whether or not there is a surface which the cavity direction line KL1 or the core direction line KL2 extending from the unmoldable portion M8 serving as a projection surface reaches. That is, when the unmoldable portion M8 is a projection surface, it is determined whether or not there is another surface which one of the line KL1 and the line KL2 extending from the projection surface in the cavity direction KH1 and the core direction KH2 reaches, or whether or not there is another surface which the lines KL1 and KL2 reach. Specifically, as shown in FIG. 12B, an arbitrary point (for example, a lattice shape) is set on the surface of the unmoldable portion M8, and the line KL1 and the line KL2 extending from the point in the cavity direction KH1 and the core direction KH2 are set. The unmoldable portion M8 has a projection MDa, so that the lines KL1 and KL2 extending from a point between the projection MDa and the upper side reach a surface in both directions. Therefore, the unmoldable portion M8 is identified as an unmoldable surface even if a parting line is provided.

For example, in case of a model MD shown in FIGS. 12A and 12B, when the projection MDa is not formed, the lines KL1 and KL2 do not reach a surface in both directions. Therefore, the unmoldable portion M8 becomes the moldable portion M8' by providing a parting line.

In case of models MD1 and MD2 shown in FIGS. 13A and 13B, the front surface is the unmoldable portion M8, and the unmoldable portion M8 has a projection MDc or MDd. In this case, the projection MDc is formed in a sectional square shape, and the projection MDd is opened in a lateral direction and formed in a sectional "U" shape. In case of model MD1, there is no surface which both the lines KL1 and KL2 reach, and the unmoldable portion M8 of the model MD1 becomes the moldable portion M8' Meanwhile, in case of the model MD2, there is a surface which both the lines KL1 and KL2 reach. Therefore, the unmoldable portion M8 of the model MD2 remains an unmoldable portion. That is, it is determined that the unmoldable portion M8 of the model MD1 is an unmoldable surface even if the parting line of the mold combined from the cavity direction and the core direction is changed.

In case of the model MD2, when the opening portion of the projection MDd goes toward the cavity direction KH1 or the core direction KH2 serving as the release direction of the mold, there is no surface which both the lines KL1 and KL2 reach. Therefore, similarly to the model MD1, the unmoldable portion M8 becomes the moldable portion M8' by setting the parting line of the mold combined from the cavity direction and the core direction.

C105J2: Moldable Portion Setting Storage Unit

The moldable portion setting storage unit C105J2 sets and stores each surface, which is determined as the moldable portion M8' by the fourth projection line reach determination unit C105J1, as the moldable portion M8'.

C105K: Unmoldable Portion Display Unit

The unmoldable portion display unit C105K serving as an example of a molded product display unit displays all the unmoldable portions M8 stored in the unmoldable portion setting storage unit C105F on the molded product image 1. The unmoldable portion display unit C105K of the first exemplary embodiment displays all the unmoldable portions M8 with red on the molded product image 1.

C105L: Moldable Portion Display Unit

The moldable portion display unit C105L serving as an example of a molded product display unit displays all the third moldable portions M6 and M7 stored in the third moldable portion setting storage unit C105G on the molded product image 1. The moldable portion display unit C105L displays all the third moldable portions M6 and M7 with yellow on the molded product image 1. The moldable portion display unit C105L also displays the moldable portions M8', which are switched from the unmoldable portions M8 by the moldable portion determination unit C105J, with blue on the molded product image 1.

C106: Unnecessary Boundary Detection Unit

The unnecessary boundary detection unit C106 has a midpoint calculation unit C106A, a normal line determination unit C106B, a curvature calculation unit C106C, a curvature determination unit C106D, which is an example of a curved state determination unit, an unnecessary boundary setting storage unit C106E, a necessary boundary setting storage unit C106F, and an unnecessary boundary display unit C106G. When the unnecessary boundary detection button 3 is selected, the unnecessary boundary detection unit C106 executes the unnecessary boundary detection processing for detecting the unnecessary boundary (L1).

Figure 14A:
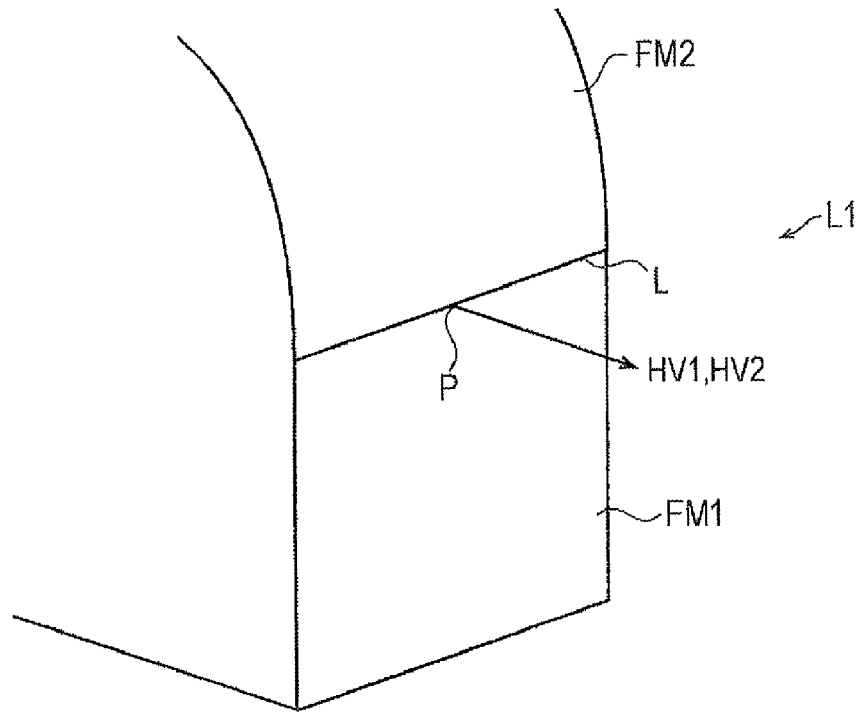
FIGS. 14A and 14B are partially enlarged explanatory views showing the relationship between a first normal vector of a first surface and a second normal vector of a second surface at a midpoint of a boundary of a molded product.
Figure 14B:
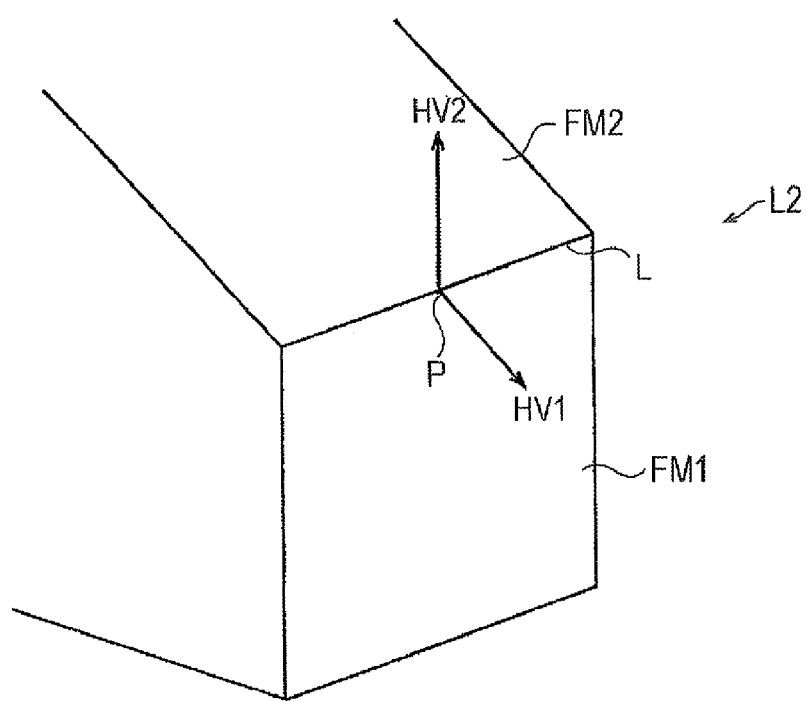

FIGS. 14A and 14B are partially enlarged explanatory views showing the relationship between a first normal vector of a first surface and a second normal vector of a second surface at a midpoint of a boundary of a molded product. FIG. 14A is an explanatory view showing a case where a first normal vector and a second normal vector are of the same direction. FIG. 14B is an explanatory view showing a case where a first normal vector and a second normal vector are of different directions.

C106A: Midpoint Calculation Unit

The midpoint calculation unit C106A calculates a midpoint P on the basis of the coordinates of both ends of each boundary L shown in FIGS. 14A and 14B.

C106B: Normal Line Determination Unit

As shown in FIG. 14A, when it is assumed that two surfaces, which are connected to each other by the boundary L, are a first surface FM1 and a second surface FM2, a normal vector of the first surface FM1 is a first normal vector HV1, and a normal vector of the second surface FM2 is a second normal vector HV2, the normal line determination unit C106B determines whether or not the first normal vector HV1 and the second normal vector HV2 are of the same direction at the midpoint P calculated by the normal line calculation unit C104.

Figure 15A:
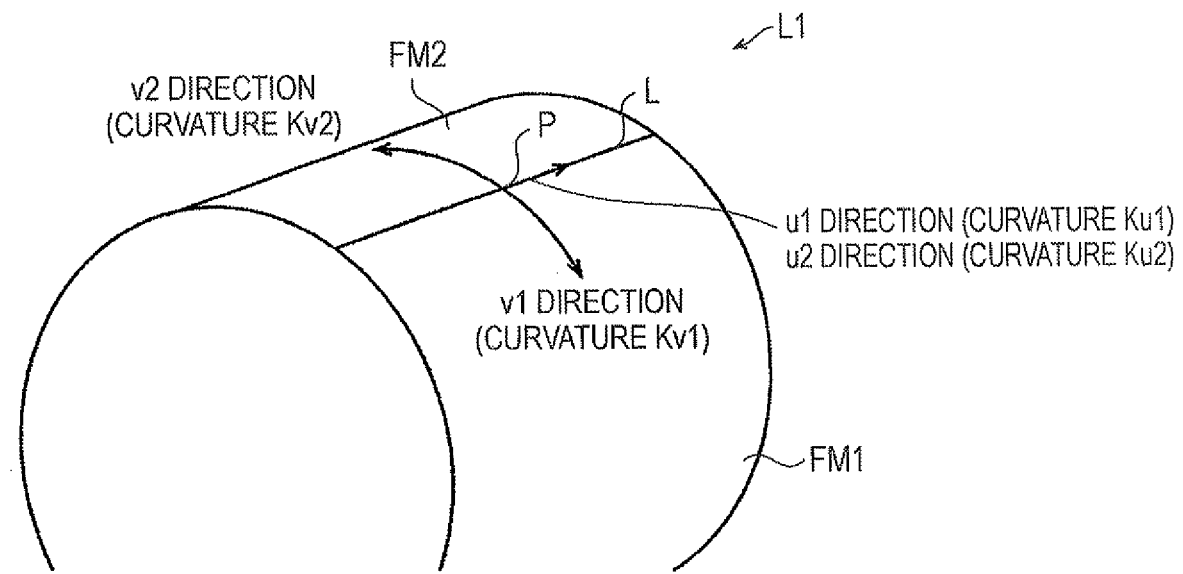
FIGS. 15A and 15B are partially enlarged explanatory views showing the relationship between a u1 direction curvature and a v1 direction curvature of a first surface and a u2 direction curvature and a v2 direction curvature of a second surface at a midpoint of a boundary of a molded product.
Figure 15B:
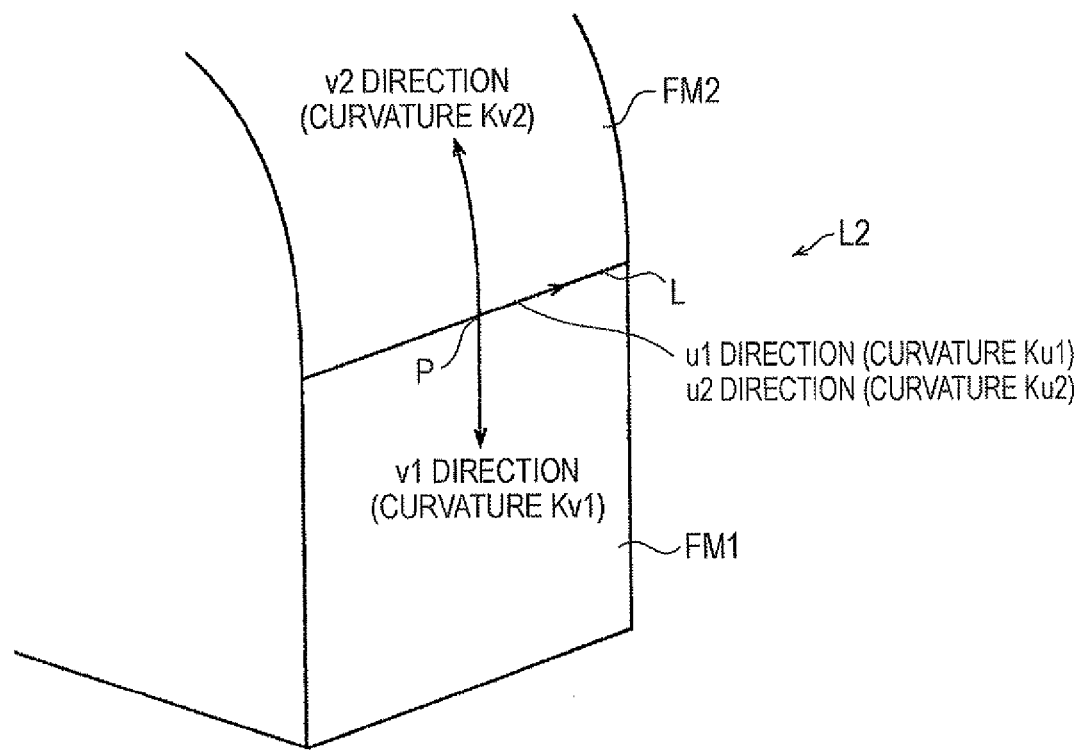

FIGS. 15A and 15B are partially enlarged explanatory views showing the relationship between a u1 direction curvature and a v1 direction curvature of a first surface and a u2 direction curvature and a v2 direction curvature of a second surface at a midpoint of a boundary of a molded product. FIG. 15A is an explanatory view showing a case where a u1 direction curvature and a v1 direction curvature, and a u2 direction curvature and a v2 direction curvature are the same. FIG. 15B is an explanatory view showing a case where a u1 direction curvature and a v1 direction curvature are different from a u2 direction curvature and a v2 direction curvature.

C106C: Curvature Calculation Unit

The curvature calculation unit C106C calculates the curvatures (Ku1, Kv1, Ku2, and Kv2) of the first surface FM1 and the second surface FM2. When it is determined that the first normal vector HV1 and the second normal vector HV2 are of the same direction, as shown in FIGS. 15A and 15B, the curvature calculation unit C106C of the first exemplary embodiment calculates, at the midpoint P, a u1 direction curvature Ku1 that is a curvature in a u1 direction, which is an example of a u direction of the grid line on the first surface FM1, a v1 direction curvature Kv1 that is a curvature in a v1 direction, which is an example of a v direction of the grid line, a u2 direction curvature Ku2 that is a curvature in a u2 direction, which is an example of a u direction of the grid line on the second surface FM2, and a v2 direction curvature Kv2 that is a curvature in a v2 direction, which is an example of a v direction of the grid line. In the first exemplary embodiment, first curvatures Ku1 and Kv1 are respectively defined as the u1 direction curvature Ku1 and the v1 direction curvature Kv1. Second curvatures Ku2 and Kv2 are respectively defined as the u2 direction curvature Ku2 and the v2 direction curvature Kv2.

C106D: Curvature Determination Unit

As shown in FIG. 15A, the curvature determination unit C106D determines whether or not the first curvatures Ku1 and Kv1 of the first surface FM1 and the second curvatures Ku2 and Kv2 of the second surface FM2 calculated by the curvature calculation unit C106C are the same, thereby determining whether or not a first curved state, which is a curved state of the first surface FM1 at the boundary L, is the same as a second curved state, which is a curved state of the second surface FM2 at the boundary L. When the u1 direction curvature Ku1 and the u2 direction curvature Ku2 are the same and the V1 direction curvature Kv1 and the v2 direction curvature Kv2 are the same, or when the u1 direction curvature Ku1 and the v2 direction curvature Kv2 are the same and the u2 direction curvature Ku2 and the v1 direction curvature Kv1 are the same, that is, when the conditions Ku1=Ku2 and Kv1=Kv2 are satisfied, or when the conditions Ku1=Kv2 and Ku2=Kv1 are satisfied, the curvature determination unit C106D of the first exemplary embodiment determines that the curvatures Ku1 and Kv1 of the first surface FM1 and the curvatures Ku2 and Kv2 of the second surface FM2 are the same. Therefore, when it is determined that the normal vectors HV1 and HV2 are of the same direction, and the first curvatures Ku1 and Kv1 of the first surface FM1 and the second curvatures Ku2 and Kv2 of the second surface FM2 are the same, the unnecessary boundary detection unit C106 of the first exemplary embodiment determines that the boundary L is the unnecessary boundary L1 which divides the first surface FM1 and the second surface FM2 which should be the same surface.

C106E: Unnecessary Boundary Setting Storage Unit

The unnecessary boundary setting storage unit C106E sets and stores each boundary L shown in FIG. 15A, which is determined as the unnecessary boundary L1, as the unnecessary boundary L1.

C106F: Necessary Boundary Setting Storage Unit

The necessary boundary setting storage unit C106F sets and stores each boundary L shown in FIGS. 14B and 15B, which is not determined as the unnecessary boundary L1, as a necessary boundary L2, which is a necessary boundary.

C106G: Unnecessary Boundary Display Unit

The unnecessary boundary display unit C106G displays all the unnecessary boundaries L1 stored in the unnecessary boundary setting storage unit C106E with colors on the molded product image 1.

C107: Wedge-Shaped Uneven Portion Detection Unit

The wedge-shaped uneven portion detection unit C107 has a midpoint calculation unit C107A, a wedge shape determination unit C107B, a normal direction movement point calculation unit C107C, an unevenness determination unit C107D, a wedge-shaped concave portion setting storage unit C107E, a wedge-shaped convex portion setting storage unit C107F, a non-wedge-shaped uneven portion setting storage unit C107G, and a wedge-shaped uneven portion display unit C107H. When the wedge-shaped uneven portion detection button 4 is selected, the wedge-shaped uneven portion detection unit C107 executes wedge-shaped uneven portion detection processing for detecting a wedge-shaped uneven portion (E1+E2) including a wedge-shaped concave portion (E1) or a wedge-shaped convex portion (E2), called a sharp edge.

Figure 16A:
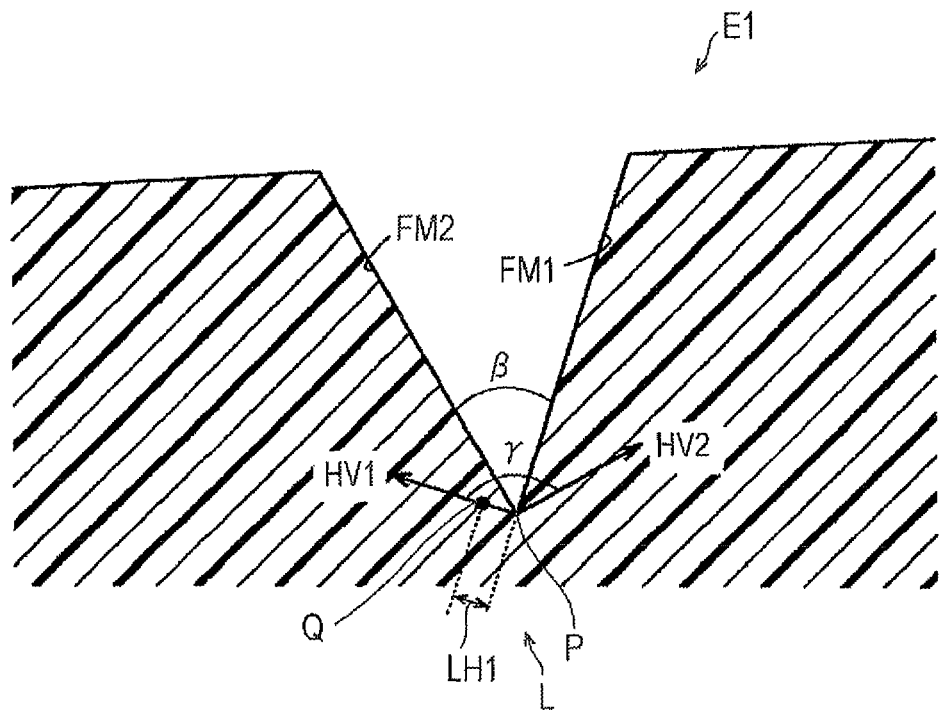
FIGS. 16A and 16B are enlarged sectional explanatory views of a wedge-shaped uneven portion which is formed in a molded product.
Figure 16B:
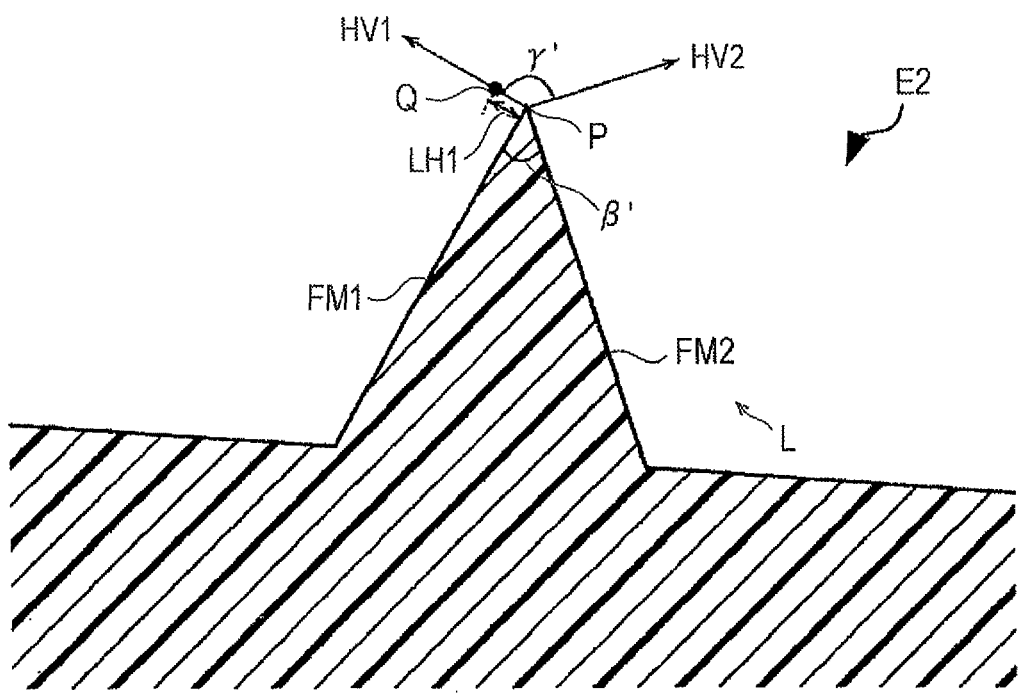

FIGS. 16A and 16B are enlarged sectional explanatory views of a wedge-shaped uneven portion which is formed in a molded product. FIG. 16A is a sectional view of a wedge-shaped concave portion. FIG. 16B is a sectional view of a wedge-shaped convex portion.

C107A: Midpoint Calculation Unit

Similarly to the midpoint calculation unit C106A, the midpoint calculation unit C107A calculates a midpoint P on the basis of the coordinates of both ends of each boundary L shown in FIGS. 16A and 16B.

C107B: Wedge Shape Determination Unit

The wedge shape determination unit C107B determines whether or not the connection angle $\beta$ or $\beta'$, which is an angle between the first surface FM1 and the second surface FM2 connected by the boundary L shown in FIGS. 16A and 16B with respect to the boundary L, is less than a prescribed wedge shape determination value $\beta_{max}$. Similarly to the first connection angle calculation unit C105B2, the wedge shape determination unit C107B of the first exemplary embodiment calculates the connection angle $\beta$ or $\beta'$ on the basis of an angle $\gamma$ or $\gamma'$ between the first normal vector HV1 of the first surface FM1 and the second normal vector HV2 of the second surface FM2 at the midpoint P. That is, $\beta=|360°-(90°\times2)-\gamma|=|180°-\gamma|$ and $\beta'=|360°-(90°\times2)-\gamma'|=|180°-\gamma'|$ are calculated. In the first exemplary embodiment, for example, the wedge shape determination value $\beta_{max}$ may be set to 60° in advance.

C107C: Normal Direction Movement Point Calculation Unit

The normal direction movement point calculation unit C107C calculates a normal direction movement point Q which is moved to a point in a direction of a normal line calculated from the normal line calculation point P. As shown in FIGS. 16A and 16B, the normal direction movement point calculation unit C107C of the first exemplary embodiment calculates the normal direction movement point Q which is moved to a point in a direction of the first normal vector HV1 at the midpoint P. In the first exemplary embodiment, a normal direction movement distance LH1, which is a distance between the midpoint P and the normal direction movement point Q, may be set to a value sufficiently smaller than the thickness of each surface of the molded product. For example, the normal direction movement distance LH1 may be set to 0.1 [mm]. Although in the first exemplary embodiment, the normal direction movement point Q which is moved in a direction of the first normal vector HV1 at the midpoint P is calculated, the invention is not limited thereto. For example, a normal direction movement point which is moved in a direction of the second normal vector HV2 by the normal direction movement distance LH1 may be calculated.

C107D: Unevenness Determination Unit

The unevenness determination unit C107D determines whether the first surface FM1 and the second surface FM2 are connected to each other concavely or convexly through the boundary L. As shown in FIG. 16A, when the normal direction movement point Q is a point inside the molded product, the unevenness determination unit C107D of the first exemplary embodiment determines that the first surface FM1 and the second surface FM2 are connected to each other concavely. As shown in FIG. 16B, when the normal direction movement point Q is a point on a space, the unevenness determination unit C107D determines that the first surface FM1 and the second surface FM2 are connected to each other convexly. Therefore, when it is determined that the connection angle $\beta$ or $\beta'$ is less than the wedge shape determination value $\beta_{max}$, and the first surface FM1 and the second surface FM2 are connected to each other concavely, the wedge-shaped uneven portion detection unit C107 of the first exemplary embodiment determines that the wedge-shaped concave portion E1 is formed by the boundary L and the first and second surfaces FM1 and FM2. When it is determined that the connection angle $\beta$ or $\beta'$ is less than the wedge shape determination value $\beta_{max}$, and the first surface FM1 and the second surface FM2 are connected to each other convexly, the wedge-shaped uneven portion detection unit C107 determines that the wedge-shaped convex portion E2 is formed by the boundary L and the first and second surfaces FM1 and FM2.

C107E: Wedge-Shaped Concave Portion Setting Storage Unit

The wedge-shaped concave portion setting storage unit C107E sets and stores the boundary L and the first and second surfaces FM1 and FM2 shown in FIG. 16A, which are determined as the wedge-shaped concave portion E1, as the wedge-shaped concave portion E1.

C107F: Wedge-Shaped Convex Portion Setting Storage Unit

The wedge-shaped convex portion setting storage unit C107F sets and stores the boundary L and the first and second surfaces FM1 and FM2 shown in FIG. 16B, which are determined as the wedge-shaped convex portion E2, as the wedge-shaped convex portion E2.

C107G: Non-Wedge-Shaped Uneven Portion Setting Storage Unit

The non-wedge-shaped uneven portion setting storage unit C107G sets and stores the boundary L and the first and second surfaces FM1 and FM2, which are not determined as the wedge-shaped concave portion E1 or the wedge-shaped convex portion E2, as a non-wedge-shaped uneven portion with no wedge-shaped uneven portion E1+E2.

C107H: Wedge-Shaped Uneven Portion Display Unit

The wedge-shaped uneven portion display unit C107H displays all the wedge-shaped concave portions E1 stored in the wedge-shaped concave portion setting storage unit C107E and all the wedge-shaped convex portions E2 stored in the wedge-shaped convex portion setting storage unit C107F with different colors on the molded product image 1.

C108: Drawing Completion Determination Unit

The drawing completion determination unit C108 determines whether or not the moldability determination system S completes drawing of a molded product. The drawing completion determination unit C108 of the first exemplary embodiment determines whether or not a user input an instruction to end the moldability determination program AP1, thereby determining whether or not the moldability determination system S completes drawing of a molded product.

(Description of Controller of License Server LSV)

Referring to FIGS. 2 and 3, similarly to the computer main body H1 of the client personal computer PC, the computer main body H1 of the license server LSV has an input/output interface, a ROM, a RAM, a CPU, a clock oscillator, and the like. The computer main body H1 executes programs stored in the hard disc or the ROM, thereby implementing various functions. The hard disc of the license server LSV stores application programs, such as an operating system OS, a moldability determination authentication program AP1' for transmitting licensing information of the moldability determination system S to the client personal computer PC, and the like. Hereinafter, the functions (control unit) of the moldability determination authentication program AP1' will be described.

(Moldability Determination Authentication Program AP1')

The moldability determination authentication program AP1' has a registration application information receiving unit C1' that receives the registration application information from the client personal computer PC, a licensing information transmitting unit C2' that transmits the licensing information, and a registration application information storage unit C3' that stores the registration application information. The license server LSV of the first exemplary embodiment transmits/receives information to/from the client personal computer PC, and transfers the licensing information on the basis of the registration application information so as to permit the use of the moldability determination system S.

Description of Flowchart of First Exemplary Embodiment

Next, the flow of processing of the moldability determination program AP2 in the client personal computer PC of the first exemplary embodiment will be described with reference to a flowchart. The processing corresponding to the moldability determination authentication program AP1' in the client personal computer PC and the license server LSV is just as follows: the client personal computer PC transmits the registration application information, and receives and stores the licensing information; and the license server LSV receives and stores the registration application, and transmits the licensing information. Therefore, detailed description thereof will be omitted.

Figure 17:
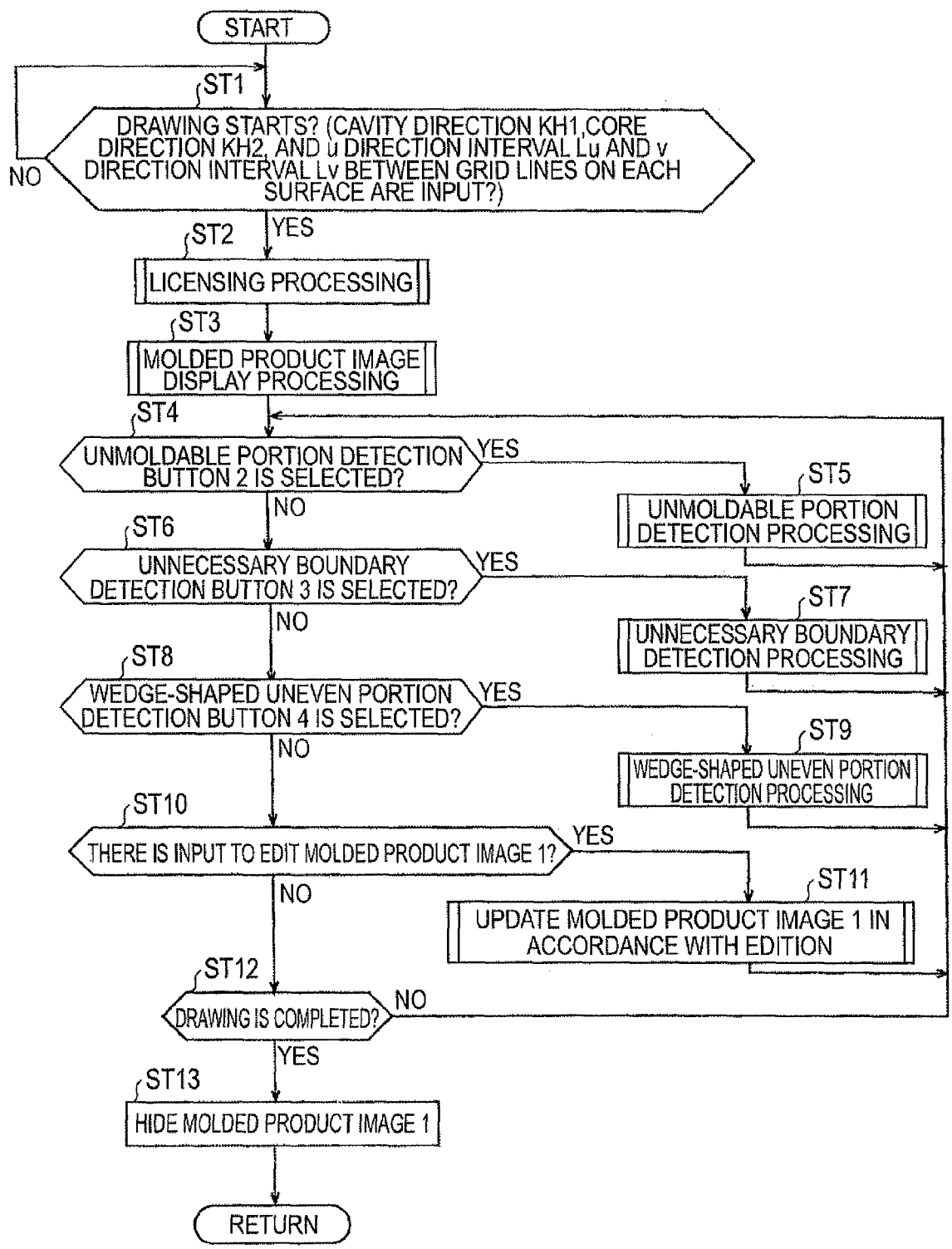
FIG. 17 is a flowchart of main processing of a moldability determination program according to the first exemplary embodiment of the invention.

Description of Flowchart of Main Processing of Moldability Determination Program AP2 of First Exemplary Embodiment FIG. 17 is a flowchart of main processing of a moldability determination program according to the first exemplary embodiment of the invention.

The STs (Steps) of the flowchart shown in FIG. 17 are executed in accordance with the programs stored in the ROM or the like of the controller. The STs are executed in parallel to various processing, for example, molded product drawing, in a multitask manner.

The flowchart shown in FIG. 17 starts when the moldability determination program AP1 runs after the client personal computer PC is powered-on.

The client personal computer PC determines whether or not a user operates the keyboard H3 or the mouse H4 to input the cavity direction KH1, the core direction KH2, and the u direction interval Lv and the v direction interval Lu between the grid lines, thereby determining whether or not the moldability determination system S starts to draw a molded product. If it is determined to be Yes (Y), the client personal computer PC progresses to ST2, and if it is determined to be No (N), ST1 is repeatedly executed.

The client personal computer PC determines whether the client personal computer PC obtains an authorized license of the moldability determination system S or not on the basis of the licensing information stored in the licensing information storage unit C3. Next, the process progresses to ST3. In ST3, as shown in FIG. 8, the client personal computer PC executes molded product image display processing to display the molded product image 1 obtained from molded product information, which is information about a three-dimensional shape of a molded product stored in the molded product information storage unit C103A.

The client personal computer PC determines whether or not the user selects the unmoldable portion detection button 2 of the molded product image 1 (ST4). If it is determined to be Yes (Y), the process progresses to ST5. In ST5, unmoldable portion detection processing shown in a flowchart of FIG. 18 described below is executed to detect the unmoldable portions M1 to M3, and then the process returns to ST4. If it is determined to be No (N), the process progresses to ST6.

The client personal computer PC determines whether or not the user selects the unnecessary boundary detection button 3 of the molded product image 1 (ST6). If it is determined to be Yes (Y), the process progresses to ST7. In ST7, unnecessary boundary detection processing shown in a flowchart of FIG. 21 described below is executed to detect the unnecessary boundary L1, and then the process returns to ST4. If it is determined to be No (N), the process progresses to ST8.

The client personal computer PC determines whether or not the user selects the wedge-shaped uneven portion detection button 4 of the molded product image 1 (ST8). If it is determined to be Yes (Y), the process progresses to ST9. In ST9, a flowchart of FIG. 22 described is executed, and then the process returns to ST4. If it is determined to be No (N) the process progresses to ST10.

The client personal computer PC determines whether or not the user inputs to edit the molded product image 1 (ST10). If it is determined to be Yes (Y), the process progresses to ST11. In ST11, the molded product image 1 is updated in accordance with edition by the user, and then process progresses to ST12. If it is determined to be No (N), the process progresses to ST12.

The client personal computer PC determines whether or not the user inputs to end the moldability determination program AP1 (ST12). If it is determined to be Yes (Y), the process progresses to ST13. In ST13, the molded product image 1 is hidden, and then the process returns to ST1. In ST12, if it is determined to be No (N), the process returns to ST4.

Figure 18:
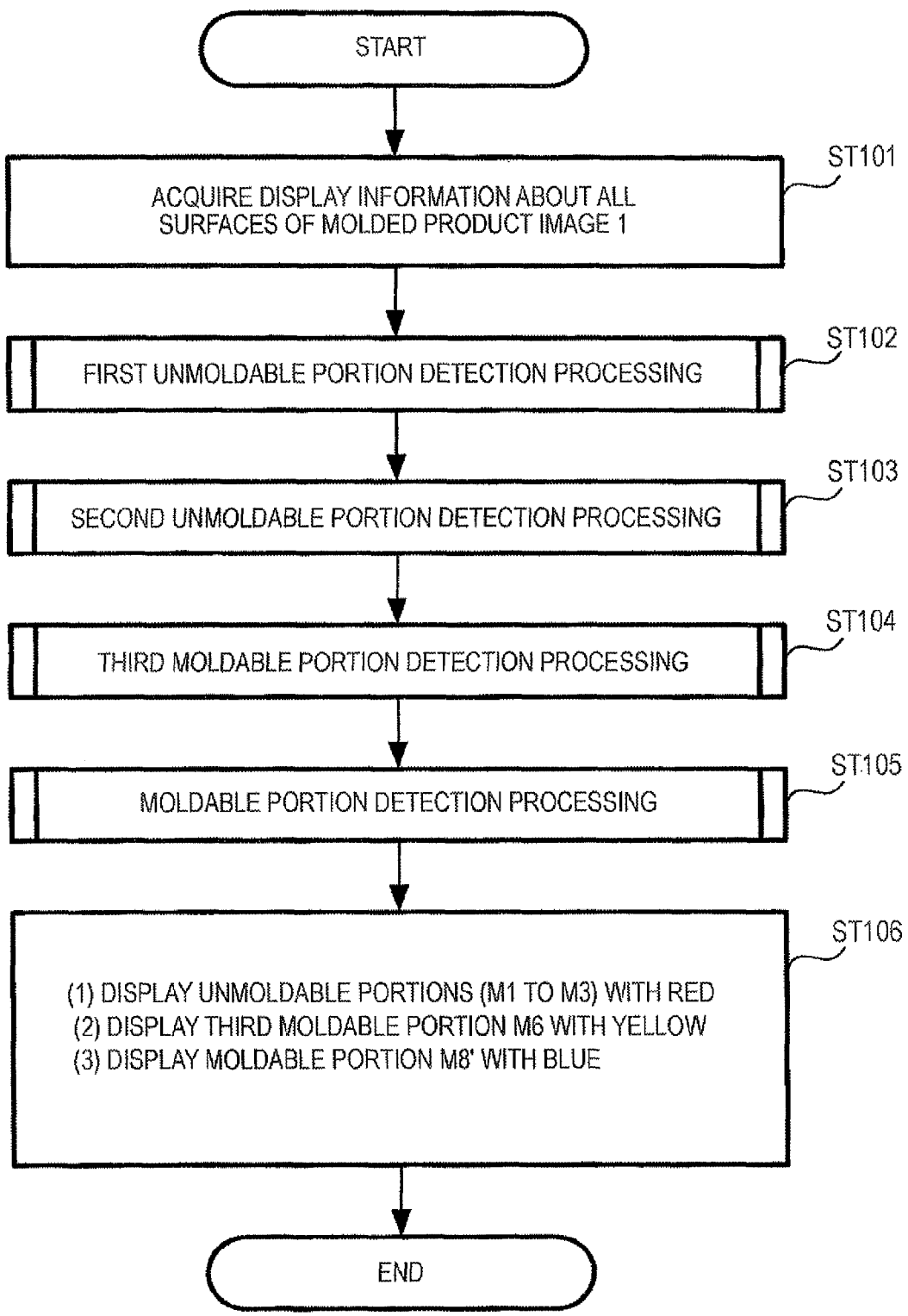
FIG. 18 is a flowchart of unmoldable portion detection processing, and is an explanatory view of a subroutine of ST5 in FIG. 17.

Description of Flowchart of Unmoldable Portion Detection Processing of Moldability Determination Program AP2 of First Exemplary Embodiment FIG. 18 is a flowchart of the unmoldable portion detection processing, and is an explanatory view of a subroutine of ST5 in FIG. 17.

The client personal computer PC acquires surface information about all the surfaces of the molded product image 1 stored in the surface information storage unit C103A1 (ST101), and then progresses to ST102. In ST102, the client personal computer PC executes first unmoldable portion detection processing shown in a flowchart of FIG. 19 described below to detect the cavity-side unmoldable portions M1 to M3 which are unmoldable only by movement of the female mold in the cavity direction KH1, and then progresses to ST103.

In ST103, the client personal computer PC executes second unmoldable portion detection processing to detect the core-side unmoldable portions M1 to M3, which are unmoldable only by movement of the male mold in the core direction KH2, and then progresses to ST104.

In ST104, the client personal computer PC executes third moldable portion detection processing shown in a flowchart of FIG. 20 described below to determine whether or not the cavity-side unmoldable portions M1 to M3 and the core-side unmoldable portions M1 to M3 are the unmoldable portion M8 to be unmoldable by movement in the standard slide direction KH3, or the third moldable portions M6 and M7 to be moldable by movement of the slide core in the standard slide direction KH3, and then progresses to ST105.

In ST105, the client personal computer PC executes moldable portion detection processing shown in a flowchart of FIG. 21 described below to determine whether or not the cavity-side unmoldable portions M1 to M3 and the core-side unmoldable portions M1 to M3 are the moldable portion M8' to be moldable by forming a parting line when a mold is formed by two members, and then progresses to ST106.

In ST106, the client personal computer PC executes the following processing (1) to (3), ends the unmoldable portion detection processing, and returns to the main processing of FIG. 17.

(1) display all the unmoldable portions M8 stored in the unmoldable portion setting storage unit C105F with red on the molded product image 1

(2) display all the third moldable portions M6 and M7 stored in the third moldable portion setting storage unit C105G with yellow on the molded product image 1

(3) display all the moldable portions M8' stored in the moldable portion setting storage unit C105J2 with blue on the molded product image 1

Figure 19:
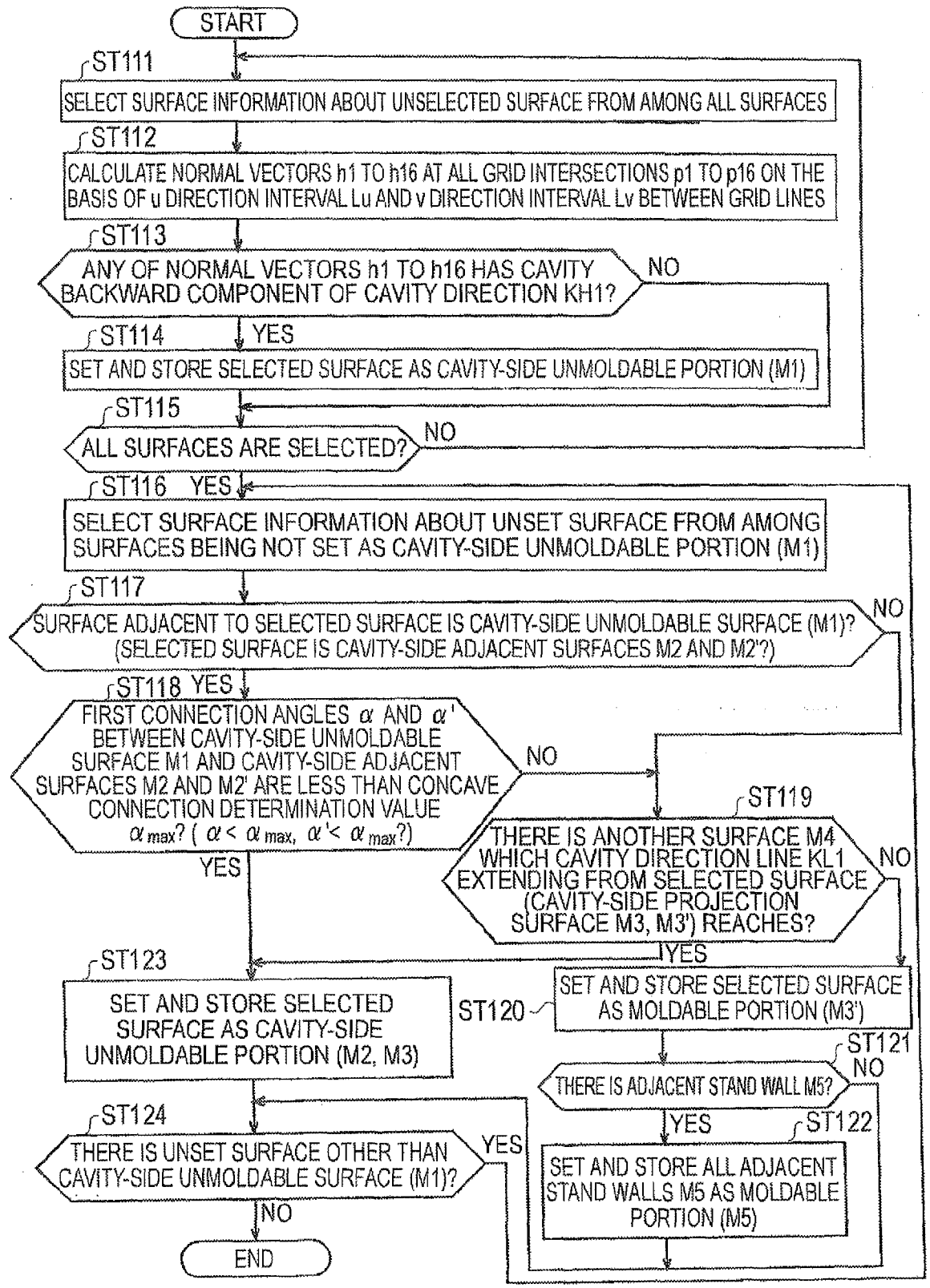
FIG. 19 is a flowchart of first unmoldable portion detection processing, and is an explanatory view of a subroutine of ST102 in FIG. 18.

Description of Flowchart of First Unmoldable Portion Detection Processing of Moldability Determination Program AP2 of First Exemplary Embodiment FIG. 19 is a flowchart of first unmoldable portion detection processing, and is an explanatory view of a subroutine of ST102 in FIG. 18.

If a mark "'" is suffixed to the ST number of each step of the first unmoldable portion detection processing, and the terms "first", "female mold", "cavity", "KH1", "KL1", and "+Z direction" are respectively substituted with the terms "second", "male mold", "core", "KH2", "KL2", and "−Z direction", the description of the first unmoldable portion detection processing can also be applied to the second unmoldable portion detection processing, and thus the detailed description thereof will be omitted.

The client personal computer PC selects surface information about an unselected surface from among all the surfaces (ST111), and then progresses to ST112. The client personal computer PC calculates the normal vectors h1 to h16 at all the grid intersections p1 to p16 shown in FIG. 7 on the basis of the u direction interval Lu and the v direction interval Lv between the grid lines, and then progresses to ST113.

In ST113, the client personal computer PC determines whether or not any one of the normal vectors h1 to h16 has a cavity backward component of the cavity direction KH1. If it is determined to be Yes (Y), the process progresses to ST114. If it is determined to be No (N), the process progresses to ST115. In ST114, the client personal computer PC sets and stores the selected surface as the cavity-side unmoldable portion (M1), and then progresses to ST115. In ST115, the client personal computer PC determines whether or not all the surfaces are selected. If it is determined to be Yes (Y), the process progresses to ST116. If it is determined to be No (N), the process returns to ST111. In ST116, the client personal computer PC selects surface information about an unset surface from among the surfaces, excluding the surface set as the cavity-side unmoldable portion (M1), and then progresses to ST117.

In ST117, the client personal computer PC determines whether or not a surface adjacent to the selected surface is the cavity-side unmoldable surface M1. That is, it is determined whether or not the selected surface is the cavity-side adjacent surface M2. If it is determined to be Yes (Y), the process progresses to ST118. If it is determined to be No (N), the process progresses to ST119. In ST118, the client personal computer PC determines whether or not the connection angle α or α' between the cavity-side unmoldable surface M1 and the cavity-side adjacent surface M2 shown in FIGS. 9A and 9B is less than the prescribed concave connection determination value $α_{max}$. That is, it is determined whether or not the conditions $α<α_{max}$ and $α'<α_{max}$ are satisfied, and accordingly it is determined whether or not the cavity-side adjacent surface M2 or M2' is the cavity-side concave connection surface M2. If it is determined to be No (N), the process progresses to ST119. If it is determined to be Yes (Y), the process progresses to ST123.

In ST119, the client personal computer PC determines whether or not there is a surface M4 which the cavity direction line KL1, that is, the line in the +Z direction, extending from the selected surface, that is, the cavity-side projection surface M3 or M3' shown in FIGS. 10A and 10B reaches. If it is determined to be No (N), the process progresses to ST120. If it is determined to be Yes (Y), the process progresses to ST123.

In ST120, the client personal computer PC sets and stores the selected surface as the moldable portion M3'. Next the process progresses to ST121. In ST121, the client personal computer PC determines whether or not there is a stand wall M5 which is adjacent to the selected surface (M3') and in parallel to the cavity direction line KL1. If it is determined to be Yes (Y), the process progresses to ST122. If it is determined to be No (N), the process progresses to ST124. In ST122, the client personal computer PC sets and stores all the stand walls M5 adjacent to the selected surface (M3') as the moldable portion M5. In ST123, the client personal computer PC sets and stores the selected surface as the unmoldable portion M2 or M3, and then progresses to ST124.

In ST124, the client personal computer PC determines whether or not there is an unset surface other than the cavity-side unmoldable portions M1 to M3. If it is determined to be Yes (Y), the process returns to ST116. If it is determined to be No (N), the first unmoldable portion detection processing ends, and the process returns to the unmoldable portion detection processing of FIG. 18.

Figure 20:
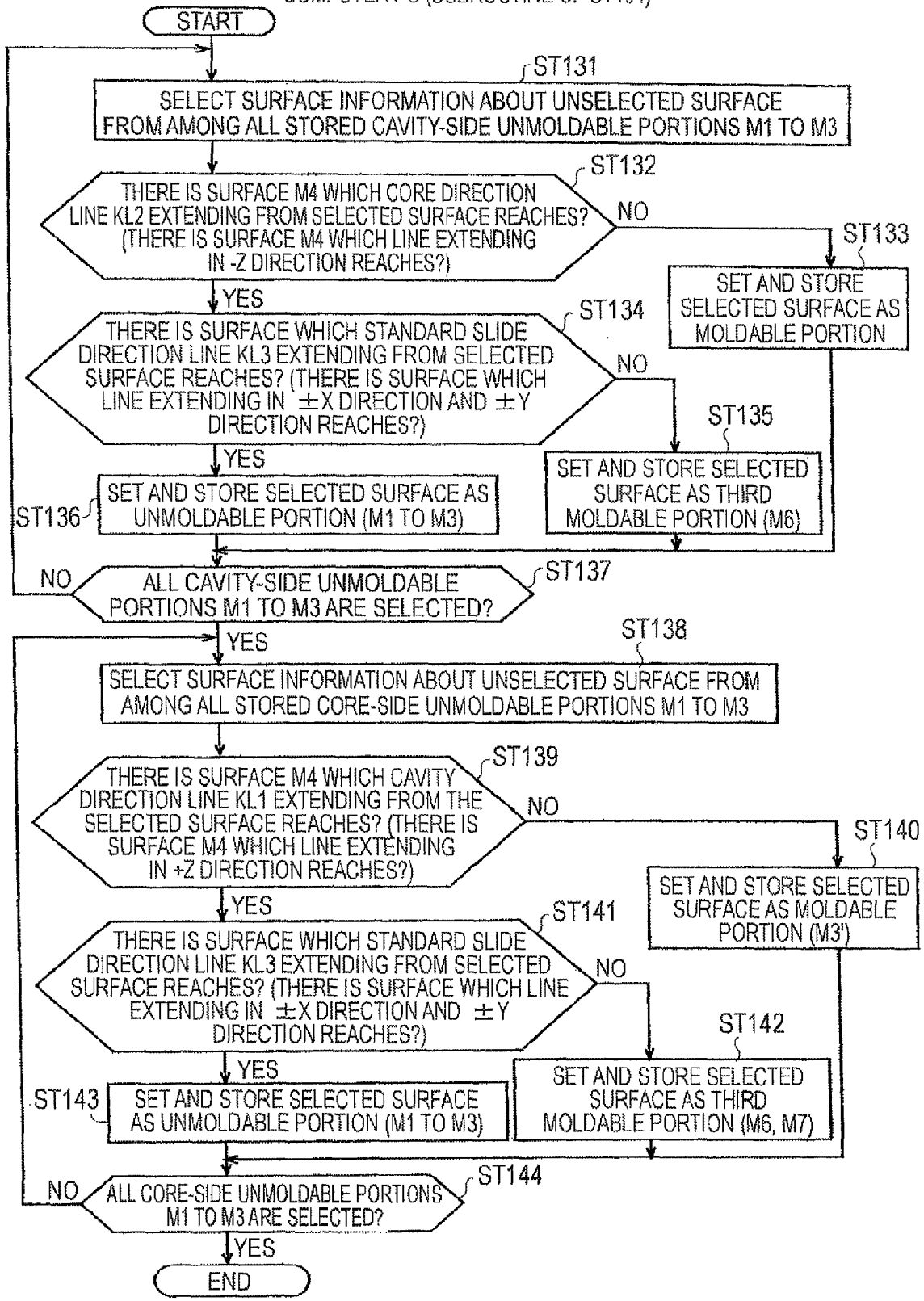
FIG. 20 is a flowchart of third moldable portion detection processing, and is an explanatory view of a subroutine of ST104 in FIG. 18.

Description of Flowchart of Third Moldable Portion Detection Processing of Moldability Determination Program AP2 of First Exemplary Embodiment FIG. 20 is a flowchart of third moldable portion detection processing, and is an explanatory view of a subroutine of ST104 in FIG. 18.

The client personal computer PC selects surface information about an unselected surface from among all the cavity-side unmoldable portions M1 to M3 stored in the first unmoldable portion setting storage unit C105D (ST131), and then progresses to ST132.

In ST132, the client personal computer PC determines whether or not there is a surface M4 which the core direction line KL2, that is, the line in the −Z direction, extending from the selected surface reaches. If it is determined to be No (N), the process progresses to ST133. If it is determined to be Yes (Y), the process progresses to ST134. In ST133, the client personal computer PC sets and stores the selected surface as the moldable portion M3', and then progresses to ST137.

In ST134, the client personal computer PC determines whether or not there is a surface which the standard slide direction line KL3 extending from the selected surface shown in FIGS. 11A and 11B reaches, that is, the lines in the ±X direction and the lines in the ±Y directions reach. If it is determined to be No (N), the process progresses to ST135. If it is determined to be Yes (Y), the process progresses to ST136. In ST136, the client personal computer PC sets and stores the selected surface as the unmoldable portions M1 to M3, and then progresses to ST137. Meanwhile, if it is determined to be No (N) in ST134, in ST135, the client personal computer PC sets and stores the selected surface as the third moldable portion M6 and M7, and then progresses to ST137.

In ST137, the client personal computer PC determines whether or not all the cavity-side unmoldable portions M1 to M3 are selected. If it is determined to be Yes (Y), the process progresses to ST138. If it is determined to be No (N), the process progresses to ST131.

In ST138, the client personal computer PC selects surface information about an unselected surface from among all the core-side unmoldable portions M1 to M3 stored in the second unmoldable portion setting storage unit C105D', and then progresses to ST139. In ST139, the client personal computer PC determines whether or not there is a surface M4 which the cavity direction line KL1, that is, the line in the +Z direction, extending from the selected surface reaches. If it is determined to be No (N), the process progresses to ST140. If it is determined to be Yes (Y), the process progresses to ST141.

In ST140, the client personal computer PC sets and stores the selected surface as the moldable portion M3', and then progresses to ST144. Meanwhile, in ST141, the client personal computer PC determines whether or not there is a surface which the standard slide direction line KL3 extending from the selected surface shown in FIGS. 11A and 11B, that is, the lines in the ±X direction and the lines in the ±Y direction reach. If it is determined to be No (N), the process progresses to ST142. If it is determined to be Yes (Y), the process progresses to ST143.

In ST142, the client personal computer PC sets and stores the selected surface as the third moldable portions M6 and M7, and then progresses to ST144. In ST143, the client personal computer PC sets and stores the selected surface as the unmoldable portions M1 to M3, and then progresses to ST144.

In ST144, the client personal computer PC determines whether or not all the core-side unmoldable portions M1 to M3 are selected. If it is determined to be No (N), the process returns to ST138. If it is determined to be Yes (Y), the third moldable portion detection processing ends, and the process returns to the unmoldable portion detection processing of FIG. 18.

Figure 21:
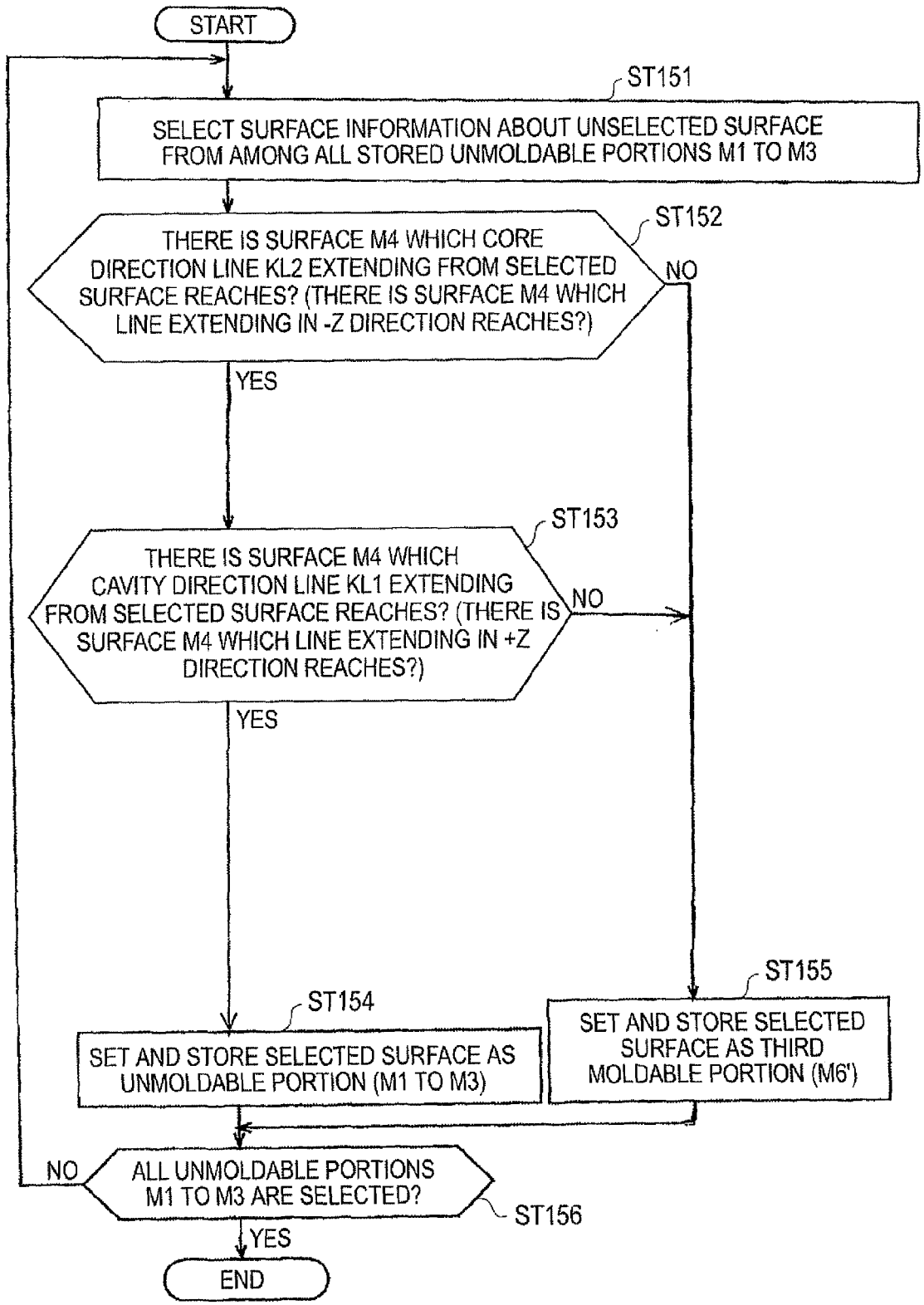
FIG. 21 is a flowchart of moldable portion detection processing, and is an explanatory view of a subroutine of ST105 in FIG. 18.

Description of Flowchart of Moldable Portion Detection Processing of Moldability Determination Program AP2 of First Exemplary Embodiment FIG. 21 is a flowchart of moldable portion detection processing, and is an explanatory view of a subroutine of ST105 in FIG. 18.

The client personal computer PC selects surface information of an unselected surface from among all the cavity-side unmoldable portions M1 to M3 stored in the first unmoldable portion setting storage unit C105D (ST151), and then progresses to ST152.

In ST152, the client personal computer PC determines whether or not there is a surface M4 which the core direction line KL2, that is, the line in the direction, extending from the selected surface reaches. If it is determined to be Yes (Y), the process progresses to ST153. If it is determined to be No (N), the process progresses to ST155. In ST153, the client personal computer PC determines whether or not there is a surface M4 which the cavity direction line KL1, that is, the line in the +z, direction, extending from the selected surface reaches. If it is determined to be Yes (Y), the process progresses to ST154. If it is determined to be No (N), the process progresses to ST155.

In ST154, the client personal computer PC sets and stores the selected surface as the unmoldable portions M1 to M3 because there are the cavity direction line KL1 and the core direction line KL2 extending from the selected surface, and then progresses to ST156.

Meanwhile, if it is determined to be No (N) in ST152 or ST153, the client personal computer PC progresses to ST155. In ST155, the client personal computer PC sets and stores the selected surface as the moldable portion M8' because there are no cavity direction line KL1 and core direction line KL2 extending from the selected surface, and then progresses to ST156.

In ST156, the client personal computer PC determines whether or not all the unmoldable portions M1 to M3 are selected. If it is determined to be No (N), the process returns to ST151. If it is determined to be Yes (Y), the moldable portion detection processing ends, and the process returns to the unmoldable portion detection processing of FIG. 18.

Figure 22:
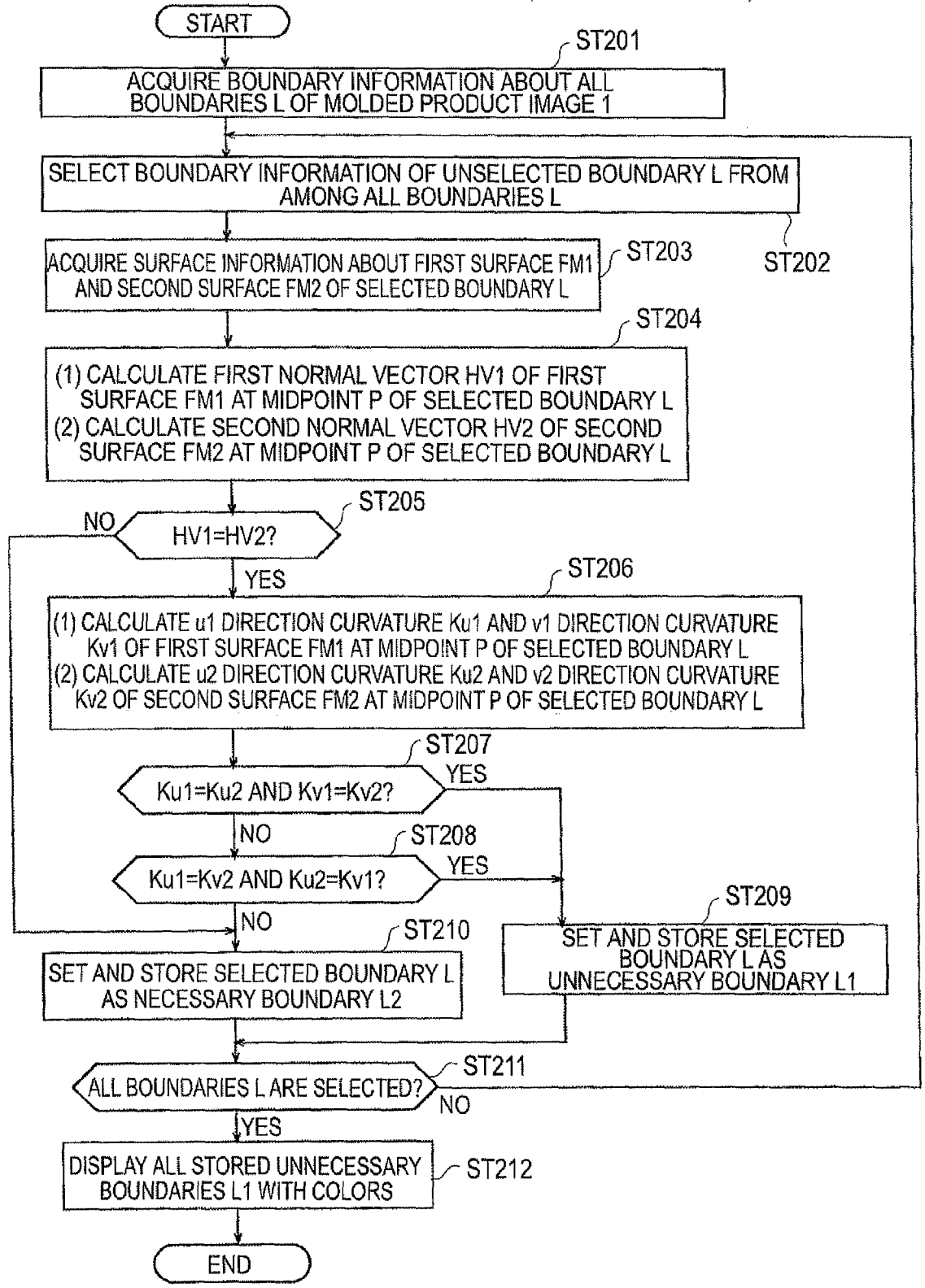
FIG. 22 is a flowchart of unnecessary boundary detection processing, and is an explanatory view of a subroutine of ST7 in FIG. 17.

Description of Flowchart of Unnecessary Boundary Detection Processing of Moldability Determination Program AP2 of First Exemplary Embodiment FIG. 22 is a flowchart of unnecessary boundary detection processing, and is an explanatory view of a subroutine of ST7 in FIG. 17.

The client personal computer PC acquires boundary information about all the boundaries L of the molded product image 1 stored in the boundary information storage unit C103A2 (ST201), and then progresses to ST202. In ST202, the client personal computer PC selects boundary information about an unselected boundary L from among all the boundaries L, and then progresses to ST203. In ST203, the client personal computer PC acquires surface information about the first surface FM1 and the second surface FM2 connected to each other through the selected boundary L, and then progresses to ST204.

In ST204, the client personal computer PC executes the following processing (1) and (2), and then progresses to ST205.
(1) calculate the first normal vector HV1 of the first surface FM1 at the midpoint P of the selected boundary L
(2) calculate the second normal vector HV2 of the second surface FM2 at the midpoint P of the selected boundary L In ST205, the client personal computer PC determines whether or not the first normal vector HV1 and the second normal vector HV2 are of the same direction. If it is determined to be Yes (Y), the process progresses to ST206. If it is determined to be No (N), the process progresses to ST210. In ST206, the client personal computer PC executes the following processing (1) and (2), and then progresses to ST207.
(1) calculate the u1 direction curvature Ku1 and the v1 direction curvature Kv1 of the first surface FM1 at the midpoint P of the selected boundary L
(2) calculate the u2 direction curvature Ku2 and the v2 direction curvature Kv2 of the second surface FM2 at the midpoint P of the selected boundary L In ST207, the client personal computer PC determines whether or not the u1 direction curvature Ku1 and the u2 direction curvature Ku2 are the same, and the v1 direction curvature Kv1 and the v2 direction curvature Kv2 are the same. That is, it is determined whether or not the conditions Ku1=Ku2 and Kv1=Kv2 are satisfied. If it is determined to be No (N), the process progresses to ST208. If it is determined to be Yes (Y), the process progresses to ST209.

In ST208, the client personal computer PC determines whether or not the u1 direction curvature Ku1 and the v2 direction curvature Kv2 are the same, and the u2 direction curvature Ku2 and the v1 direction curvature Kv1 are the same. That is, it is determined whether or not the conditions Ku1=Kv2 and Ku2=Kv1 are satisfied. If it is determined to be Yes (Y), the process progresses to ST209. If it is determined to be No (N), the process progresses to ST210.

In ST209, the client personal computer PC sets and stores the selected boundary L as the unnecessary boundary L1, and then progresses to ST211. In ST210, the client personal computer PC sets and stores the selected boundary L as the necessary boundary L2, and then progresses to ST211.

In ST211, the client personal computer PC determines whether or not all the boundaries L are selected. If it is determined to be Yes (Y), the process progresses to ST212. If it is determined to be No (N), the process returns to ST202.

In ST212, the client personal computer PC displays all the stored unnecessary boundaries L1 with colors, ends the unnecessary boundary detection processing, and returns to the main processing of FIG. 17.

Figure 23:
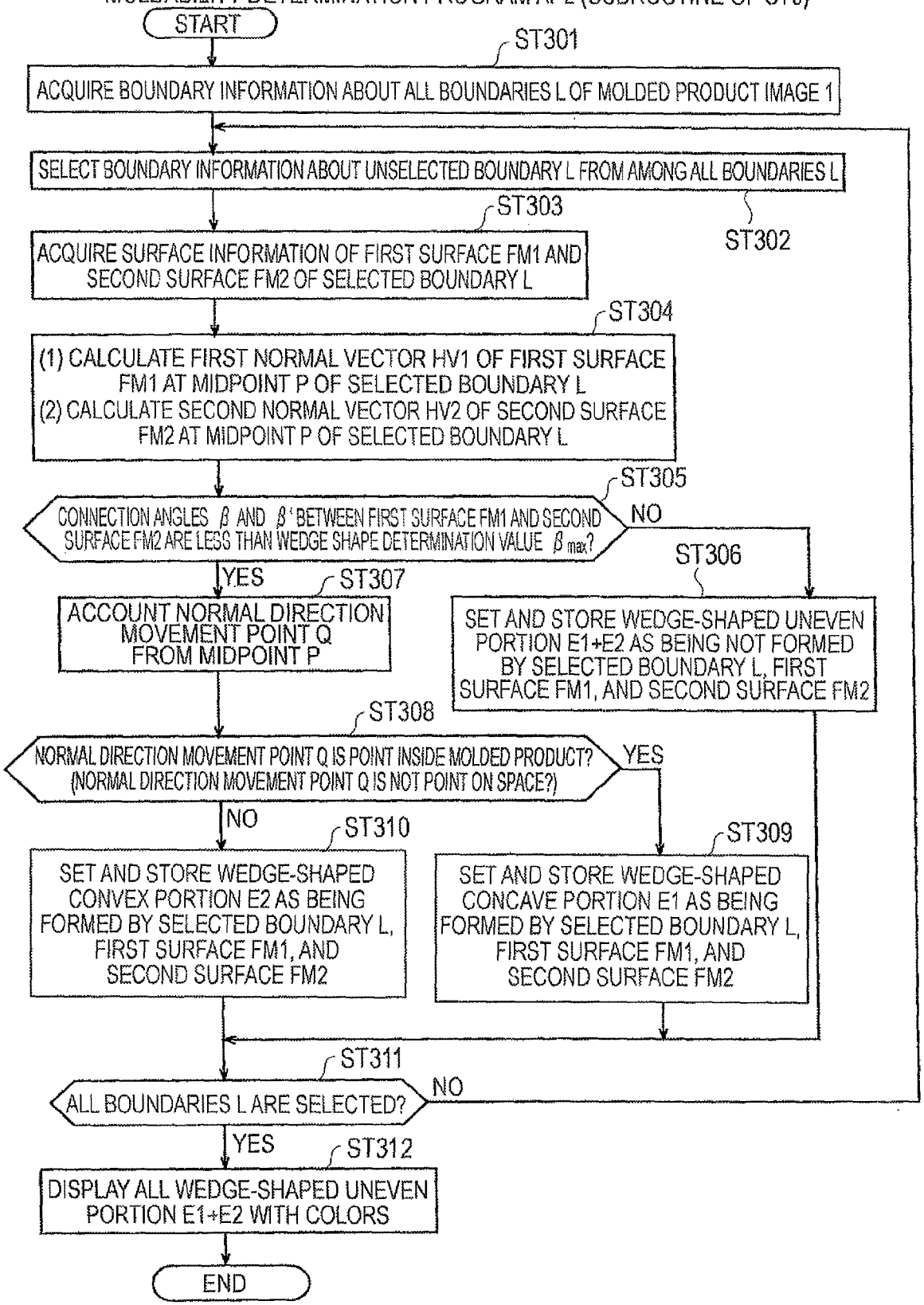
FIG. 23 is a flowchart of wedge-shaped uneven portion detection processing, and is an explanatory view of a subroutine of ST9 in FIG. 17.

Description of Flowchart of Wedge-Shaped Uneven Portion Detection Processing of Moldability Determination Program AP2 of First Exemplary Embodiment FIG. 23 is a flowchart of wedge-shaped uneven portion detection processing, and is an explanatory view of a subroutine of ST9 in FIG. 17.

The client personal computer PC acquires boundary information about all the boundaries L of the molded product image 1 stored in the boundary information storage unit C103A2 (ST301), and then progresses to ST302.

In ST302, the client personal computer PC selects boundary information about an unselected boundary L from among all the boundaries L, and then progresses to ST303. In ST303, the client personal computer PC acquires surface information about the first surface FM1 and the second surface FM2 connected to each other through the selected boundary L, and then progresses to ST304.

In ST304, the client personal computer PC executes the following processing (1) and (2), and then progresses to ST305.
(1) calculate the first normal vector HV1 of the first surface FM1 at the midpoint P of the selected boundary L
(2) calculate the second normal vector HV2 of the second surface FM2 at the midpoint P of the selected boundary L In ST305, the client personal computer PC determines whether or not the connection angle $\beta$ or $\beta'$ between the first surface FM1 and the second surface FM2 is less than the wedge-shaped determination value $\beta_{max}$. That is, it is determined whether or not the conditions $\beta<\beta_{max}$ and $\beta'<\beta_{max}$. In ST305, the client personal computer PC calculates the connection angle $\beta$ or $\beta'$ on the basis of the angle $\gamma$ or $\gamma'$ between the first normal vector HV1 of the first surface FM1 and the second normal vector HV2 of the second surface FM2 at the midpoint P. That is, $\beta=|360°-(90°\times2)-\gamma|=|180°-\gamma|$ and $\beta'=|360°-(90°\times2)-\gamma'|=|180°-\gamma'|$ are calculated. If it is determined to be No (N), the process progresses to ST306. If it is determined to be Yes (Y), the process progresses to ST307.

In ST306, the client personal computer PC sets and stores the selected boundary L and the first and second surfaces FM1 and FM2 as a non-wedge-shaped uneven portion, and then progresses to ST311.

In ST307, the client personal computer PC calculates the normal direction movement point Q which is moved from the midpoint P in the first normal vector HV1 by the normal direction movement distance LH1, and then progresses to ST308. In ST308, the client personal computer PC determines whether or not the normal direction movement point Q is a point inside a molded product That is, it is determined whether the normal direction movement point Q is a point on a space. If it is determined to be Yes (Y), the process progresses to ST309. If it is determined to be No (N), the process progresses to ST310.

In ST309, the client personal computer PC sets and stores the selected boundary L and the first and second surfaces FM1 and FM2 as the wedge-shaped concave portion E1, and then progresses to ST311. In ST310, the client personal computer PC sets and stores the selected boundary L and the first and second surfaces FM1 and FM2 as the wedge-shaped convex portion E2, and then progresses to ST311.

In ST311, the client personal computer PC determines whether or not all the boundaries L are selected. If it is determined to be Yes (Y), the process progresses to ST312. If it is determined to be No (N), the process returns to ST302. In ST312, the client personal computer PC displays all the wedge-shaped concave portions E1 stored in the wedge-shaped concave portion setting storage unit C107E and all the wedge-shaped convex portions E2 stored in the wedge-shaped convex portion setting storage unit C107F with different colors on the molded product image 1. Then, the wedge-shaped uneven portion detection processing ends, and the process returns to the main processing of FIG. 17.

Operations of First Exemplary Embodiment

FIGS. 24A to 24C are explanatory views of the operations of the first exemplary embodiment and enlarged explanatory views showing an example of an unmoldable portion which is detected by the unmoldable portion detection processing. FIG. 24A is an explanatory view showing an example of each portion of a molded product which is detected as a cavity-side unmoldable surface and a cavity-side adjacent surface. FIG. 24B is an enlarged explanatory view of a boss when viewed from the XVIIB direction of FIG. 24A. FIG. 24C is an explanatory view showing an example of each portion of a molded product which is detected as a cavity-side projection surface and an example of each portion of a molded product which is not detected as a cavity-side projection surface.

In the moldability determination system S of the first exemplary embodiment having the above-described configuration, when the unmoldable portion detection button 2 of the molded product image 1 shown in FIG. 8 is selected, the unmoldable portion detection processing shown in ST5 of FIG. 17 and ST101 to ST105 of FIG. 18 is executed.

During the unmoldable portion detection processing of the first exemplary embodiment, the first unmoldable portion detection processing shown in ST111 to ST124 of FIG. 19 and the second unmoldable portion detection processing, which is similar to the first unmoldable portion detection processing, are executed.

(In-Plane Undercut Processing of First Unmoldable Portion Detection Processing)

During the first unmoldable portion detection processing of the unmoldable portion detection processing, first, like JP-A-2008-3963, in-plane undercut processing is executed in which the cavity-side unmoldable portion M1 is detected on the basis of the cavity direction KH1 and the normal vectors h1 to h16. That is, in ST113 of FIG. 19, the in-plane undercut processing is executed in which the cavity-side unmoldable surface M1, on which any one of the normal vectors h1 to h16 has the cavity backward component of the cavity direction KH1, is detected as the cavity-side unmoldable portion M1.

For example, with regard to a through hole that passes through a surface of a molded product on the molded product image 1 shown in FIGS. 24A and 24B, a normal vector at an upper part of a through surface 1a inside the through hole has a cavity backward component of the cavity direction KH1, that is, upward. With regard to a boss, which is an example of a projection projecting from a surface of the molded product, a normal vector at a lower part of a cylindrical surface 1b in a base end portion and a normal vector at a lower part of a chamfered portion 1c in a front end portion have the cavity backward component. Meanwhile, the normal vectors on a planar front end surface 1d of the boss are all perpendicular to the cavity direction KH1 and have no cavity backward component. In this case, with the in-plane undercut processing, the through surface 1a, the cylindrical surface 1b, and the chamfered portion 1c are detected as the cavity-side unmoldable portion M1.

(Concave Edge Processing of First Unmoldable Portion Detection Processing)

During the first unmoldable portion detection processing of the unmoldable portion detection processing, concave edge processing is executed in which a new cavity-side unmoldable portion M2 is detected on the basis of the connection angles $\alpha$ and $\alpha'$ to the previously detected cavity-side unmoldable portions M1 to M3. That is, in ST117 and ST118 of FIG. 19, it is determined whether or not the connection angles $\alpha$ and $\alpha'$ between the cavity-side unmoldable portions M1 to M3 and the cavity-side adjacent surfaces M2 and M2' shown in FIGS. 9A and 9B are less than the prescribed concave connection determination value $\alpha_{max}$. Then, the concave edge processing is executed in which the cavity-side concave connection surface M2, which is concavely connected to the cavity-side unmoldable portions M1 to M3, is detected as a new cavity-side unmoldable portion M2.

For example, a projection support surface 1e, shown in FIG. 24A, which supports the bosses 1b to 1d, is detected as the cavity-side concave connection surface M2 concavely connected to the cylindrical surface 1b. Actually, with regard to the projection support surface 1e, a downward portion of each of the bosses 1b to 1d on the upstream side of the cavity direction KH1 becomes a cavity-side unmoldable portion M1. Furthermore, with regard to a pocket-like groove if, an upper end surface 1f1 is detected as the cavity-side unmoldable surface M1, but there is no normal vector opposite to the cavity direction KH1 during the in-plane undercut processing. For this reason, other surfaces 1f2 to 1f5 are not detected as the cavity-side unmoldable surface M1 even though the surfaces 1f2 to 1f5 are the cavity-side unmoldable surface M1. In the first exemplary embodiment, however, with the concave edge processing, a left surface 1*f*2, a right surface 1*f*3, and a bottom surface 1*f*4 concavely connected to the upper end surface 1*f*1 are detected as the cavity-side concave connection surface M2, and a lower end surface 1*f*5 is detected as the cavity-side concave connection surface M2 of each of the surfaces 1*f*2 to 1*f*4.

(Projection Point Processing of First Unmoldable Portion Detection Processing)

During the first unmoldable portion detection processing of the unmoldable portion detection processing, first, projection point processing is executed in which a new cavity-side unmoldable portion M3 is detected on the basis of the cavity direction line KL1 extending from the cavity-side projection surface M3 or M3'. That is, in ST119 of FIG. 19, it is determined whether or not there is a surface M4 which the cavity direction line KL1 extending from the cavity-side projection surface M3 or M3' shown in FIG. 10A or 10E reaches. Then, the projection point processing is executed in which the cavity-side projection surface M3 having the surface M4 is detected as a new cavity-side unmoldable portion M3.

As a result, an upper surface 1*h*1 of a first projection 1*h*, which projects upward from a bottom surface (1*j*) of the molded product below a solid barrier portion 1*g*, shown in FIG. 24C, which is an example of the surface M4, is detected as the cavity-side unmoldable portion M3 because the cavity direction line KL1 extending from the upper surface 1*h*1 reaches the solid barrier portion 1*g*.

(Stand Wall Processing of First Unmoldable Portion Detection Processing)

During the first unmoldable portion detection processing of the unmoldable portion detection processing, stand wall processing is executed in which it is determined whether a surface (M5) adjacent to the cavity-side projection surface M3' is the moldable surface M5 or not on the basis of the cavity-side projection surface M3' not having the surface M4. That is, in ST121 of FIG. 19, the stand wall processing is executed in which the stand wall M5, shown in FIG. 10B, which is adjacent to the cavity-side projection surface M3' and in parallel to the cavity direction line KL1, is determined as the moldable surface M5.

As a result, for example, with regard to a second projection 1*i*, shown in FIG. 24C, which projects upward from a bottom surface (1*j*) of a molded product, an upper surface 1*i*1 of the second projection 1*i* is detected as the moldable portion M3' being not undercut with no solid barrier portion against the cavity direction line KL1 extending from the upper surface 1*i*1. Furthermore, since the side surfaces 1*i*2 to 1*i*5 are in parallel to the cavity direction line KL1, each side surface is determined as the stand wall M5 and then detected as the moldable portion M5.

(Second Unmoldable Portion Detection Processing)

During the second unmoldable portion detection processing of the unmoldable portion detection processing, similarly to the cavity direction KH1, with regard to the core direction KH2, the in-plane undercut processing, the concave edge processing, the projection point processing, and the stand wall processing are executed. As a result, the core-side unmoldable portions M1 to M3 and the moldable portions M3' and M5 are detected.

During the unmoldable portion detection processing, in ST131 to ST144 of FIG. 20, the third moldable portion detection processing is executed in which the third moldable portions M6 and M7 shown in FIGS. 11A and 11B are detected from the detected cavity-side unmoldable portions M1 to M3 and the core-side unmoldable portions M1 to M3.

That is, as shown in ST132 and ST133 of FIG. 20, the cavity-side unmoldable portions M1 to M3 are detected as the core-side projection surface M3' when being moldable by movement of the male mold in the core direction KH2 and are then detected as the moldable portion M3'. Thus, the cavity-side unmoldable portions M1 to M3 are determined as being moldable by the male mold in addition, as shown in ST132, ST134, and ST135 of FIG. 20, the cavity-side unmoldable portions M1 to M3 are detected as the third moldable portions M6 and M7 when being unmoldable by movement of the male mold in the core direction KH2 but being moldable by movement of the slide core in the standard slide direction KH3. Thus, the cavity-side unmoldable portions M1 to M3 are determined as being moldable by the slide core. Furthermore, as shown in ST132, ST134, and ST136 of FIG. 20, the cavity-side unmoldable portions M1 to M3 are detected as the unmoldable portion M8 when being unmoldable by movement of the male mold in the core direction KH2 and movement of the slide core in the standard slide direction KH3. Thus, the cavity-side unmoldable portions M1 to M3 are determined as being unmoldable by the female mold, the male mold, and the slide core.

Figure 25:
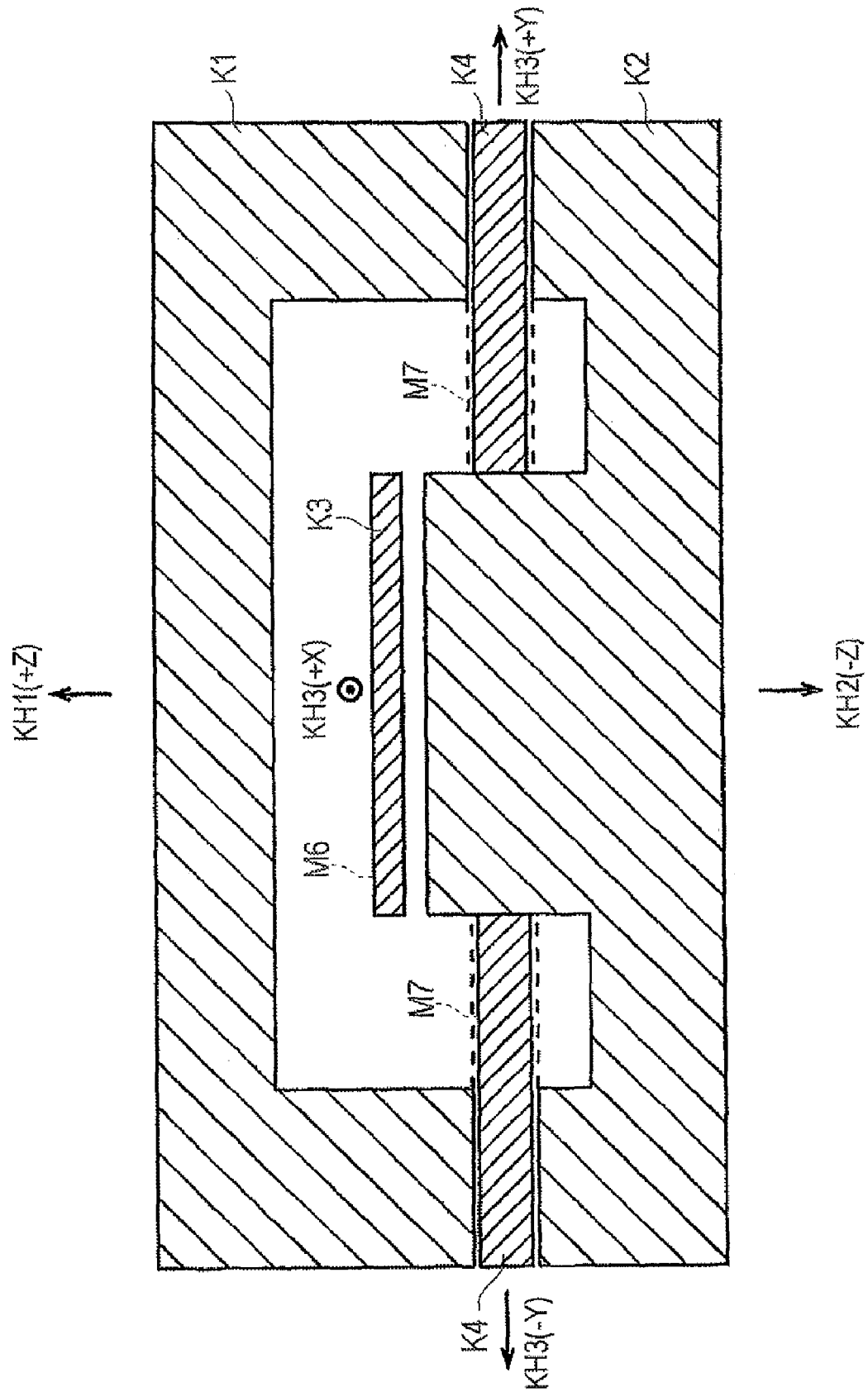
FIG. 25 is an explanatory view of a slide core of the first exemplary embodiment, and is an explanatory view of a slide core corresponding to a model when projections are removed from the model of the molded product shown in FIGS. 11A and 11B.

FIG. 25 is an explanatory view of a slide core of the first exemplary embodiment and is an explanatory view of a slide core corresponding to a model when projections are removed from the model of the molded product shown in FIGS. 11A and 11B.

For example, as shown in FIG. 25, with a model MD3, which is obtained by removing the projections MDa and MDb from the model MD of the molded product shown in FIGS. 11A and 11H, the surfaces, excluding the surfaces M6 and M7, which are detected as the cavity-side unmoldable portions M1 to M3 and the core-side unmoldable portions M1 to M3, can be molded by a female mold K1, which is moved in the +Z direction serving as the cavity direction KH1, and a male mold K2, which is moved in the +Z direction serving as the core direction KH2. In addition, the surface M6 is determined as being moldable by a first slide core K3, which is moved in the ±X direction serving as an example of the standard slide direction KH3. Thus, the surface M6 is detected as the third moldable portion. Furthermore, the surface M7 is determined as being moldable by a second slide core K4, which is moved in the ±Y direction serving as an example of the standard slide direction KH3. Thus, the surface M7 is detected as the third moldable portion.

As a result, the surfaces 1*a* to 1*c*, 1*e*, and 1*f* shown in FIG. 24A are moldable by movement of a slide core having a shape corresponding to each of the surfaces 1*a* to 1*c*, 1*e*, and 1*f* in the −Y direction serving as an example of the standard slide direction KH3. Thus, the surfaces 1*a* to 1*c*, 1*e*, and 1*f* are detected as the third moldable portions M6 and M7.

The bottom surface 1*j*, from which the projections 1*h* and 1*i* shown in FIG. 24C projects, are detected as the cavity-side unmoldable portions M1 to M3 and the core-side unmoldable portions M1 to M3. In this case, even though a slide core having a shape corresponding to the bottom surface 1*j* is moved in the ±X direction and the ±Y direction serving as the standard slide direction KH3, since there are the projections 1*h* and 1*i*, the bottom surface 1*j* is unmoldable. For this reason, the bottom surface 1*j* is detected as the unmoldable portion M8.

Similarly to the cavity-side unmoldable portions M1 to M3, as shown in ST139 and ST140 of FIG. 20, the core-side unmoldable portions M1 to M3 are detected as the cavity-side projection surface M3', that is, the moldable portion M3' when being moldable by movement of the female mold in the cavity direction KH1. Thus, the core-side unmoldable portions M1 to M3 are determined as being moldable by the female mold. In addition, as shown in ST139, ST141, and ST142 of FIG. 20, the core-side unmoldable portions M1 to M3 are detected as the third moldable portions M6 and M7 when being unmoldable by movement of the female mold in the cavity direction KH1 but being moldable by movement of the slide core in the standard slide direction KH3. Thus, the core-side unmoldable portions M1 to M3 are determined as being moldable by the slide core. Furthermore, as shown in ST139, ST141, and ST143 of FIG. 20, the core-side unmoldable portions M1 to M3 are detected as the unmoldable portion M8 when being unmoldable by movement of the female mold in the cavity direction KH1 and movement of the slide core in the standard slide direction KH3. Thus, the core-side unmoldable portions M1 to M3 are determined as being unmoldable by the female mold and the male mold and slide core.

Therefore, in the moldability determination system S of the first exemplary embodiment, the unmoldable portion detection processing ensures automatic determination of presence/absence of the unmoldable portions M1 to M3 with good accuracy and makes it easy to design a molded product or a mold having no unmoldable portion M8 without needing proficient knowledge.

In the moldability determination system S of the first exemplary embodiment, on the molded product image 1, the third moldable portions M6 and M7 are displayed with yellow, and the unmoldable portion M8 is displayed with red. Therefore, it is possible to distinguish the moldable portions (M1 to M3), the third moldable portions M6 and M7, and the unmoldable portion M8 on the molded product image 1. As a result, it is possible to easily design a molded product or a mold having no unmoldable portion M8, as compared with a case where the individual portions are displayed with the same color.

In the moldability determination system S of the first exemplary embodiment, when the unnecessary boundary detection button 3 of the molded product image 1 shown in FIG. 8 is selected, the unnecessary boundary detection processing shown in ST7 of FIG. 17 and ST201 to ST212 of FIG. 21 is executed.

During the unnecessary boundary detection processing of the first exemplary embodiment, in ST205 of FIG. 21, if it is determined that the normal vectors HV1 and HV2 of the first surface FM1 and the second surface FM2 connected to each other through the boundary L shown in FIGS. 14A and 14B are of the same direction, and it is determined in ST207 and ST208 of FIG. 21 that the first curvatures Ku1 and Kv1 of the first surface FM1 and the second curvatures Ku1 and Kv2 of the second surface FM2 shown in FIGS. 15A and 15B are the same, the boundary L is determined as the unnecessary boundary L1 that divides the first surface FM1 and the second surface FM2, which should be the same surface.

Therefore, in the moldability determination system S of the first exemplary embodiment, the unnecessary boundary detection processing ensures automatic detection of the unnecessary boundary L1 with good accuracy and makes it easy to design the mold without needing proficient knowledge.

In the moldability determination system S of the first exemplary embodiment, when the wedge-shaped uneven portion detection button 4 of the molded product image 1 shown in FIG. 8 is selected, the wedge-shaped uneven portion detection processing shown in ST9 of FIG. 17 and ST301 to ST312 of FIG. 22 is executed.

During the wedge-shaped uneven portion detection processing of the first exemplary embodiment, in ST305 of FIG. 22, it is determined whether or not the connection angles β and β' of the first surface FM1 and the second surface FM2, which are calculated on the basis of the normal vectors HV1 and HV2 of the first surface FM1 and the second surface FM2 connected to each other through the boundary L, are less than the prescribed wedge shape determination value $β_{max}$. Accordingly, it is determined whether or not the boundary L and the first and second surfaces FM1 and FM2 are the wedge-shaped uneven portion E1+E2.

If it is determined that the boundary L and the first and second surfaces FM1 and FM2 are the wedge-shaped uneven portion E1+E2, in ST307 and ST308 of FIG. 22, it is determined whether the normal direction movement point Q, which is moved from the midpoint P of the boundary L in a direction of the first normal vector HV1 by the normal direction movement distance LH1 is a point inside the molded product or a point on a space. As a result, if it is determined that the normal direction movement point Q is a point inside the molded product, it is determined that the boundary L and the first and second surfaces FM1 and FM2 are the wedge-shaped concave portion E1. If it is determined that the normal direction movement point Q is a point on a space, it is determined that the boundary L and the first and second surfaces FM1 and FM2 are the wedge-shaped convex portion E2.

Therefore, in the moldability determination system S of the first exemplary embodiment, the wedge-shaped uneven portion detection processing ensures automatic detection with good accuracy of the wedge-shaped concave portion E1, which becomes problematic in terms of strength of the mold due to sharpness of the mold, and the wedge-shaped convex portion E2, which is dangerous to the user due to sharpness of the molded product, causes a difficulty in processing the mold having a concave shape, and becomes problematic in terms of manufacturing costs. As a result, it is possible to easily design the mold without needing proficient knowledge.

Figure 26:
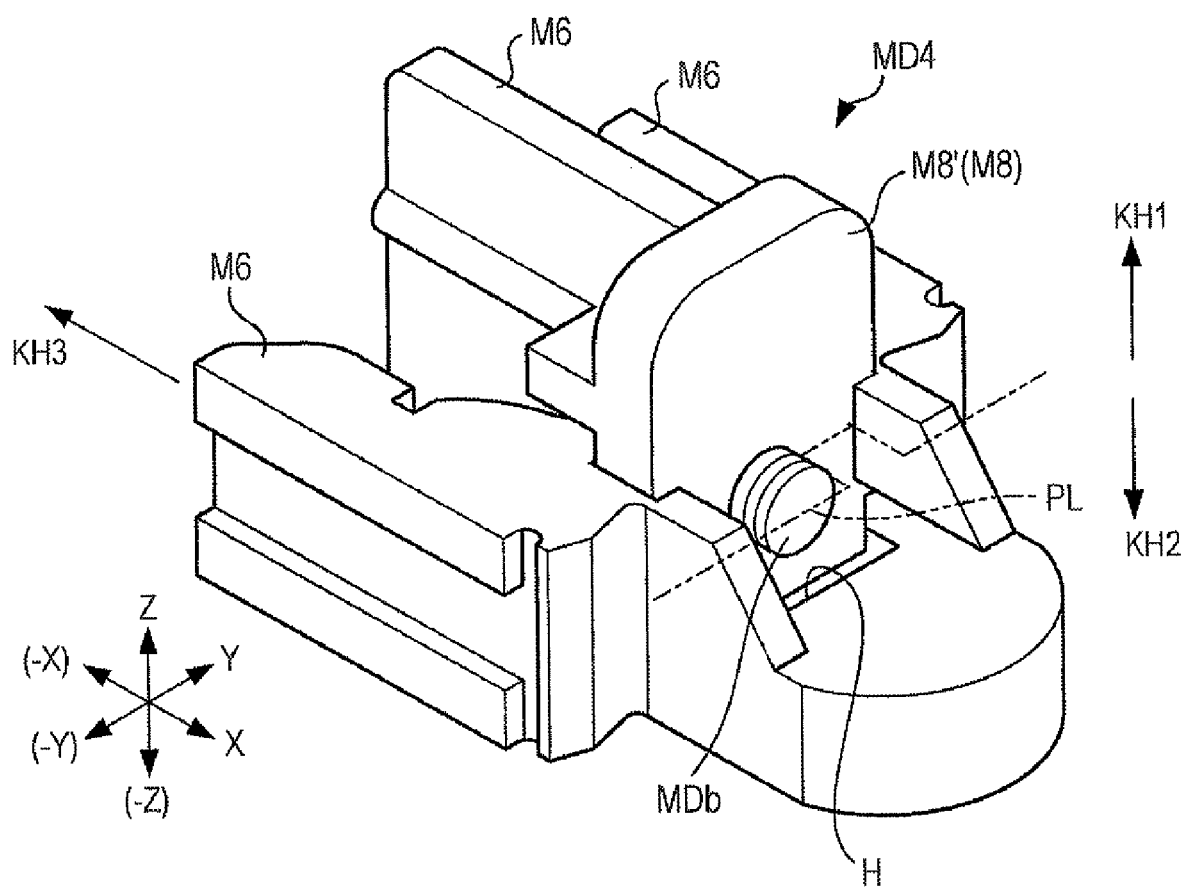
FIG. 26 is an explanatory view of another operation of the first exemplary embodiment.

In the moldability determination system S of the first exemplary embodiment, a surface, which is identified as the unmoldable portion M8 by the unmoldable portion detection processing, may be switched to a moldable portion by the moldable portion detection processing. For example, in case of a model MD4 shown in FIG. 26, a surface, which becomes an unmoldable portion by the unmoldable portion detection processing, becomes a portion of a stand wall of M8, from which a cylindrical projection MDb projects in the X direction. Meanwhile, a surface of the projection extending in the (−X) direction becomes a moldable surface M6. A through hole H is formed below the stand wall (−Z direction).

If the moldable portion detection processing is executed, with regard to a surface which becomes the unmoldable portion M8 due to an undercut, it is determined whether or not there is another surface which the lines KL1 and the line KL2 from the surface in the cavity direction KH1 and the core direction KH2 reach, or whether or not there is another surface which the lines KL1 and KL2 reach. In case of the model MD4, with the through hole, even below the projection MDb (the −Z side), there are no surface which the lines KL1 and KL2 reach. Thus, the surface as the unmoldable portion M8 becomes a moldable surface, that is, the moldable portion M8' by setting a parting line PL for dividing into the cavity direction KH1 and the core direction KH2. The parting line PL of the model MD4 is located to divide the projection MDb in the cavity direction KH1 and the core direction KH2 at the central portion of the projection MDb.

Therefore, in the moldability determination system S of the first exemplary embodiment, the moldable portion detection processing ensures automatic detection of a moldable surface by setting of a parting line with respect to a surface which is determined as an unmoldable surface due to an undercut, and makes it easy to design the mold without needing proficient knowledge.

Second Exemplary Embodiment

Figure 27:
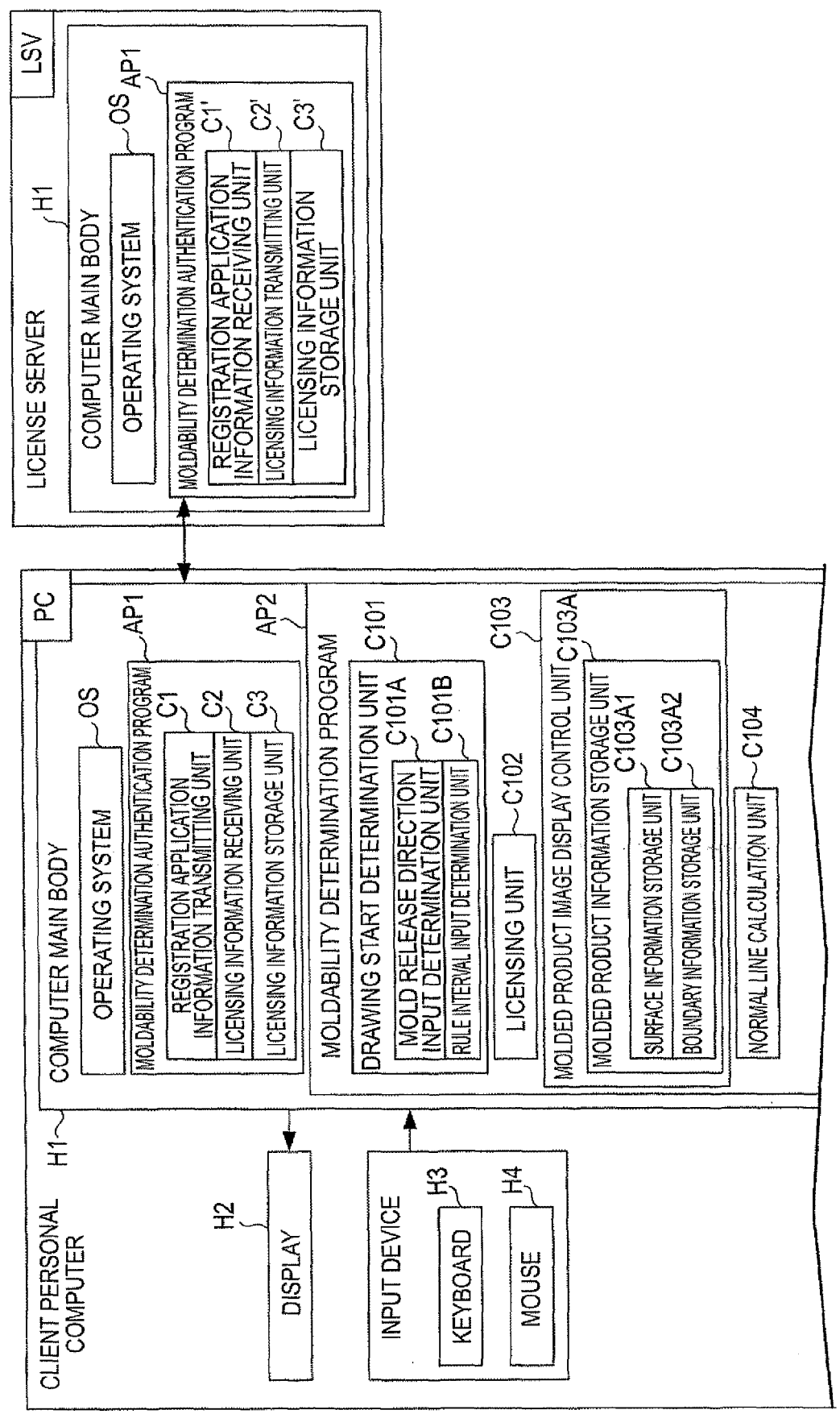
FIG. 27 is a functional block diagram showing the functions of controllers in a client personal computer and a license server of a second exemplary embodiment.

FIG. 27 is a functional block diagram showing the functions of controllers in a client personal computer and a license server of a second exemplary embodiment, and is a diagram corresponding to FIG. 2 of the first exemplary embodiment.

Figure 28:
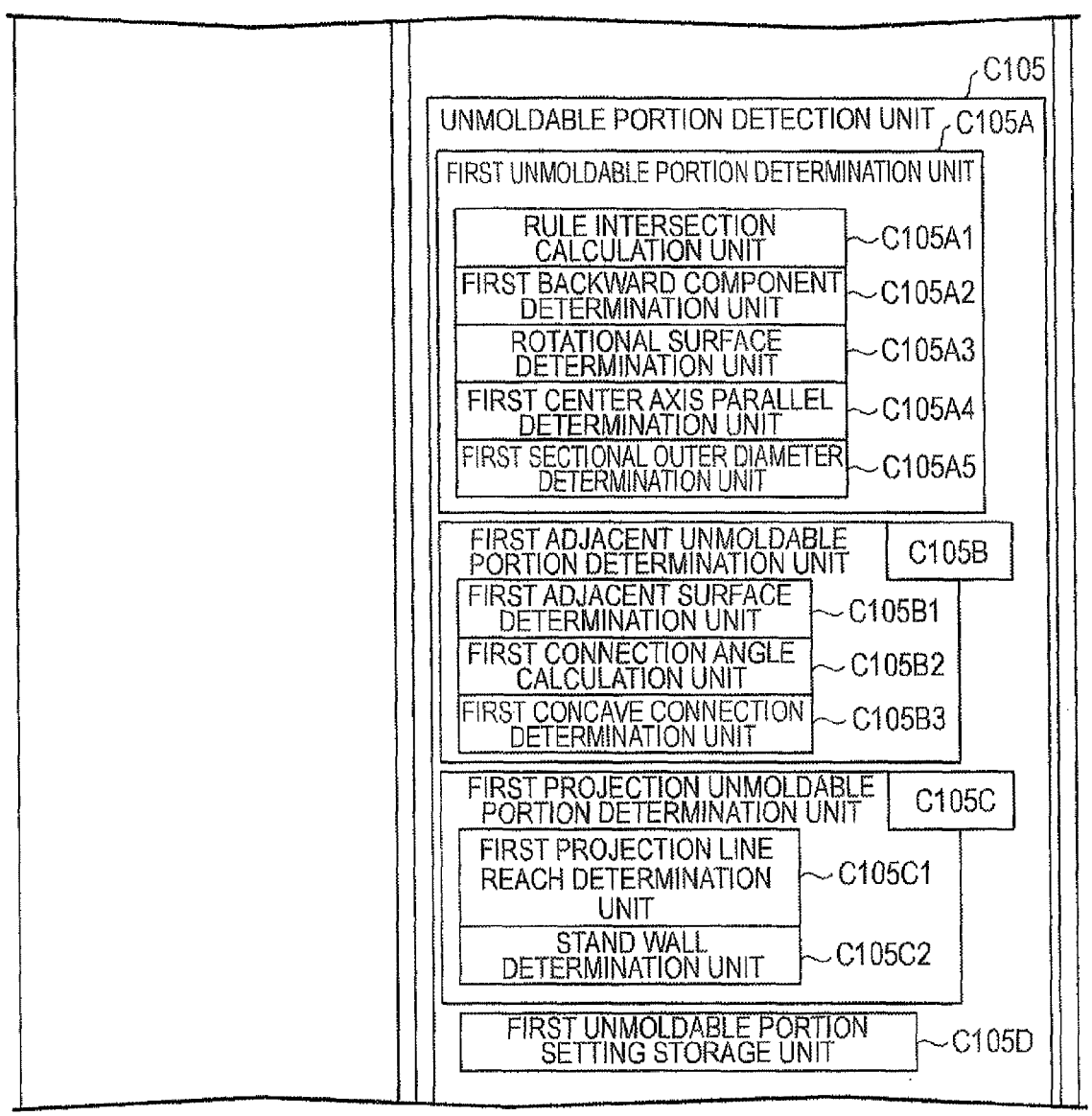
FIG. 28 is a functional block diagram following FIG. 27.
Figure 29:
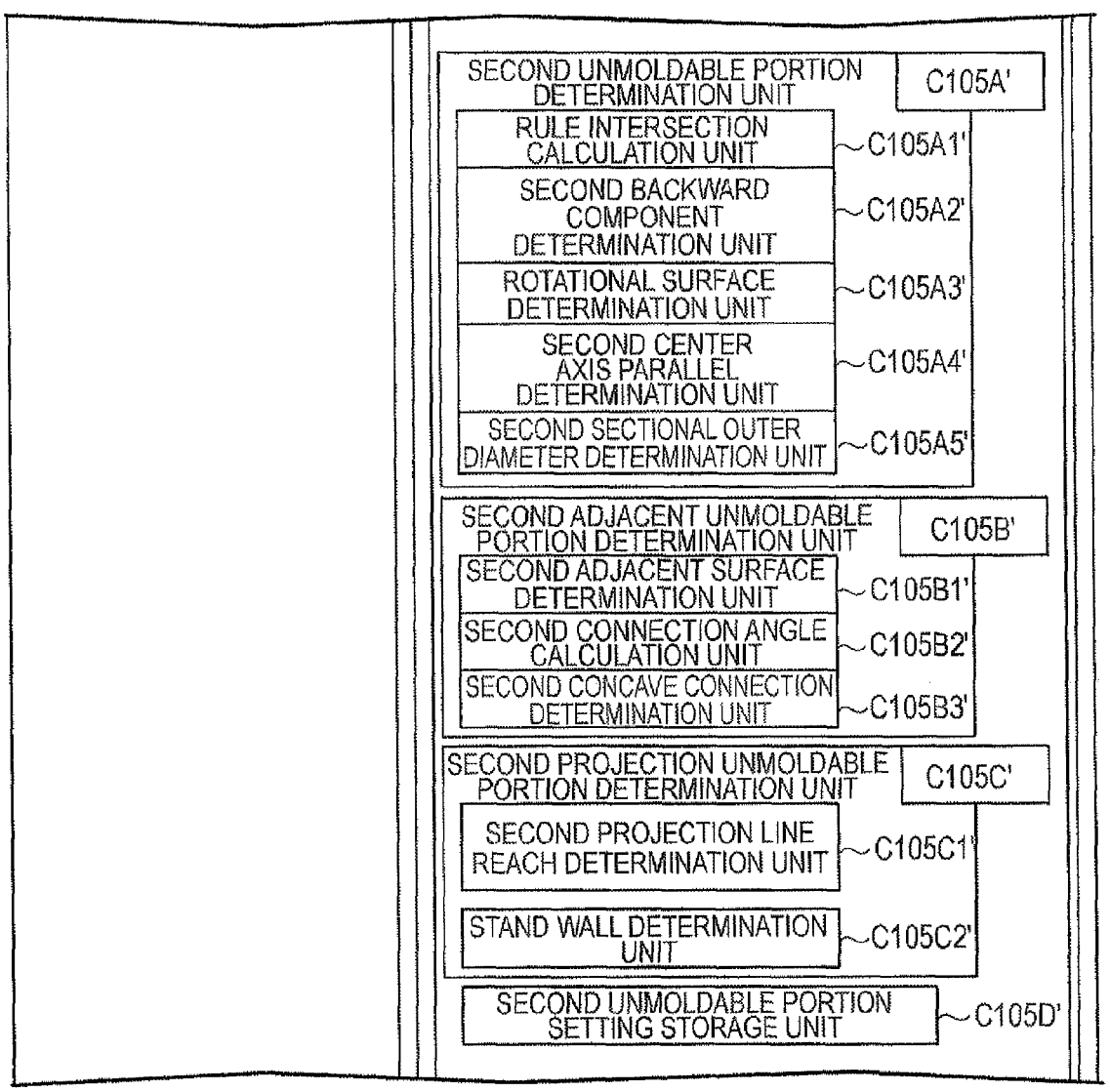
FIG. 29 is a functional block diagram following FIG. 28.
Figure 30:
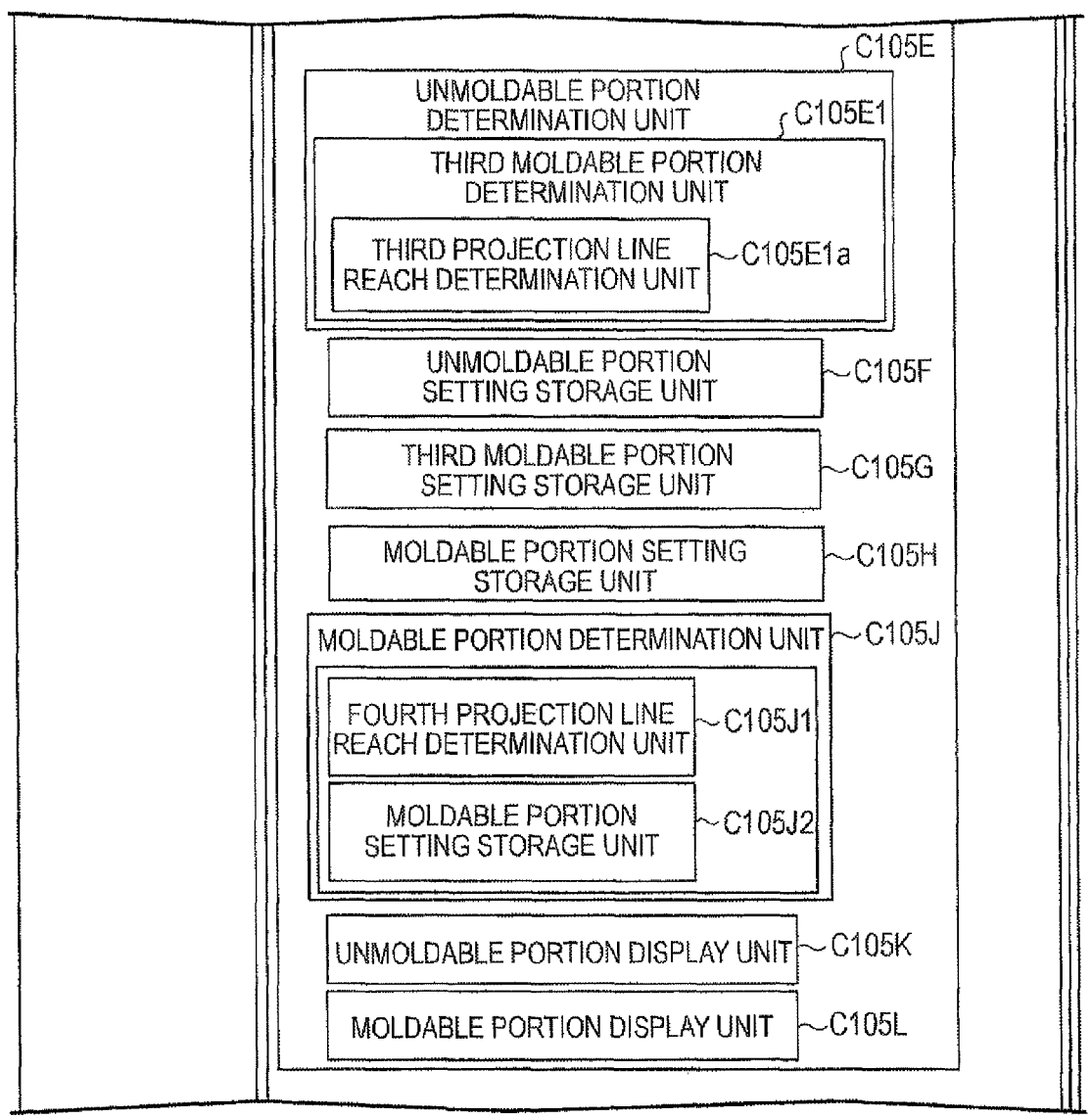
FIG. 30 is a functional block diagram following FIG. 29.
Figure 31:
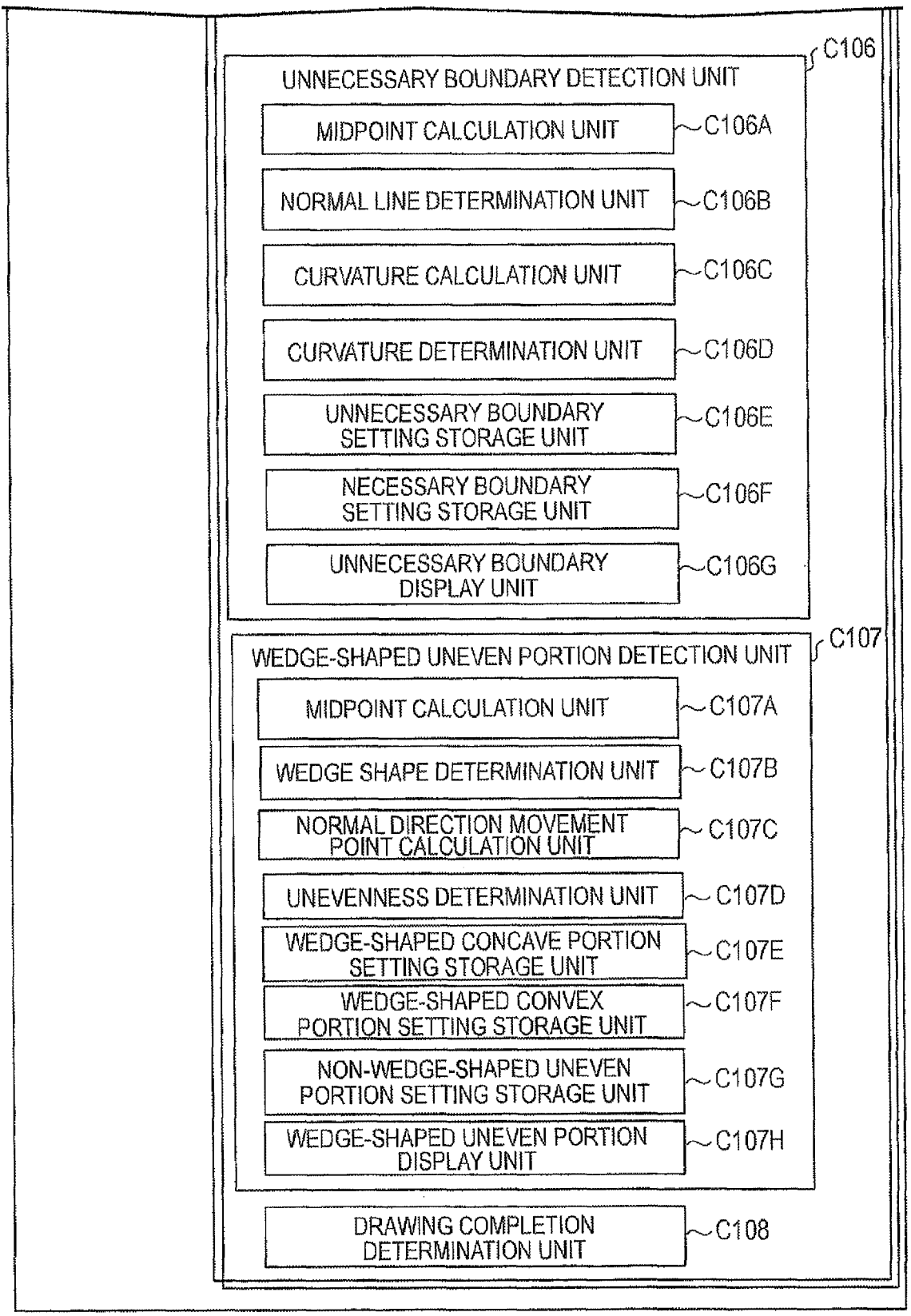
FIG. 31 is a functional block diagram following FIG. 30.

FIG. 28 is a functional block diagram following FIG. 27 and is a diagram corresponding to FIG. 3 of the first exemplary embodiment.

Figure 32:
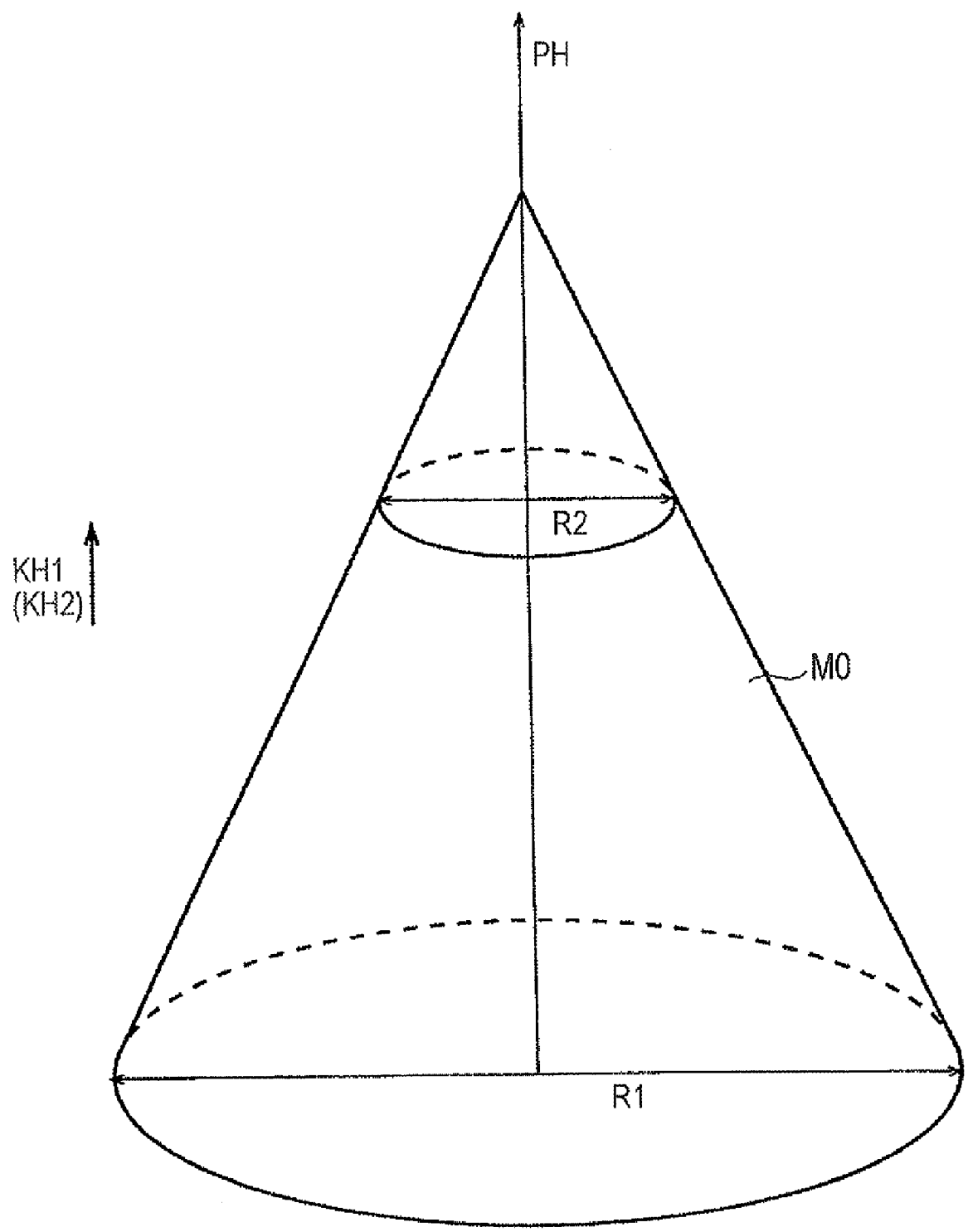
FIG. 32 is an enlarged explanatory view of a conical surface which is an example of a rotational surface.

FIG. 32 is an enlarged explanatory view of a conical surface which is an example of a rotational surface.

Next, a moldability determination system S according to a second exemplary embodiment of the invention will be described. In the description of the second exemplary embodiment, the same parts as those in the first exemplary embodiment are represented by the same reference numerals, and detailed description thereof will not be repeated. The second exemplary embodiment has the following differences from the first exemplary embodiment. Other parts are the same as those in the first exemplary embodiment.

Description of Controller of Second Exemplary Embodiment

Moldability Determination Program AP2

Referring to FIGS. 27 to 31, if a surface is a rotational surface M0, which is a curved surface of a solid body, that is, a rotating body, obtained by rotation around a center axis, as shown in FIG. 32, the surface information storage unit C103A1 of the second exemplary embodiment of the invention stores the surface as a rotational surface M0. In the second exemplary embodiment, when the surface is drawn by an input for drawing a rotational surface during drawing, the surface drawn by the input is stored as the rotational surface M0.

A first unmoldable portion determination unit C105A of the second exemplary embodiment has a rotational surface determination unit C105A3, a first center axis parallel determination unit C105A4, and a first sectional outer diameter determination unit C105A5.

C105A3: Rotational Surface Determination Unit

The rotational surface determination unit C105A3 determines whether the surface is the rotational surface M0 or not on the basis of information stored in the surface information storage unit C103A1.

C105A4: First Center Axis Parallel Determination Unit

As shown in FIG. 32, the first center axis parallel determination unit C105A4 determines whether or not a center axis direction PH of the rotational surface M0 and the cavity direction KH1 are in parallel to each other.

C105A5: First Sectional Outer Diameter Determination Unit

As shown in FIG. 32, with regard to the outer diameters R1 and R2 serving as a diameter of a circle in a sectional view perpendicular to the center axis direction PH, the first sectional outer diameter determination unit C105A5 determines whether or not a cavity upstream-side outer diameter R1, serving as an example of a first upstream-side outer diameter, which is an outer diameter on an upstream side of the cavity direction KH1, is equal to or greater than a cavity downstream-side outer diameter R2, serving as an example of a first downstream-side outer diameter, which is an outer diameter on a downstream side of the cavity direction KH1. Therefore, if it is determined that the center axis direction PH of the rotational surface M0 is in parallel to the cavity direction KH1, and the cavity upstream-side outer diameter R1 is equal to or greater than the cavity downstream-side outer diameter R2 over the center axis direction PH, the first unmoldable portion determination unit C105A of the second exemplary embodiment determines that the rotational surface M0 is not the cavity-side unmoldable portion M1. If it is determined that the center axis direction PH of the rotational surface M0 is not in parallel to the cavity direction KH1, or if it is determined that the center axis direction PH of the rotational surface M0 is in parallel to be cavity direction KH1, but the cavity upstream-side outer diameter R1 includes an area smaller than cavity downstream-side outer diameter R2 over the center axis direction PH, the first unmoldable portion determination unit C105A determines that the rotational surface M0 is the cavity-side unmoldable portion M1.

A second unmoldable portion determination unit C105A' of the second exemplary embodiment has a rotational surface determination unit C105A3', a second center axis parallel determination unit C105A4', and a second sectional outer diameter determination unit C105A5'. If a mark "'" is suffixed to each of reference numerals C105A3, C105A4, and C105A5, and the terms "first", "cavity", and "KH1" are respectively substituted with the terms "second", "core", and "KH2", the descriptions of the rotational surface determination unit C105A3, the first center axis parallel determination unit C105A4, and the first sectional outer diameter determination unit C105A5 can also be applied to the rotational surface determination unit C105A3', the second center axis parallel determination unit C105A4', and the second sectional outer diameter determination unit C105A5', and thus detailed descriptions thereof will be omitted.

Description of Flowchart of First Unmoldable Portion Detection Processing of Second Exemplary Embodiment FIG. 33 is a flowchart of first unmoldable portion detection processing of the second exemplary embodiment, and is an explanatory view of a subroutine of ST5 in FIG. 18. FIG. 33 is an explanatory view corresponding to FIG. 19 of the first exemplary embodiment.

The flowchart of the moldability determination program AP2 in the client personal computer PC of the second exemplary embodiment is different from the flowchart of the main processing in the first exemplary embodiment of FIG. 19 in that ST161 to ST163 are executed between ST111 and ST112. ST113 to ST124 are the same as those in FIG. 19, and thus detailed descriptions thereof will be omitted.

In ST161, the client personal computer PC determines whether or not a selected surface is a rotational surface M0. If it is determined to be Yes (Y), the process progresses to ST162. If it is determined to be No (N), the process progresses to ST112. In ST162, the client personal computer PC determines whether or not the center axis direction PH of the rotational surface M0 and the cavity direction KH1 shown in FIG. 32 are in parallel to each other. If it is determined to be Yes (Y), the process progresses to ST163. If it is determined to be No (N), the process progresses to ST114.

In ST163, the client personal computer PC determines whether or not the upstream-side outer diameter R1 is equal to or greater than the downstream-side outer diameter R2 over the center axis direction PH of the rotational surface M0. If it is determined to be No (N), the process progresses to ST114. If it is determined to be Yes (Y), the process progresses to ST115.

If a mark "'" is suffixed to the ST number of each step of the first unmoldable portion detection processing, and the terms "first", "female mold", "cavity", "KH1", "KL1", and "+Z direction" are respectively substituted with the terms "second", "male mold", "core", "KH2", "KL2", and "−Z direction", the description of the first unmoldable portion detection processing can also be applied to the second unmoldable portion detection processing of the second exemplary embodiment, and thus detailed description thereof will be omitted.

Operations of Second Exemplary Embodiment

Figure 34A:
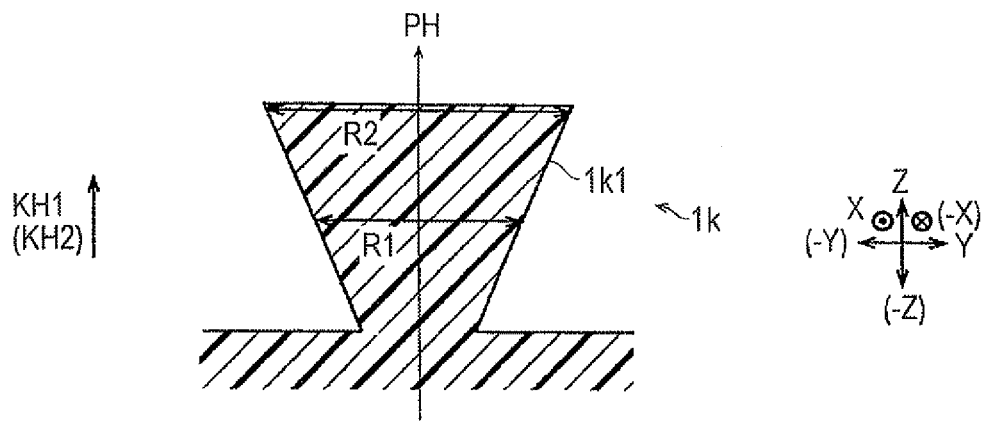
FIGS. 34A to 34C are explanatory views of the operations of the second exemplary embodiment.
Figure 34B:
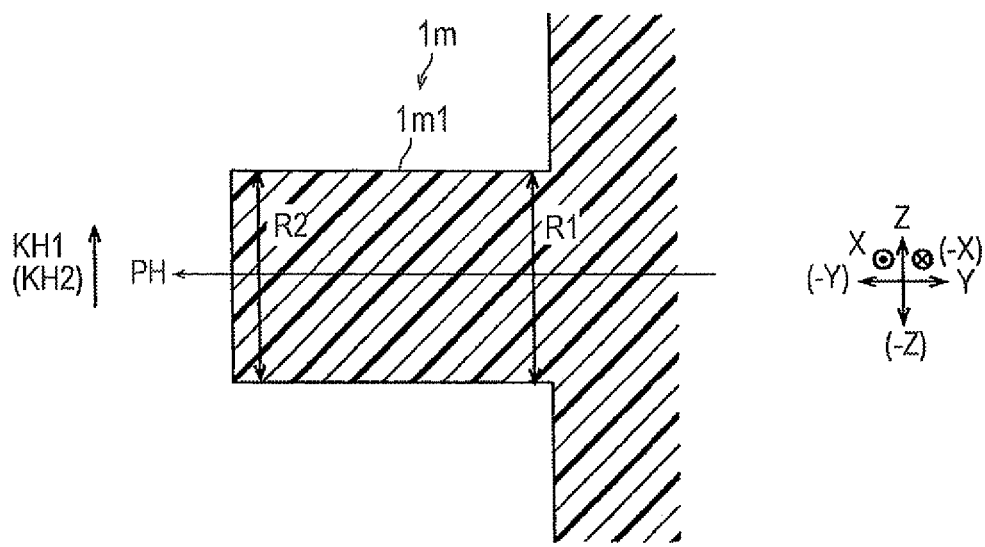
Figure 34C:
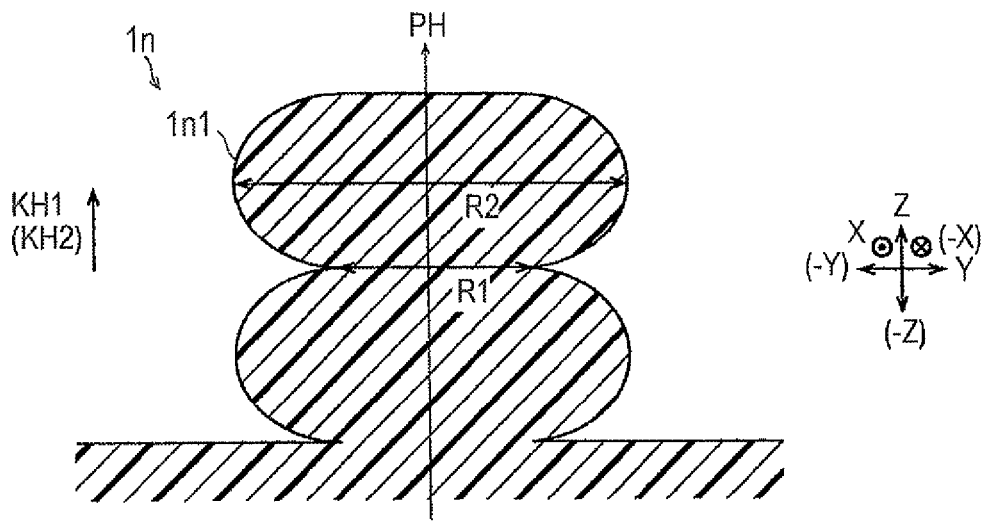

FIGS. 34A to 34C are explanatory views of the operations of the second exemplary embodiment and enlarged explanatory views showing an example of an unmoldable surface which is detected by the unmoldable portion detection processing of the second exemplary embodiment. FIG. 34A is a sectional view of a truncated conical surface which is an example of an unmoldable surface. FIG. 34B is a sectional view of a cylindrical surface which is an example of an unmoldable surface. FIG. 34C is a sectional view of a B curved surface which is an example of an unmoldable surface.

In the moldability determination system S of the second exemplary embodiment having the above-described configuration, during the first unmoldable portion detection processing of the unmoldable portion detection processing, processing shown in ST161 to ST163 of FIG. 33 is executed to determine whether or not the rotational surface M0 shown in FIG. 32 is the cavity-side unmoldable surface M1. That is, if it is not determined that the center axis direction PH of the rotational surface M0 is in parallel to the cavity direction KH1, and the cavity upstream-side outer diameter R1 is equal to or greater than the cavity downstream-side outer diameter R2 over the center axis direction PH, the rotational surface M0 is detected as the cavity-side unmoldable surface M1.

As a result, a truncated conical surface 1k1 shown in FIG. 34A, serving as an example of the rotational surface M0, which constitutes a side surface 1k1 of a third projection 1k having an inverted truncated conical surface, is detected as the cavity-side unmoldable surface M1. The reason is because the center axis direction PH is in parallel to the cavity direction KH1, but the cavity upstream-side outer diameter R1 is equal to or smaller than the cavity downstream-side outer diameter R2. In addition, a cylindrical surface 1m1 shown in FIG. 34B, serving as an example of the rotational surface M0, which constitutes a side surface 1m1 of a cylindrical fourth projection 1m, is detected as the cavity-side unmoldable surface M1. The reason is because the upstream-side outer diameter R1 and the cavity downstream-side outer diameter R2 are the same, but the center axis direction PH is not in parallel to the cavity direction KH1. Furthermore, a B curved surface 1n1 shown in FIG. 32O, serving as an example of the rotational surface M0, which constitutes a side surface 1n1 of a calabash-like fifth projection 1n, is detected as the cavity-side unmoldable portion M1. The reason is because the center axis direction PH is in parallel to the cavity direction KH1, but the cavity upstream-side outer diameter R1 at the central portion of the center axis is equal to or smaller than the cavity downstream-side outer diameter R2.

During the second unmoldable portion detection processing of the unmoldable portion detection processing of the second exemplary embodiment, similarly to the cavity direction KH1, with regard to the core direction KH2, processing is execute to determine whether or not the rotational surface M0 is the core-side unmoldable surface M1. That is, if it is not determined that the rotational surface M0 is in parallel to the center axis direction PH and the core direction KH2, and the core upstream-side outer diameter R1 is equal to or greater than the core downstream-side outer diameter R2 over the center axis direction PH, the rotational surface M0 is detected as the core-side unmoldable portion M1.

Therefore, in the moldability determination system S of the second exemplary embodiment, when a selected surface is the rotational surface M0, unlike the moldability determination system S of the first exemplary embodiment, it is possible to determine with good accuracy whether the rotational surface M0 is the cavity-side unmoldable surface M1 or the core-side unmoldable surface M1, without calculating the normal vector (h1 to h16).

During the unmoldable portion detection processing of the second exemplary embodiment, similarly to the unmoldable portion detection processing of the first exemplary embodiment, the third moldable portion detection processing shown in ST131 to ST144 of FIG. 20 is executed. For this reason, the cylindrical surface 1m1 shown in FIG. 34B is moldable by movement of a slide core having a shape corresponding to the cylindrical surface 1m1 in the −Y direction serving as an example of the standard slide direction KH3. Therefore, the cylindrical surface 1m1 is detected as the third moldable portion M6 or M7. In addition, the surfaces 1k1 and 1n1 shown in FIGS. 32A and 34C are detected as the unmoldable portion M8 since, even though a slide core having a shape corresponding to each of the surfaces 1k1 and 1n1 is formed, the slide core is not movable in any of the ±X direction and the ±Y direction serving as an example of the standard slide direction KH3 due to the surfaces 1k1 and 1n1 themselves, unless the slide core is divided.

In addition, the moldability determination system S of the second exemplary embodiment has the same advantages and effects as the moldability determination system S of the first exemplary embodiment.

(Modifications)

Although the invention will be described in connection with the foregoing exemplary embodiments, the invention is not limited to the foregoing exemplary embodiments. It should be noted that various modifications and changes may be made without departing from the scope of the invention read on the appended claims. For example, the following modifications (H01) to (H012) may be made.

(H01) During the unmoldable portion detection processing of the foregoing exemplary embodiments, the concave edge processing shown in ST117 and ST118 of FIG. 19 and the projection point processing shown in ST119 of FIG. 19 can be executed in combination. However, the invention is not limited thereto. For example, while the concave edge processing may not be executed, only the projection point processing may be executed. The stand wall processing shown in ST121 of FIG. 18 can be accompanied by the projection point processing, but it may be not executed. In this case, though not detected as the stand wall M5, the surface (M5) is detected as the moldable portion M3' or the third moldable portion M6 or M7.

(H02) During the unmoldable portion detection processing of the foregoing exemplary embodiments, the connection angles α and α' are calculated on the basis of the normal vectors h1 to h16 at the grid intersections p1 to p16. However, the invention is not limited thereto. For example, similarly to the unnecessary boundary detection processing or the wedge-shaped uneven portion detection processing, the connection angles α and α' may be calculated on the basis of the normal vectors HV1 and HV2 at the midpoint P of the first surface FM1 and the second surface FM2 connected to each other through the boundary L.

(H03) During the unnecessary boundary detection processing of the foregoing exemplary embodiments, it is determined whether the boundary L is the unnecessary boundary L1 on the basis of the curvatures Ku1, Kv1, Ku2, and Kv2 of the first surface FM1 and the second surface FM2 at the midpoint P of the boundary L. However, the invention is not limited thereto. For example, it may be possible to determine whether the boundary L is the unnecessary boundary L1 or not by calculating the curvature radii 1/Ku1, 1/Kv1, 1/Ku2, and 1/Kv2 of the first surface FM1 and the second surface FM2, determining whether or not the curvature radii 1/Ku1 and 1/Kv1 of the first surface FM1 are the same as the curvature radii 1/Ku2 and 1/Kv2 of the second surface FM2, and determining whether or not the first curved state and the second curved state are the same.

(H04) In the foregoing exemplary embodiments, the numerical values of the parameters $\alpha_{max}$, $\beta_{max}$, and LH1 may be changed.

(H05) In the foregoing exemplary embodiments, the unmoldable portion M8, the unnecessary boundary L1, the wedge-shaped concave portion E1, and the wedge-shaped convex portion E2, which are detected by the unmoldable portion detection processing, the unnecessary boundary detection processing, and the wedge-shaped uneven portion detection processing, are displayed with colors, but the invention is not limited thereto. For example, a boundary between detection places may be highlighted, or a colored portion of a detection place may blink. In addition, a detection place may be displayed by an additional image, or a sentence or symbol, or may be reported by sound.

(H06) In the foregoing exemplary embodiments, the molded product image 1 has the unmoldable portion detection button 2, the unnecessary boundary detection button 3, and the wedge-shaped uneven portion detection button 4, but the invention is not limited thereto. For example, the buttons may be substituted with images, such as icons, or individual processing may be executed by command input.

(H07) In the moldability determination system S of the foregoing exemplary embodiments, the license of the moldability determination system S is given by transmission/reception of the registration application information and the licensing information between the client personal computer PC and the license server, but the invention is not limited thereto. For example, transmission/reception of the registration application information and the licensing information may be omitted, and confirmation processing of the license of the moldability determination system S based on the licensing information may also be omitted.

(H08) In the foregoing exemplary embodiments, during the unmoldable portion detection processing shown in ST5 of FIG. 17 and ST101 to ST105 of FIG. 18, the first unmoldable portion detection processing for detecting the cavity-side unmoldable portions M1 to M3, and the second unmoldable portion detection processing for detecting the core-side unmoldable portions M1 to M3 are executed, but the invention is not limited thereto. Like JP-A-2008-3963, one of the first unmoldable portion detection processing and the second unmoldable portion detection processing may not be executed. For example, when a surface being in contact with the male mold (K2) is designed to be defined in an even flat surface, and it is ensured that the core-side unmoldable portions M1 to M3 do not exist in the core direction. KH2, the second unmoldable portion detection processing may not be executed, and only the first unmoldable portion detection processing on the cavity direction KH1 may be executed. While the second unmoldable portion detection processing may not be executed, only the first unmoldable portion detection processing may be executed in accordance with the user's input. In this case, with regard to only the detected cavity-side unmoldable portions M1 to M3, the third moldable portion detection processing for detecting the third moldable portions M6 and M7 is executed.

(H09) In the foregoing exemplary embodiments, the standard slide direction lines KL3 are set as the lines in four directions of the ±X direction and the ±Y direction, which are the lines on the XY plane orthogonal to the line in the Z-axis direction serving as the cavity direction line KL1 and the core direction line KL2, but the invention is not limited thereto. Other lines on the XY plane may be used. In addition, lines on a plane inclined nonorthogonally with respect to the line in the Z-axis direction may be used. That is, the standard slide direction lines KL3 are not limited to the lines in four directions of the ±X direction and the ±Y direction, but lines in three or less directions, or lines in five or more directions may be used.

(H010) In the second exemplary embodiment, in order to determine whether or not the rotational surface M0 is the unmoldable portion M8, it is determined whether or not the center axis direction PH of the rotational surface M0 is in parallel to the cavity direction KH1 or the core direction KH2, and it is determined whether the rotational surface M0 is not the cavity-side unmoldable portion M1 or the core-side unmoldable portion M1. Alternatively, the target for determination of the rotational surface M0 is not limited to the directions KH1 and KH2. For example, it may be possible to determine whether or not the center axis direction PH of the rotational surface M0 is in parallel to the standard slide direction KH3, and to determine whether or not the rotational surface M0 is the third moldable portion M6 or M7.

(H011) In the second exemplary embodiment, when the center axis direction PH of the rotational surface M0 is not in parallel to the cavity direction KH1, or when the center axis direction PH of the rotational surface M0 is in parallel to the cavity direction KH1, but the cavity upstream-side outer diameter R1 includes an area smaller than the cavity downstream-side outer diameter R2 over the center axis direction PH, the rotational surface M0 is determined as the cavity-side unmoldable portion M1 or the core-side unmoldable portion M1. However, the determination result of the rotational surface M0 is not limited thereto. For example, when the center axis direction PH of the rotational surface M0 is in parallel to the cavity direction KH1, but the cavity upstream-side outer diameter R1 includes an area smaller than the cavity downstream-side outer diameter R2 over the center axis direction PH, the rotational surface M0 may be unconditionally determined as the unmoldable portion M8. In this case, it is possible to exclude the rotational surface M0, which is determined as the unmoldable portion M8, from the target subject to the third moldable portion detection processing for detecting the third moldable portions M6 and M7. Therefore, it is possible to improve a processing speed of the entire unmoldable portion detection processing.

(H012) In the foregoing exemplary embodiments, with regard to the cavity-side unmoldable portions M1 to M3 and the cavity-side unmoldable portions M1 to M3, which are detected by the first unmoldable portion detection processing and the second unmoldable portion detection processing, the third moldable portion detection processing is executed. Then, the cavity-side unmoldable portions M1 to M3 and the cavity-side unmoldable portions M1 to M3, excluding the third moldable portions M6 and M7, are detected as the unmoldable portion M8. As a result, it is possible to improve the processing speed of the entire unmoldable portion detection processing. However, the invention is not limited thereto. For example, similarly to the first unmoldable portion detection processing and the second unmoldable portion detection processing, the third moldable portion detection processing may be executed on all the surfaces of the molded product. In this case, during the unmoldable portion detection processing, the unmoldable portion M8 is detected on the basis of all the results of the detection processing, as well as the result of the third moldable portion detection processing.

(H013) In the foregoing exemplary embodiments, with regard to the cavity-side unmoldable portions M1 to M3 and the core-side unmoldable portions M1 to M3, which are detected by the first unmoldable portion detection processing and the second unmoldable portion detection processing, the third moldable portion detection processing is executed, the cavity-side unmoldable portions M1 to M3 and the cavity-side unmoldable portions M1 to M3, other than the third moldable portions M6 and M7, are detected as the unmoldable portion M8. Alternatively, a surface having a backward component, which is a directional component opposite to the mold release direction with respect to each surface, may be detected as an unmoldable portion, regardless of the cavity-side or the core side.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An unmoldability determination apparatus comprising:
  a normal line calculation unit that calculates a normal line extending from a point on a plurality of surfaces constituting a three-dimensional shape of a molded product;
  an opposite direction component determination unit that determines whether or not the normal line calculated on each surface has an opposite direction component which is a directional component opposite to a mold release direction of a mold of the molded product prescribed for the each surface;
  a reach determination unit that, when a surface having a point at which the normal line having the opposite direction component is calculated is a projection surface, determines whether or not there is another surface on the molded product which one of a line extending from the projection surface in the mold release direction and a line extending in a direction opposite to the mold release direction reaches; and
  an unmoldability determination unit that, when there is another surface which both of the line extending from the projection surface in the mold release direction and the line extending in the direction opposite to the mold release direction reaches, determines the projection surface to be unreleasable from the mold only by movement of the mold in the mold release direction, thus determining the projection surface to be unmoldable.

2. The unmoldability determination apparatus according to claim 1, further comprising:
  a display unit that displays the determination result by the unmoldability determination unit.

3. An unmoldability determination apparatus comprising:
  a normal line calculation unit that calculates a normal line extending from a point on a plurality of surfaces constituting a three-dimensional shape of a molded product to outside of the molded product;
  a first opposite direction component determination unit that determines whether or not the normal line calculated on each surface has a first opposite direction component which is a directional component opposite to a first mold release direction, which is a mold release direction of a first mold of the molded product prescribed for the each surface;
  a second reach determination unit that determines whether or not there is another surface on the molded product which a second mold release direction line reaches, the second mold release direction line extending from a surface having a point, at which the normal line having the first opposite direction component is calculated, in a second mold release direction, which is a mold release direction of a second mold of the molded product;
  a third reach determination unit that, when it is determined that there is a surface which the second mold release direction line reaches, determines whether or not there is another surface which a third mold release direction line reaches, the third mold release direction line extending from a surface having a point, at which the normal line having the first opposite direction component is calculated, in a third mold release direction, which is a mold release direction of a third mold different from the first mold and the second mold and is different from the first mold release direction and the second mold release direction;
  a first unmoldable portion determination unit that determines a surface, at which it is determined that there is another surface which the second mold release direction line reaches and there is another surface which the third mold release direction line reaches, from among surfaces having points, at which the normal line having the first opposite direction component is calculated, to be unreleasable from the second mold by movement of the second mold in the second mold release direction and movement of the third mold in the third mold release direction, thus determining the surface to be an unmoldable portion;
  a second opposite direction component determination unit that determines whether or not the normal line calculated on each surface has a second opposite direction component which is a directional component opposite to the second mold release direction, which is a mold release direction of the second mold that is a counterpart of the first mold and is opposite to the first mold release direction;
  a first reach determination unit that determines whether or not there is another surface on the molded product which a first mold release direction line reaches, the first mold release direction line extending from a surface having a point, at which the normal line having the second opposite direction component is calculated, in the first mold release direction;
  a fourth reach determination unit that, when it is determined that there is a surface which the first mold release direction line reaches, determines whether or not there is another surface on the molded product which the third mold release direction line reaches, the third mold release direction line extending from a surface having a point, at which the normal line having the second opposite direction component is calculated, in the third mold release direction;
  a second unmoldable portion determination unit that determines a surface, at which it is determined that there is another surface which the first mold release direction line reaches and there is another surface which the third mold release direction line reaches, from among surfaces having points, at which the normal line having the second opposite direction component is calculated, to be unreleasable from the first mold by movement of the first mold in the first mold release direction and movement of the third mold in the third mold release direction, thus determining the surface to be an unmoldable portion;

a reach determination unit that, when the surface which is determined to be an unmoldable portion by the first unmoldable portion determination unit or the second unmoldable portion determination unit is a projection surface, determines whether or not there is a surface on the molded product which one of a line extending from the projection surface in the mold release direction and a line extending in a direction opposite to the mold release direction reaches; and an unmoldability determination unit that, when there is another surface which both of the line extending from the projection surface in the mold release direction and the line extending in the direction opposite to the mold release direction reaches, determines the projection surface to be unreleasable from the mold only by movement of the mold in the mold release direction, thus determining the projection surface to be unmoldable.

4. The unmoldability determination apparatus according to claim 3, further comprising:
a display unit that displays the determination result by the unmoldability determination unit.

5. An unmoldability determination apparatus comprising:
a normal line calculation unit that calculates a normal line extending from a point on a plurality of surfaces constituting a three-dimensional shape of a molded product to outside of the molded product;
a first opposite direction component determination unit that determines whether or not the normal line calculated on each surface has a first opposite direction component which is a directional component opposite to a first mold release direction, which is a mold release direction of a first mold of the molded product prescribed for the each surface;
a second reach determination unit that determines whether or not there is another surface on the molded product which a second mold release direction line reaches, the second mold release direction line extending from a surface having a point, at which the normal line having the first opposite direction component is calculated, in a second mold release direction which is a mold release direction of a second mold that is a counterpart of the first mold and is opposite to the first mold release direction;
a third reach determination unit that, when it is determined that there is another surface which the second mold release direction line reaches, determines whether or not there is another surface on the molded product which a third mold release direction line reaches, the third mold release direction line extending from a surface having a point, at which the normal line having the first opposite direction component is calculated, in a third mold release direction which is a mold release direction of a third mold different from the first mold and the second mold and is different from the first mold release direction and the second mold release direction;
an unmoldable portion determination unit that determines a surface, at which it is determined that there is another surface which the second mold release direction line reaches and there is another surface which the third mold release direction line reaches, from among surfaces having points, at which the normal line having the first opposite direction component is calculated, to be unreleasable from the second mold by movement of the second mold in the second mold release direction and movement of the third mold in the third mold release direction, thus determining the surface to be an unmoldable portion;

a reach determination unit that, when the surface which is determined as the unmoldable portion is a projection surface, determines whether or not there is another surface on the molded product which one of a line extending from the projection surface in the mold release direction and a line extending in a direction opposite to the mold release direction reaches; and an unmoldability determination unit that, when both of the line extending from the projection surface in the mold release direction and the line extending in the direction opposite to the mold release direction reach, determines the projection surface to be unreleasable from the mold only by movement of the mold in the mold release direction, thus determining the projection surface unmoldable.

6. The unmoldability determination apparatus according to claim 5, further comprising:
a display unit that displays the determination result by the unmoldability determination unit.

7. A non-transitory computer readable medium storing a program, which when executed by a hardware processor, causes a computer to execute a process for determining unmoldability, the process comprising:
calculating a normal line extending from a point on a plurality of surfaces constituting a three-dimensional shape of a molded product to outside of the molded product;
determining whether or not the normal line calculated on each surface has an opposite direction component which is a directional component opposite to a mold release direction of a mold of the molded product prescribed for the each surface;
when a surface having a point at which the normal line having the opposite direction component is calculated is a projection surface, determining whether or not there is another surface on the molded product which one of a line extending from the projection surface in the mold release direction and a line extending in a direction opposite to the mold release direction reaches;
when there is another surface which both of the line extending from the projection surface in the mold release direction and the line extending in the direction opposite to the mold release direction reaches, determining the projection surface to be unreleasable from the mold only by movement of the mold in the mold release direction, thus determining the projection surface to be unmoldable; and
displaying the determination result by the unmoldability determination unit.

8. An unmoldability determination method performed by a normal line calculation unit, an opposite direction component determination unit, a reach determination unit, and an unmoldability determination unit, the method comprising:
calculating a normal line extending from a point on a plurality of surfaces constituting a three-dimensional shape of a molded product to outside of the molded product, with the normal line calculation unit;

determining whether or not the normal line calculated on each surface has an opposite direction component which is a directional component opposite to a mold release direction of a mold of the molded product prescribed for the each surface, with the opposite direction component determination unit;

when a surface having a point at which the normal line having the opposite direction component is calculated is a projection surface, determining whether or not there is another surface on the molded product which one of a line extending from the projection surface in the mold release direction and a line extending in a direction opposite to the mold release direction reaches, with the reach determination unit;

when there is another surface which both of the line extending from the projection surface in the mold release direction and the line extending in the direction opposite to the mold release direction reaches, determining the projection surface to be unreleasable from the mold only by movement of the mold in the mold release direction, thus determining the projection surface to be unmoldable, with the unmoldability determination unit; and displaying the determination result by the unmoldability determination unit.

* * * * *